(12) United States Patent
Furukawa et al.

(10) Patent No.: US 11,431,273 B2
(45) Date of Patent: Aug. 30, 2022

(54) CONTROLLER FOR ROTARY MACHINE AND ELECTRIC POWER STEERING APPARATUS

(71) Applicant: Mitsubishi Electric Corporation, Tokyo (JP)

(72) Inventors: Akira Furukawa, Tokyo (JP); Tatsuya Mori, Tokyo (JP); Munenori Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 778 days.

(21) Appl. No.: 16/341,981

(22) PCT Filed: Nov. 14, 2016

(86) PCT No.: PCT/JP2016/083682
§ 371 (c)(1),
(2) Date: Apr. 15, 2019

(87) PCT Pub. No.: WO2018/087916
PCT Pub. Date: May 17, 2018

(65) Prior Publication Data
US 2019/0260327 A1    Aug. 22, 2019

(51) Int. Cl.
*H02H 7/08* (2006.01)
*H02P 27/12* (2006.01)
(Continued)

(52) U.S. Cl.
CPC ............ *H02P 27/12* (2013.01); *B62D 5/0424* (2013.01); *B62D 5/0463* (2013.01);
(Continued)

(58) Field of Classification Search
CPC ......... H02P 27/12; H02P 21/22; B62D 5/024; B62D 5/0463
(Continued)

(56) References Cited

U.S. PATENT DOCUMENTS

| | | | |
|---|---|---|---|
| 2006/0113954 A1* | 6/2006 | Ma | H02P 29/0241 318/803 |
| 2016/0142003 A1* | 5/2016 | Scotson | B62D 5/0484 318/400.2 |
| 2019/0260327 A1* | 8/2019 | Furukawa | H02P 27/12 |

FOREIGN PATENT DOCUMENTS

JP    5496257 B2    5/2014

OTHER PUBLICATIONS

International Search Report of PCT/JP2016/083682 filed Feb. 14, 2017.

* cited by examiner

*Primary Examiner* — Erick D Glass
(74) *Attorney, Agent, or Firm* — Sughrue Mion, PLLC; Richard C. Turner

(57) ABSTRACT

To provide a controller for a rotary machine which can simplify a configuration required for checking the shutoff function of the switching device, and an electric power steering apparatus therewith. A controller for a rotary machine performs a high potential side forcible shutoff which forcibly shuts off a high potential side switching device of a diagnosis object phase in a drive state where the winding current of the diagnosis object phase becomes positive, or a low potential side forcible shutoff which forcibly shuts off a low potential side switching device of the diagnosis object phase in a drive state where the winding current of the diagnosis object phase becomes negative; and determines failure of the device shutoff unit based on a detection value of current or voltage when performing the high potential side forcible shutoff or the low potential side forcible shutoff.

15 Claims, 36 Drawing Sheets

(51) Int. Cl.
*H02P 21/22* (2016.01)
*B62D 5/04* (2006.01)
*H02P 29/024* (2016.01)

(52) U.S. Cl.
CPC ............ *B62D 5/0481* (2013.01); *H02P 21/22* (2016.02); *H02P 29/024* (2013.01)

(58) Field of Classification Search
USPC ........................................ 318/400.02, 400.21
See application file for complete search history.

FIG. 6

DRIVE STATE BEFORE SHUTOFF

| VOLTAGE VECTOR | 20U | 21U | 20V | 21V | 20W | 21W |
|---|---|---|---|---|---|---|
| V0 | OFF | ON | OFF | ON | OFF | ON |
| V1 | ON | OFF | OFF | ON | OFF | ON |
| V2 | ON | OFF | ON | OFF | OFF | ON |
| V3 | OFF | ON | ON | OFF | OFF | ON |
| V4 | OFF | ON | ON | OFF | ON | OFF |
| V5 | OFF | ON | OFF | ON | ON | OFF |
| V6 | ON | OFF | OFF | ON | ON | OFF |
| V7 | ON | OFF | ON | OFF | ON | OFF |

FIG. 8 DRIVE STATE BEFORE SHUTOFF  $\theta = 0\text{deg}$

V7 (t1~t2, t5~t6)

FIG. 9  DRIVE STATE BEFORE SHUTOFF  $\theta = 0\text{deg}$

V1 (t2~t3, t4~t5)

DRIVE STATE BEFORE SHUTOFF  $\theta = 180\text{deg}$

FIG. 19 DRIVE STATE BEFORE SHUTOFF  $\theta = 180\text{deg}$

V4(t2~t3, t4~t5)

FIG. 25  DRIVE STATE BEFORE SHUTOFF
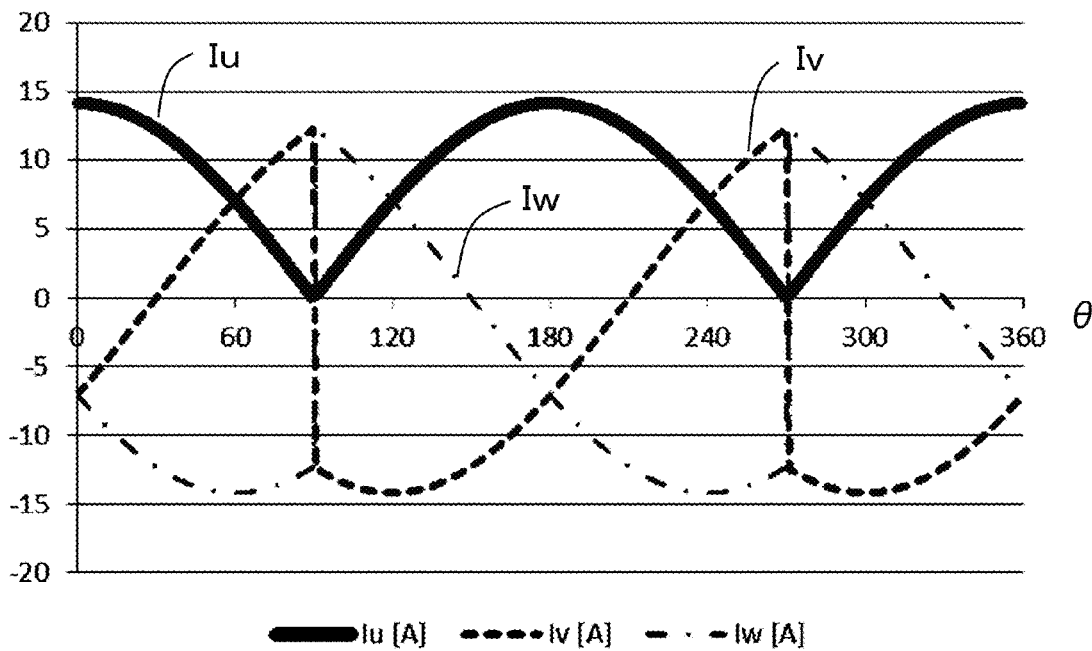
FIG. 26  SHUTOFF STATE OF 20U
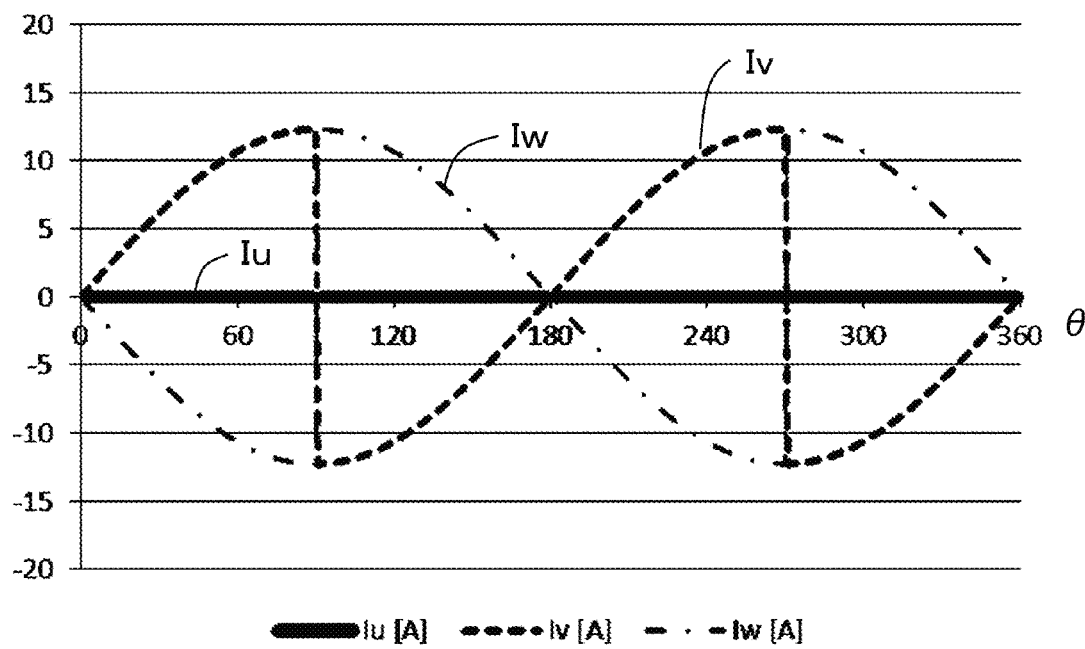

| ELECTRICAL ANGLE [deg] | i=1 U PHASE HIGH POTENTIAL SIDE | i=2 V PHASE HIGH POTENTIAL SIDE | i=3 W PHASE HIGH POTENTIAL SIDE |
|---|---|---|---|
| 0~30 | Id*>0 | Id*<0 | Id*<0 |
| 30~60 | Id*>0 | Id*>0 | Id*<0 |
| 60~90 | Id*>0 | Id*>0 | Id*<0 |
| 90~120 | Id*<0 | Id*>0 | Id*<0 |
| 120~150 | Id*<0 | Id*>0 | Id*<0 |
| 150~180 | Id*<0 | Id*>0 | Id*>0 |
| 180~210 | Id*<0 | Id*>0 | Id*>0 |
| 210~240 | Id*<0 | Id*<0 | Id*>0 |
| 240~270 | Id*<0 | Id*<0 | Id*>0 |
| 270~300 | Id*>0 | Id*<0 | Id*>0 |
| 300~330 | Id*>0 | Id*<0 | Id*>0 |
| 330~360 | Id*>0 | Id*<0 | Id*<0 |

| ELECTRICAL ANGLE [deg] | i=1<br>U PHASE LOW POTENTIAL SIDE | i=2<br>V PHASE LOW POTENTIAL SIDE | i=3<br>W PHASE LOW POTENTIAL SIDE |
|---|---|---|---|
| 0~30 | Id*<0 | Id*>0 | Id*>0 |
| 30~60 | Id*<0 | Id*<0 | Id*>0 |
| 60~90 | Id*<0 | Id*<0 | Id*>0 |
| 90~120 | Id*>0 | Id*<0 | Id*>0 |
| 120~150 | Id*>0 | Id*<0 | Id*>0 |
| 150~180 | Id*>0 | Id*<0 | Id*<0 |
| 180~210 | Id*>0 | Id*<0 | Id*<0 |
| 210~240 | Id*>0 | Id*>0 | Id*<0 |
| 240~270 | Id*>0 | Id*>0 | Id*<0 |
| 270~300 | Id*<0 | Id*>0 | Id*<0 |
| 300~330 | Id*<0 | Id*>0 | Id*<0 |
| 330~360 | Id*<0 | Id*>0 | Id*>0 |

CONTROLLER FOR ROTARY MACHINE AND ELECTRIC POWER STEERING APPARATUS

CROSS REFERENCE TO RELATED APPLICATIONS

This application is a National Stage of International Application No. PCT/JP2016/083682 filed Nov. 14, 2016.

TECHNICAL FIELD

The present disclosure relates to a controller for a rotary machine and, an electric power steering apparatus therewith.

BACKGROUND ART

The electric power steering apparatus described, in the following PLT 1 drives the switching devices which drive the rotary machine at start-up, and verifies that the drive of the switching devices stops by the cutoff signal outputted from the microcomputer for check, by using the terminal voltages of the rotary machine.

CITATION LIST

Patent Literature

PLT 1: JP 5496257 B

SUMMARY OF INVENTION

Technical Problem

However, the electric power steering apparatus disclosed in PLT 1 verifies the switching devices of the bridge circuit one by one so that the motor may not rotate and the handle may not rotate during the check at start-up. Since verifying one by one, in order to determine the shutoff of the switching device, it is necessary to provide the detection means of the terminal voltages of the rotary machine.

Thus, it is desired to provide a controller for a rotary machine which can simplify a configuration required for checking the shutoff function of the switching device, and an electric power steering apparatus therewith.

Solution to Problem

A controller for a rotary machine according to the present disclosure includes:

an inverter that is provided with a plurality of switching devices and performs power conversion between a DC power source and the rotary machine having m-phase windings (m is a natural number of greater than or equal to two); and a control circuit that controls on/off of the switching devices, wherein the inverter is provided with m sets of a series circuit where a high potential side switching device connected to a positive electrode side of a DC power source and a low potential side switching device connected to a negative electrode side of the DC power source are connected in series and where a connection node of series connection is connected to the winding of corresponding phase, corresponding to respective phase of the m-phase, wherein the control circuit is provided with a current command calculation unit that calculates current commands which flow into the windings, a voltage command calculation unit that calculates voltage commands applied to the windings based on the current commands, a switching signal generation unit that generates switching signals which turn on and off the switching devices based on the voltage commands, a device shutoff unit that forcibly switches each of the switching devices to a shutoff state, and a shutoff failure determination unit that determines failure of the device shutoff unit, wherein the shutoff failure determination unit determines one phase in the m-phase as a diagnosis object phase, performs a high potential side forcible shutoff or a low potential side forcible shutoff, and determines failure of the device shutoff unit based on a detection value of current or voltage when performing the high potential side forcible shutoff or the low potential side forcible shutoff, wherein the high potential side forcible shutoff is a shutoff that forcibly shuts off the high potential side switching device of the diagnosis object phase by commanding the device shutoff unit, in a drive state where a current which flows through the winding of the diagnosis object phase becomes positive which is a direction flowing into the winding from the inverter when the switching device is not forcibly shut off, and wherein the low potential side forcible shutoff is a shutoff that forcibly shuts off the low potential side switching device of the diagnosis object phase by commanding the device shutoff unit, in a drive state where a current which flows through the winding of the diagnosis object phase becomes negative which is a direction flowing into the inverter from the winding when the switching device is not forcibly shut off.

An electric power steering apparatus according to the present disclosure includes:

the controller for the rotary machine, the rotary machine, and a driving force transmission mechanism which transmits a driving force of the rotary machine to a vehicle steering device.

Advantage of Invention

According to the controller for the rotary machine and the electric power steering apparatus of this disclosure, when the high potential side switching device of the diagnosis object phase is shut off in the state where positive current flowed into the winding of the diagnosis object phase, current or voltage changes. Therefore, failure of the device shutoff unit can be determined based on the detection value of current or voltage when the high potential side forcible shutoff is performed. When the low potential side switching device of the diagnosis object phase is shut off in the state where negative current flowed into the winding of the diagnosis object phase, current or voltage changes. Therefore, failure of the device shutoff unit can be determined based on the detection value of current or voltage when the low potential side forcible shutoff s performed. Therefore, using the configuration of the control circuit which makes the rotary machine output torque, failure of the device shutoff unit can be determined, and the configuration required for checking the shutoff function of the switching device can be simplified.

BRIEF DESCRIPTION OF THE DRAWINGS

FIG. 6 is a figure explaining the combination of on and off of the switching devices in the drive state before shutoff according to Embodiment 1 of the present disclosure;

FIG. 25 is a time chart explaining the three-phase currents in the drive state before shutoff according to Embodiment 2 of the present disclosure;

FIG. 26 is a time chart explaining the three-phase currents in the shutoff state according to Embodiment 2 of the present disclosure;

DETAILED DESCRIPTION OF THE EMBODIMENTS

1. Embodiment 1

Figure 1:
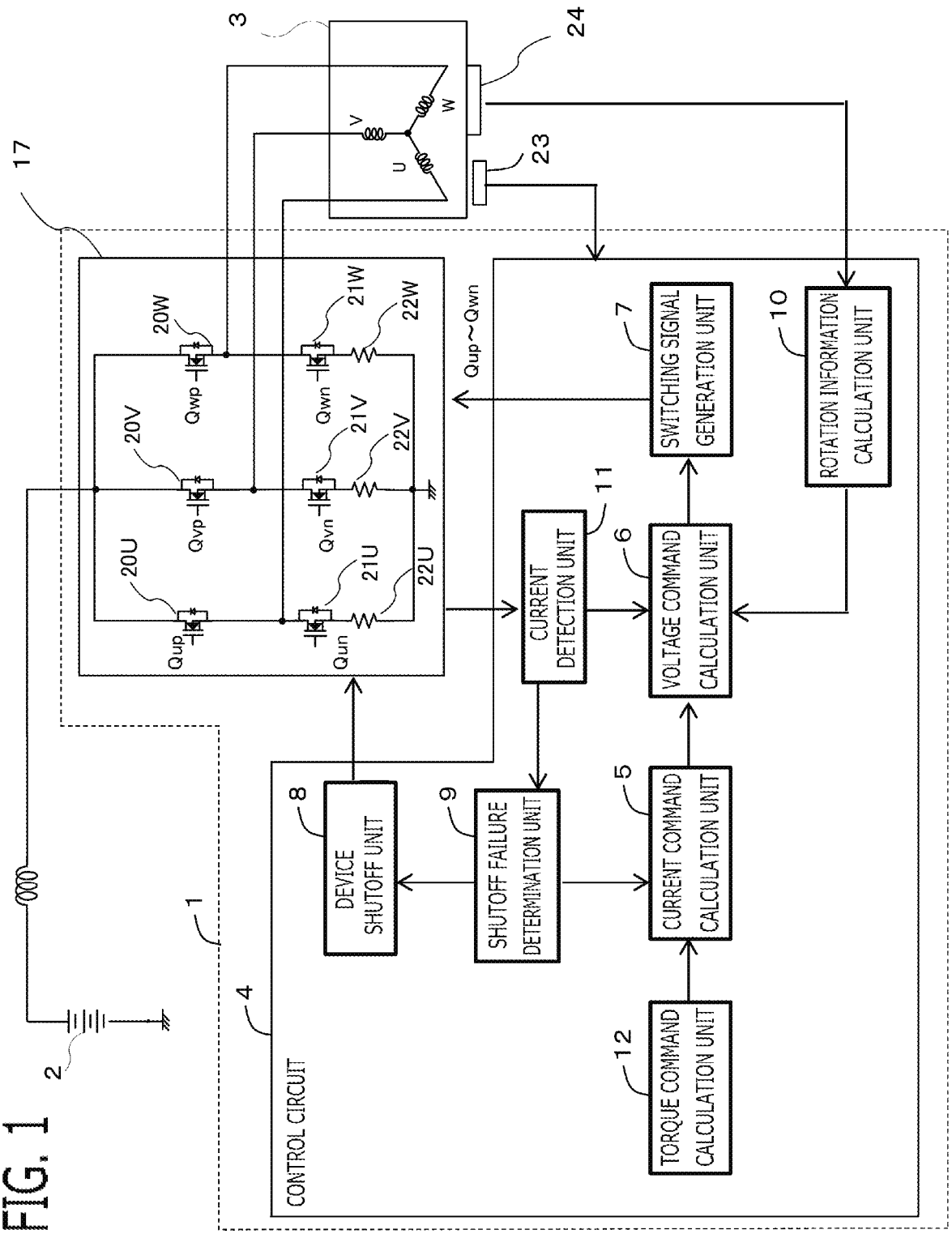
FIG. 1 is a schematic configuration diagram of the rotary machine and the controller for the rotary machine according to Embodiment 1 of the present disclosure.

A controller 1 for a rotary machine 3 (hereinafter, referred to simply as the controller 1) according to Embodiment 1 will be explained with reference to drawings. FIG. 1 is a schematic configuration diagram of the rotary machine 3 and the controller 1 according to the present embodiment. The controller 1 is provided with an inverter 17 that is provided with a plurality of switching devices and performs power conversion between the rotary machine 3 and the DC power source 2, and a control circuit 4 that controls on/off the switching devices.

1-1. Rotary Machine 3 and Inverter 17

The rotary machine 3 has m-phase windings (m is a natural number of greater than or equal to two). In the present embodiment, m=3, and a first phase winding, a second phase winding, and a third phase winding are provided. In the following, the first phase is referred to as U phase, the second phase is referred to as V phase, and the third phase is referred to as W phase. The three-phase windings are connected by a star connection.

The rotary machine 3 is a permanent magnet type synchronous rotary machine which has a stator having the three-phase windings, and a rotor having permanent magnets. The rotary machine 8 may be an induction machine which does not have a permanent magnet in the rotor, or a field winding type synchronous machine which has an electromagnet in the rotor. The three-phase windings may be connected by a delta connection.

The rotor is provided with an angle detection sensor 24 for detecting a rotational angle of the rotor. As the angle detection sensor 24, a position detector, such as a Hall element, a TMR element, a GMR element, and a resolver, or a rotation detector, such as an electromagnetic type, a magneto electric type, and a photoelectric type is used. An output signal of the angle detection sensor 24 is inputted into the control circuit 4.

Figure 2:
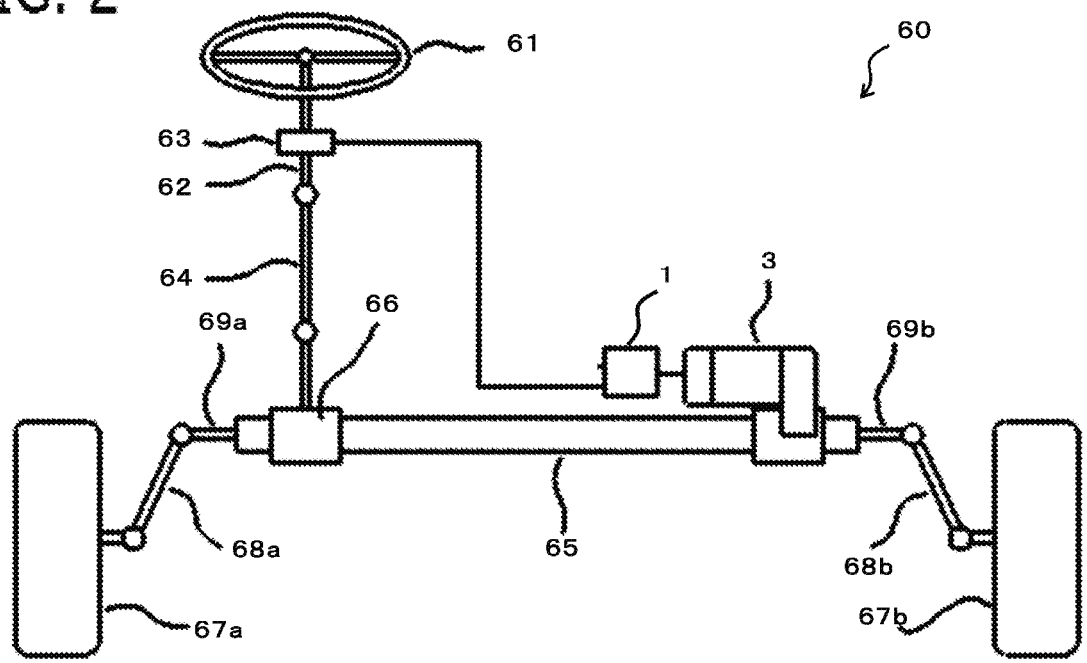
FIG. 2 is a schematic configuration diagram of the electric power steering apparatus according to Embodiment 1 of the present disclosure.

In the present embodiment, as shown in FIG. 2, the rotary machine 3 and the controller 1 are built into electric power steering apparatus 60. That is to say, the rotary machine 3 is a rotary machine for driving the electric power steering apparatus which assists a steering wheel torque of a vehicle steering device; and the controller 1 is a controller for the electric power steering apparatus 60. A handle 61 which a driver operates is connected with a steering shaft 62. A torque sensor 63 which detects a steering force of the driver is attached to the steering shaft 62. The steering shaft 62 is connected with a pinion gear 66 in a rack shaft 65 via an intermediate shaft 64. Knuckle arms 68a and 68b of front wheels 67a and 67b which are steering control wheels are connected to tie rods 69a and 69b connected with the rack shaft 65. The front wheels 67a and 67b are steered, when a motion of the rack shaft 65 transmits to the front wheels 67a and 67b through the tie rods 69a and 69b and the steering knuckle arms 68a and 68b. The rack shaft 65 is connected with the rotary machine 3 via gears, and a rotational driving force of the rotary machine 3 is a driving force for driving the rack shaft 65.

The inverter 17 is a DC/AC conversion device that performs electric power conversion between the DC power source 2 and the rotary machine 3. As shown in FIG. 1, the inverter 17 is provided with three sets of a series circuit (leg) where a high potential side switching device connected to a positive electrode side of the DC power source 2 and a low potential side switching device connected to a negative electrode side of the DC power source 2 are connected in series, corresponding to respective phase of three-phase. The connection node connected in series between the high potential side switching device and the low potential side switching device is connected to the winding of the corresponding phase. Specifically, the inverter 17 is provided with the series circuit of U phase where the U phase high potential side switching device 20U and the U phase low potential side switching device 21O are connected in series, the series circuit of V phase where the V phase high potential side switching device 20V and the V phase low potential side switching device 21V are connected in series, and the series circuit of W phase where the W phase high potential side switching device 20W and the W phase low potential side switching device 21W were connected in series.

A switching device in which a diode is connected in inverse parallel is used for the each switching device. An IGBT (Insulated Gate Bipolar Transistor), a bipolar transistor, a MOSFET (Metal Oxide Semiconductor Field Effect Transistor), and the like are used for the each switching device. A switching signal Qup to Qwn outputted from the control circuit 4 is inputted into a gate terminal of the each switching device; and the each switching device is turned on and off.

A shunt resistance 22U, 22V, 22W as the current sensor 22 is provided in the series circuit of each phase, respectively. The both-ends potential difference of the shunt resistance 22U, 22V, 22W of each phase is inputted into the control circuit 4. The shunt resistance 22U, 22V, 22W of each phase is connected to the negative electrode side of the low potential side switching devices 21U, 21V, 21W of each phase in series. The shunt resistance 22U, 22V, 22W of each phase may be connected to the positive electrode side of the high potential side switching devices 20U, 20V, 20W of each phase in series. Alternatively, as the current sensor 22, a current sensor which detects current flowing through a connection wire between the winding of each phase and the inverter 17 may be provided. A voltage sensor 23 which detects voltage applied to each winding is provided.

The DC power source 2 outputs a DC voltage Vdc to the inverter 17. The DC power sources 2 may be any apparatus which outputs DC voltage, such as a battery, a DC-DC converter, a diode rectifier, and a PWM rectifier.

1-2. Control Circuit 4

Figure 3:
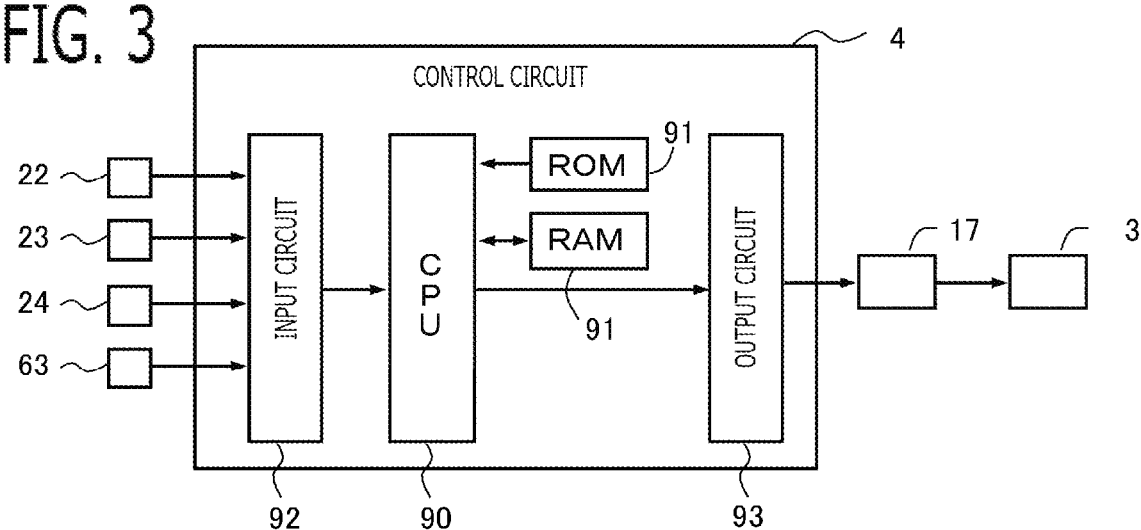
FIG. 3 is a hardware configuration diagram of the control circuit according to Embodiment 1 of the present disclosure.

The control circuit 4 is a control circuit which controls the rotary machine 3 by controlling the inverter 17. As shown in FIG. 1, the control circuit 4 is provided with functional parts of a torque command calculation unit 12, a current command calculation unit 5, a voltage command calculation unit 6, a switching signal generation unit 7, a device shutoff unit 8, a shutoff failure determination unit 9, a rotation information calculation unit 10, a current detection unit 11, and the like. Respective control units 5 to 12 and the like provided in the control circuit 4 are realized by processing circuits included in the control circuit 4. Specifically, as shown in FIG. 3, the control circuit 4 is provided, as the processing circuits, with an arithmetic processor (computer) 90 such as a CPU (Central Processing Unit) and a DSP (Digital Signal Processor), storage apparatuses 91 which exchange data with the arithmetic processor 90, an input circuit 92 which inputs external signals to the arithmetic processor 90, an output circuit 93 which outputs signals from the arithmetic processor 90 to the outside, and the like. As the storage apparatuses 91, there are provided a PAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads such as the switching devices, and is provided with a driving circuit and the like for outputting a control signal from the calculation processor 90. In the present embodiment, the input circuit 92 is connected with the current sensor 22, the voltage sensor 23, the angle detection sensor 24, the torque sensor 63, and the like. The output circuit 93 is connected with the inverter 17 (the switching devices or a gate driving circuit of the switching devices).

Then, the arithmetic processor 90 runs software items (programs) stored in the storage apparatus 91 such as a ROM and collaborates with other hardware devices in the control circuit 4, such as the storage apparatus 91, the input circuit 92, and the output circuit 93, so that the respective functions of the control units 5 to 12 included in the control circuit 4 are realized. Setting data utilized in the control units 5 to 12 are stored, as part of software items (programs), in the storage apparatus 91 such as a ROM. Each function of the control circuit 4 will be described in detail below.

1-2-1. Basic Configuration of Control Circuit 4

<Rotation Information Calculation Unit 10>

The rotation information calculation unit 10 detects rotation information of the rotary machine 3. The rotation information calculation unit 10 detects an electrical angle $\theta$ and electrical angle speed of the rotor, based on the output signal of the angle detection sensor 24 provided in the rotary shaft of the rotor.

<Torque Command Calculation Unit 12>

The torque command calculation unit 12 calculates a torque command to be output from the rotary machine 3. In the present embodiment, the torque command calculation unit 12 calculates, as the torque command, an assist torque which assists the steering wheel torque, based on the steering wheel torque detected based on the output signal of the torque sensor 63 and the like.

<Current Command Calculation Unit 5>

The current command calculation unit 5 calculates current commands which flow into the three-phase windings. In the present embodiment, the current command calculation unit 5 performs dq-axis current control that calculates a d-axis current command Id* and a q-axis current command Iq*, in which currents flowing into the three-phase windings are expressed in a dq-axis rotating coordinate system. The dq-axis rotational coordinate is a rotational coordinate which consists of a d-axis defined in a magnetic flux direction of the rotor of the rotary machine 3 and a q-axis defined in a direction advanced to the d-axis by $\pi/2$ in the electrical angle. In the present embodiment, the magnetic flux direction of the rotor is a direction of the N pole of the permanent magnet provided in the rotor. The electrical angle $\theta$ is an advance angle of the d-axis on the basis of the U phase (first phase) winding. That is to say, when the d-axis position coincides with position of the U phase winding, the electrical angle $\theta$ becomes 0 degree.

The current command calculation unit 5 calculates the d-axis current command Id* and the q-axis current command Iq* which make the rotary machine 3 output a torque of the torque command calculated by the torque command calculation unit 12, when performing normal control that does not perform shutoff failure determination described below. The current command calculation unit 5 calculates the dq-axis current commands Id*, Iq* according to a current vector control methods, such as maximum torque current control, magnetic flux weakening control, Id-0 control, and maximum torque magnetic flux control, when performing the normal control.

On the other hand, the current command calculation unit 5 sets the d-axis current command Id* and the q-axis current command Iq* for the shutoff failure determination, when performing the shutoff failure determination. In the present embodiment, the dq-axis current commands Id*, Iq* for the shutoff failure determination are commanded from the shutoff failure determination unit 9. But, the current command calculation unit 5 may set the dq-axis current commands Id*, Iq* for the shutoff failure determination.

<Current Detection Unit 11>

The current detection unit 11 detects three-phase currents Iu, Iv, Iw which flow into the respective phase windings of the rotary machine 3 from the inverter 17, based on the output signal of the current sensor 22. The current detection unit 11 converts the three-phase currents Iu, Iv, Iw which flow into the respective phase windings into a d-axis current Id and a q-axis current Iq which are expressed in the dq-axial rotation coordinate system, by performing a three-phase/two-phase conversion and a rotating coordinate conversion based on the electrical angle $\theta$.

<Voltage Command Calculation Unit 6>

The voltage command calculation unit 6 calculates voltage commands applied to the windings based on the current commands. In the present embodiment, when performing normal control that does not perform the shutoff failure determination, the voltage command calculation unit 6 performs current feedback control which changes a d-axis voltage command Vd* and a q-axis voltage command Vq*, in which voltage command signals applied to the rotary machine 3 are expressed in the dq-axis rotating coordinate system, by PI control and the like so that the dq-axis currents Id, Iq approach to the dq-axis current commands Id*, Iq*.

On the other hand, when performing the shutoff failure determination, the voltage command calculation unit 6 stops the current feedback control and sets the d-axis voltage command Vd* and the q-axis voltage command Vq* for the shutoff failure determination without using the current detection values, at the time of performing the forcible shutoff of the switching device. According to this configuration, even if the winding currents change by the shutoff of the switching device as described later, the output torque of the rotary machine 3 can be prevented from varying by the current feedback control.

In the present embodiment, even when performing the shutoff failure determination, before performing the forcible shutoff of the switching device, the voltage command calculation unit 6 performs the current feedback control and changes the dq-axis voltage commands Vd*, Vq* so that the dq-axis currents Id, Iq approaches the dq-axis current commands Id*, Iq* for the shutoff failure determination. Then, the voltage command calculation unit 6 holds the dq-axis voltage commands Vd*, Vq* calculated before performing the forcible shutoff of the switching device; and sets the held voltage commands to the dq-axis voltage commands Vd*, Vq*, when performing the forcible shutoff of the switching device. According to this configuration, by a simple method of holding the voltage commands before the shutoff, an influence of the current change by the shutoff can be prevented from appearing in the voltage commands after the shutoff. Herein, although the normal control which does not perform the shutoff failure determination is the current feedback control, a similar effect is obtained even though the normal control is feedforward control.

Alternatively, the voltage command calculation unit 6 may convert the d-axis current command Id* and the q-axis current command Iq* for the shutoff failure determination into the d-axis voltage command Vd* and the q-axis voltage command Vq* for the shutoff failure determination, when performing the shutoff failure determination. For example, the voltage command calculation unit 6 may set a value obtained multiplying a resistance R of the each phase winding to the d-axis current command Id* for the shutoff failure determination, to the d-axis voltage command Vd* for the shutoff failure determination, and may set a value obtained by multiplying the resistance R of the each phase winding to the q-axis current command Iq* for the shutoff failure determination, to the q-axis voltage command Vq* for the shutoff failure determination.

Then, the voltage command calculation unit 6 converts the dq-axis voltage commands Vd*, Vq* into three-phase voltage commands Vu*, Vv*, Vw* which are AC voltage commands to the respective three-phase windings, by performing a fixed coordinate conversion and a two-phase/three-phase conversion based on the electrical angle θ.

<Switching Signal Generation Unit 7>

Figure 7:
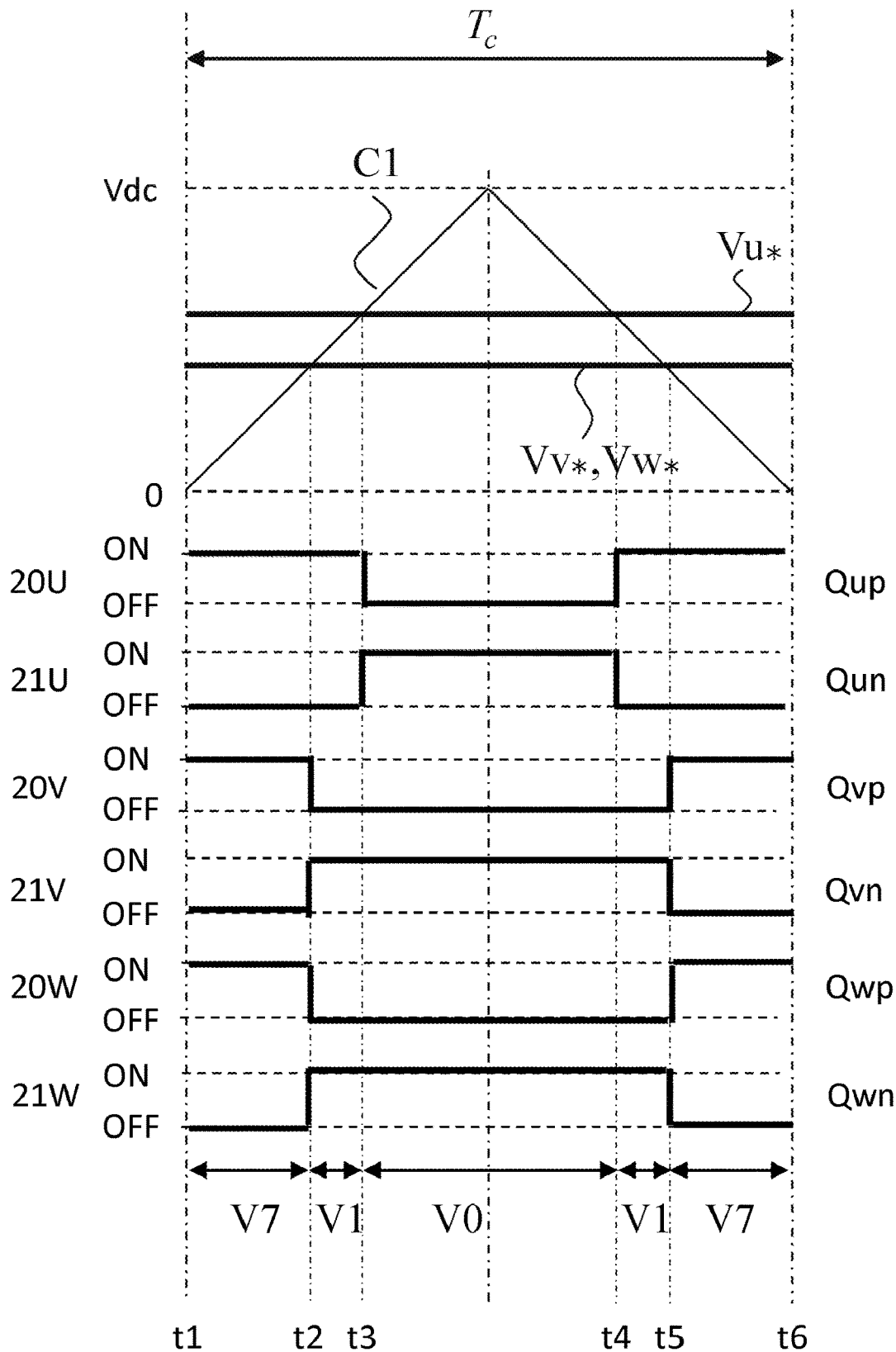
FIG. 7 is a time chart explaining the on/off operation of the switching devices in the drive state before shutoff according to Embodiment 1 of the present disclosure.

The switching signal generation unit 7 generates switching signals which turn on and off the switching devices based on the voltage commands. The switching signal generation unit 7 performs PWM (Pulse Width Modulation) control based on the three-phase voltage commands Vu*, Vv*, Vw*, and generates the switching signals Qup to Qwn which have respective pulse widths of duty ratios according to the three phase voltage commands Vu*, Vv*, Vw*. In the present embodiment, as shown in FIG. 7, the switching signal generation unit 7 compares each of the three-phase voltage commands with a carrier wave C1 (a triangular wave) which has an vibration width of the DC voltage Vdc of the DC power source 2 and vibrates at a carrier period Tc; and generates a switching signal of each phase which turns on the high potential side switching device and turns off the low potential side switching device, when the AC voltage command exceeds the carrier wave C1. The switching signal generation unit 7 outputs the switching signals Qup to Qwn to the inverter 17, and turns on and off each switching device of the inverter 17. The switching signals may be generated based on three-phase voltage commands obtained by modulating the three-phase voltage commands Vu*, Vv*, Vw* using well-known modulating methods, such as space vector modulation and two phase modulation.

<Device Shutoff Unit 8>

The device shutoff unit 8 is a failsafe mechanism which forcibly switches each switching device to a shutoff state. The device shutoff unit 8 forcibly switches the switching device corresponding to abnormal content to the shutoff state, when detecting abnormality based on various input signals. For example, when the current which flows through the switching device becomes abnormal, the device shutoff unit 8 forcibly switches the switching device whose current becomes abnormal to the shutoff state, and prevents abnormal torque from being outputted from the rotary machine 3. When performing shutoff failure determination described below, the device shutoff unit 8 forcibly switches the switching device related to a failure diagnosis object to the shutoff state, in accordance with a command of the shutoff failure determination unit 9.

The device shutoff unit 8 is provided with a shutoff circuit for the each switching device which forcibly shuts off the switching signal inputted into the gate terminal, and forcibly shuts off the each switching device, for example. The shutoff circuit is provided with a switching device for shutoff; and the device shutoff unit 8 forcibly switches the switching device to the shutoff state by turning on and off the switching device for shutoff.

1-2-2. Shutoff Failure Determination Unit 9

The shutoff failure determination unit 9 determines failure of the device shutoff unit 8. The shutoff failure determination unit 9 performs shutoff failure determination that determines one phase in three phases as a diagnosis object phase; commands the device shutoff unit 8 to forcibly shut off the high potential side or the low potential side switching device of the diagnosis object phase; and determines failure of the device shutoff unit 8 based on the detection value of current or voltage at the time of shutoff.

The shutoff failure determination unit 9 starts execution of the shutoff failure determination, when a preliminarily set determination execution condition is satisfied. In the present embodiment, the determination execution condition is satisfied, when the absolute value of torque (in this example, assist torque) of the rotary machine 3 at the time of the normal control is very small, such as in an initial check period at start-up.

The shutoff failure determination unit 9 commands the d-axis current command Id* and the q-axis current command Iq* for the shutoff failure determination to the current command calculation unit 5, after starting execution of the shutoff failure determination. The dq-axis current commands Id*, Iq* for the shutoff failure determination are preliminarily set to a value (in this example, a constant value) that the output torque of the rotary machine 3 does not become large too much. For example, the dq-axis current commands Id*, Iq* for the shutoff failure determination are preliminarily set to a value that the output torque of the rotary machine 3 becomes smaller than a mechanical loss torque applied to the rotary shaft of the rotor, or a value that causes minute rotation, in one or both before the shutoff and after the shutoff of the switching device.

Then, the shutoff failure determination unit 9 commands the device shutoff unit 8 to forcibly shut off the high potential side or the low potential side switching device of the diagnosis object phase, during a preliminarily set determination period after a preliminarily set waiting period elapses after commanding the dq-axis current commands Id*, Iq* for the shutoff failure determination. Then, the shutoff failure determination unit 9 determines failure of the device shutoff unit 8, based on change of current or voltage before and after the forcible shutoff of the switching device.

The shutoff failure determination unit 9 performs fail processing, when determining that the device shutoff unit 8 fails. The fail processing is informing processing of failure information to user, such as displaying of failure content to a display, and lighting of a fault lamp; and stopping or reducing processing of the output torque of the rotary machine 3 at the time of the normal control.

In the present embodiment, a case where the shutoff failure determination unit 9 performs a high potential side forcible shutoff that shuts off the high potential side switching device of the diagnosis object phase will be explained.

1-2-2-1. Principle of Shutoff Failure Determination

<When Current Which Flows Through the Winding of the Diagnosis Object Phase is Positive>

Figure 4:
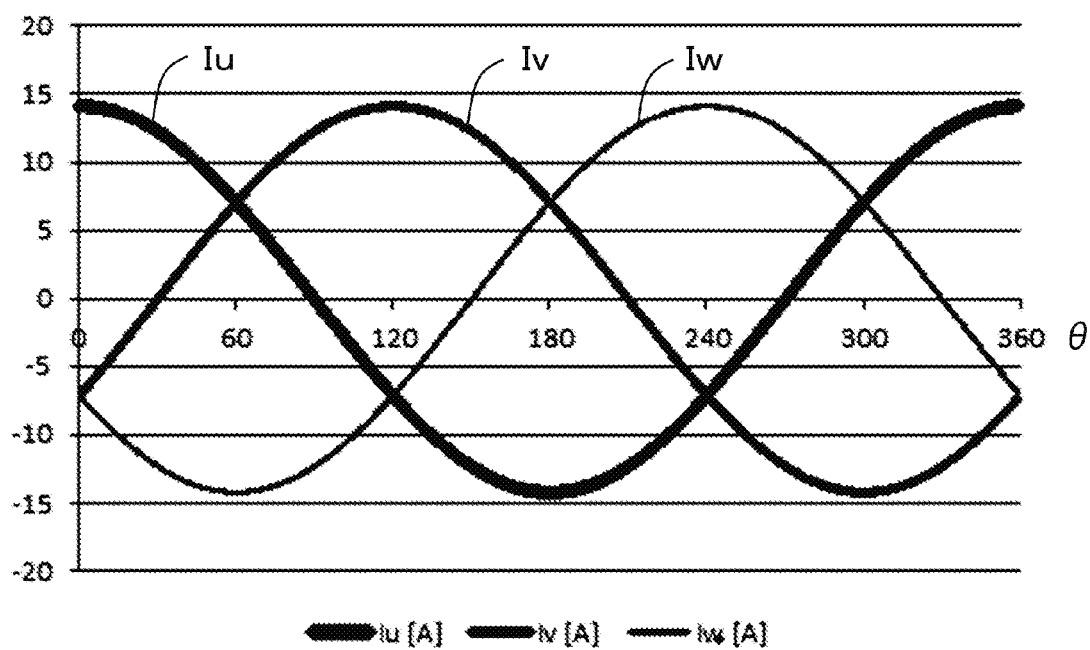
FIG. 4 is a time chart of the three-chase currents in the drive state before shutoff according to Embodiment 1 of the present disclosure.
Figure 5:
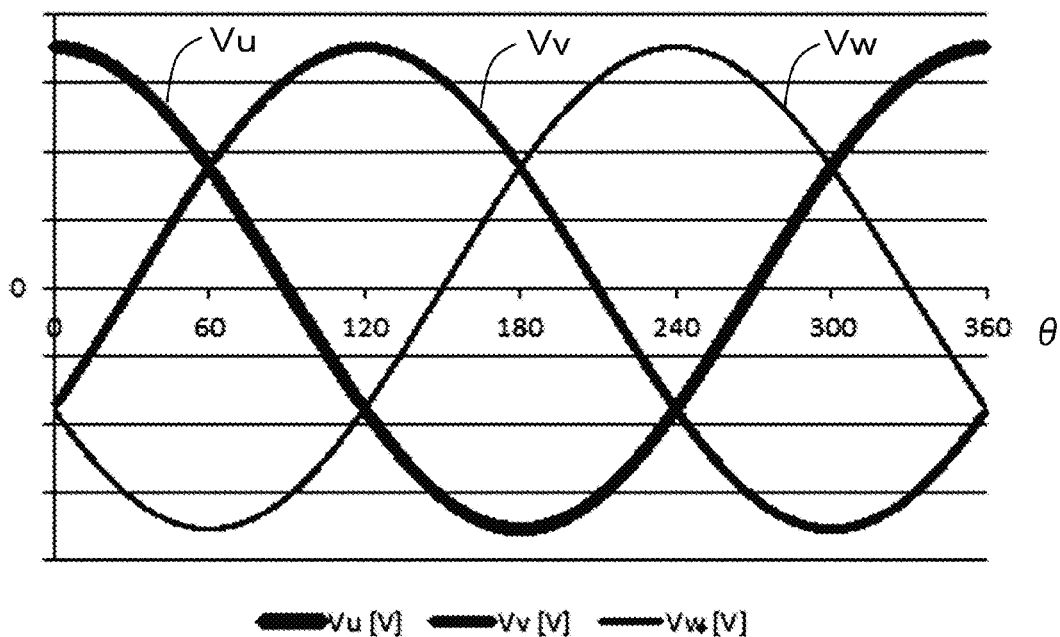
FIG. 5 is a time chart of the three-phase voltages in the drive state before shutoff according to Embodiment 1 of the present disclosure.

First, in a drive state where the current which flows through the winding of the diagnosis object phase becomes positive which is flowing direction from the inverter 17 to the winding, a principle of the shutoff failure determination will be explained. In a state where the rotary machine 3 is rotating before the shutoff, when the d-axis current flows 10 Arms and the q-axis current flows 0 Arms in the dq-axis rotating coordinate system, the three-phase currents Iu, Iv, Iw become as shown in FIG. 4. The horizontal axis is the electrical angle θ. Since the phase difference between voltage and current is almost 0 in minute rotation, the three-phase voltages Vu, Vv, Vw become as shown in FIG. 5. Herein, rms is root mean square, and expresses an effective value.

The three-phase voltages Vu, Vv, Vw before the shutoff can be expressed as an equation (1), using ON duty ratios Du, Dv, Dw of the high potential side switching signals of respective three phases, and the DC voltage Vdc of the DC power source 2. Herein, Du is a duty ratio of U phase, Dv is a duty ratio of V phase, and Dw is a duty ratio of W phase. (1-Du), (1-Dv), and (1-Dv) are the ON duty ratios of the low potential side switching signals of respective three phases. Therefore, the three-phase voltages Vu, Vw before the shutoff become voltages according to the three-phase voltage commands Vu*, Vv*, Vw*.

$$V_u = (D_u - 0.5)V_{dc}$$

$$V_v = (D_v - 0.5)V_{dc}$$

$$V_w = (D_W - 0.5)V_{dc} \qquad (1)$$

Since the high potential side switching device and the low potential side switching device of the same phase do not turn on at the same time, in the rive state before the shutoff, a combination of turning on and off of 20U to 21W is eight of voltage vectors V0 to V7 in FIG. 6.

In the drive state before the shutoff where the electrical angle θ is 0 degree and the U phase current Iu which is set to the diagnosis object phase becomes positive in FIG. 4 and FIG. 5, on/off operation of the switching devices 20U to 21W in the PWM carrier one period Tc is shown in FIG. 7. The voltage vector from time t1 to t2 is V7, the voltage vector from time t2 to t3 is V1, the voltage vector from time t3 to t4 is V0, the voltage vector from time t4 to t5 is V1, and the voltage vector from time t5 to t6 is V7.

Figure 8:
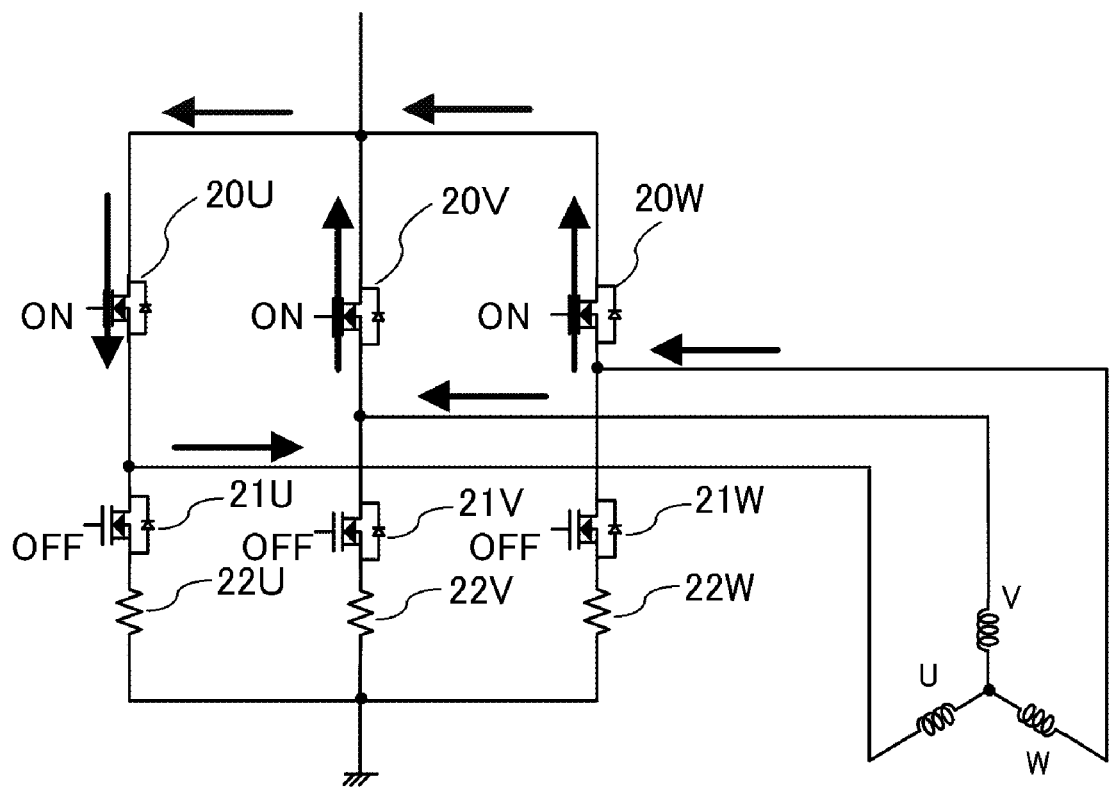
FIG. 8 is a circuit diagram explaining the current path in case of the voltage vector V1 in the drive state before shutoff according to Embodiment 1 of the present disclosure.

The flow path of the currents in the voltage vector V7 becomes as shown in FIG. 8. Since the three-phase low potential side switching devices 21U, 2W, 21W are off, there is no path which returns to the DC power source 2. Accordingly, after the current which passed through the U phase high potential side switching device 20U passes through the U phase winding, it passes through the V phase and W phase high potential side switching devices 20V, 20W via the V phase winding and the W phase winding, and then, it returns to the U phase high potential side switching device 20U again.

Figure 9:
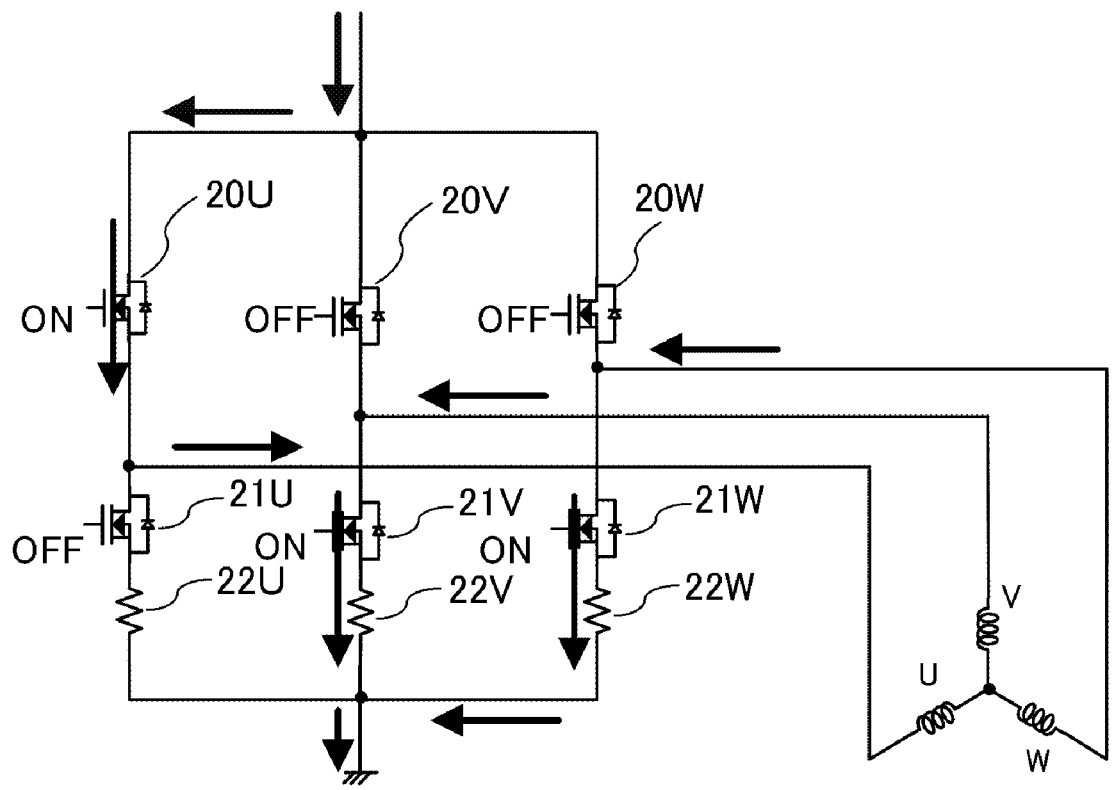
FIG. 9 is a circuit diagram explaining the current path in case of the voltage vector V1 in the drive state before shutoff according to Embodiment 1 of the present disclosure.

The flow path of the currents in the voltage vector V1 becomes as shown in FIG. 9. After the current supplied from the DC power source 2 flows into the U phase winding through the U phase high potential side switching device 20U, it passes through the V phase and W phase low potential side switching devices 21V, 21W via the V phase winding and the W phase winding, and then, it returns to the DC power source 2.

Figure 10:
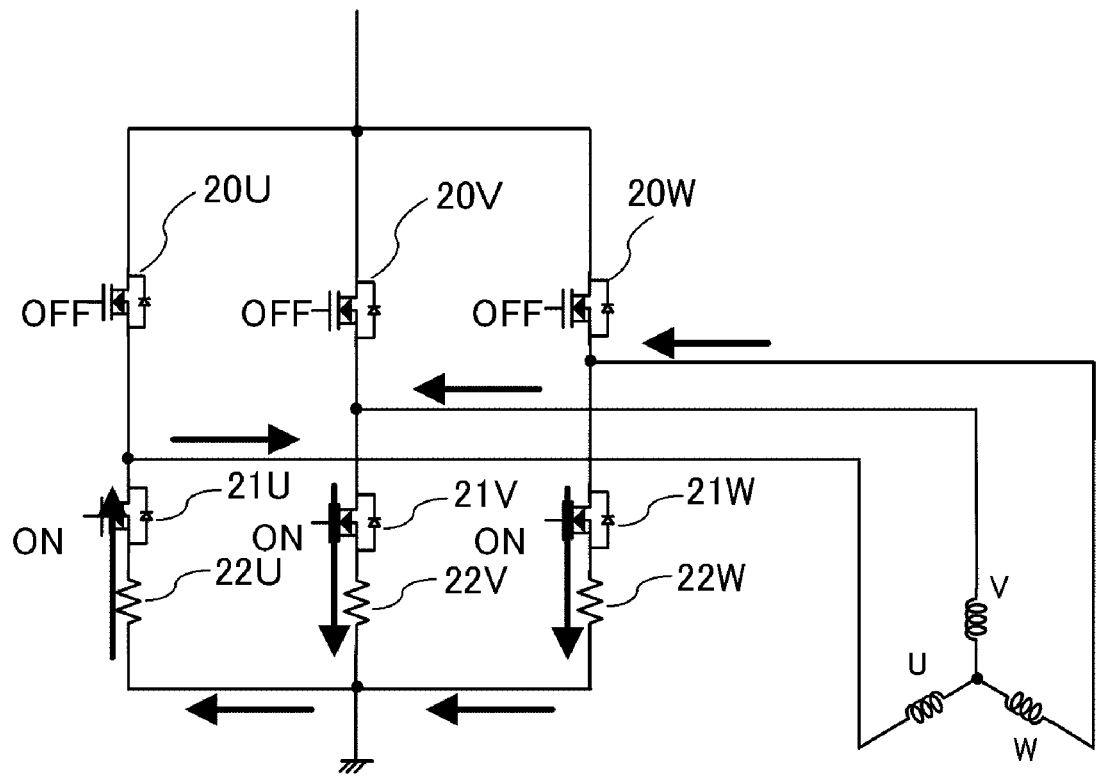
FIG. 10 is a circuit diagram explaining the current path in case of the voltage vector V0 in the drive state before shutoff according to Embodiment 1 of the present disclosure.

The flow path of the currents in the voltage vector V0 becomes as shown in FIG. 10. The three-phase high potential side switching devices 20U, 20V, 20W are off and the power source from the DC power source 2 is not supplied. Accordingly, after the current which passed through the U phase low potential side switching device 21U passes through the U phase winding, it passes through the V phase and W phase low potential side switching devices 21V, 21W, and then it returns to the U phase low potential side switching device 21U again.

Figure 11:
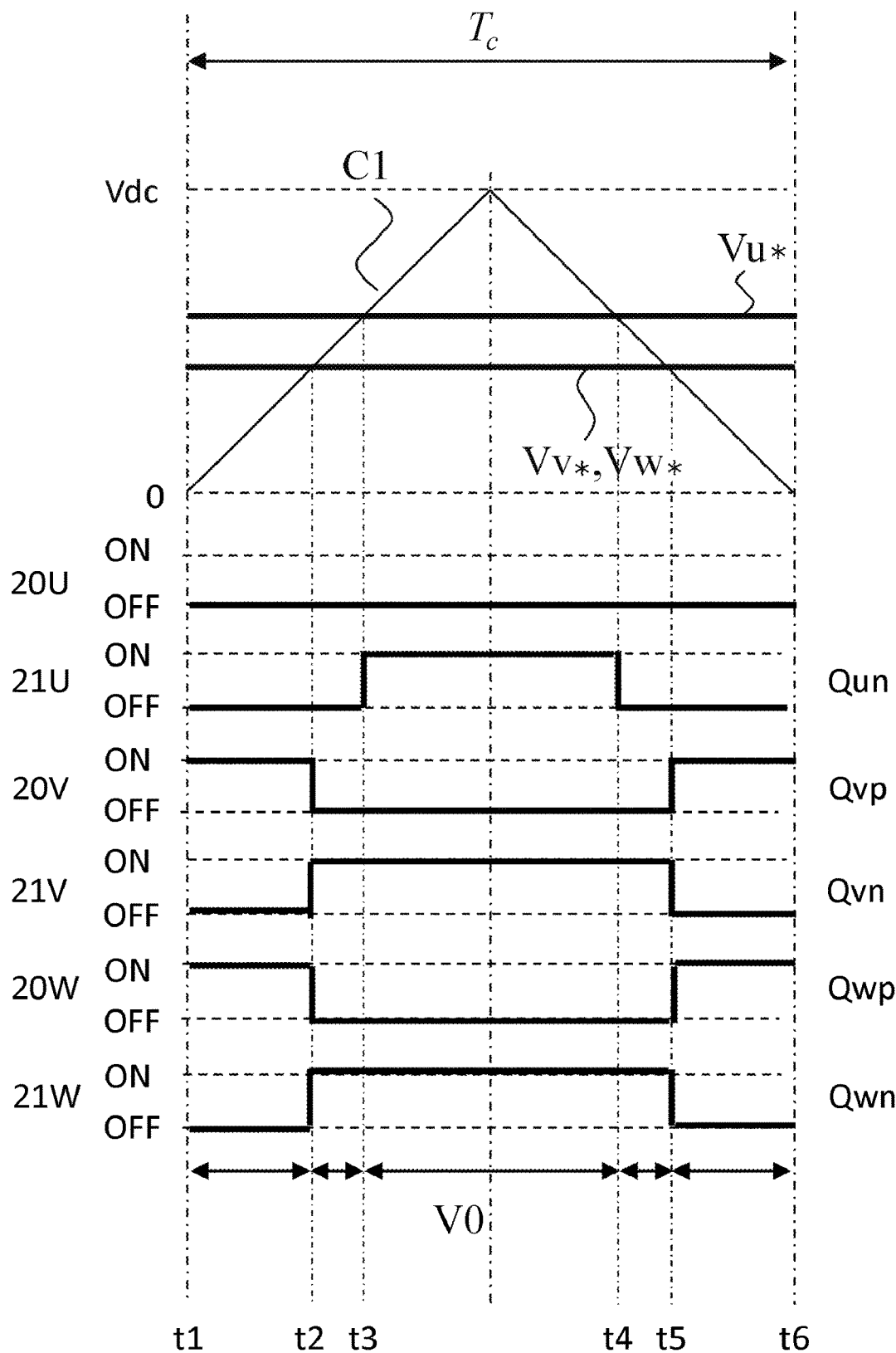
FIG. 11 is a time chart explaining the on/off operation of the switching devices in the shutoff state according to Embodiment 1 of the present disclosure.

When the U phase high potential side switching device 20U is switched from a drive state to a shutoff state by the device shutoff unit 8, the on/off operation of the switching devices 20U to 21W in the PWM carrier one period Tc becomes as shown in FIG. 11. At time other than time t3 to t4, it becomes a different voltage vector from the drive state before shutoff.

Figure 12:
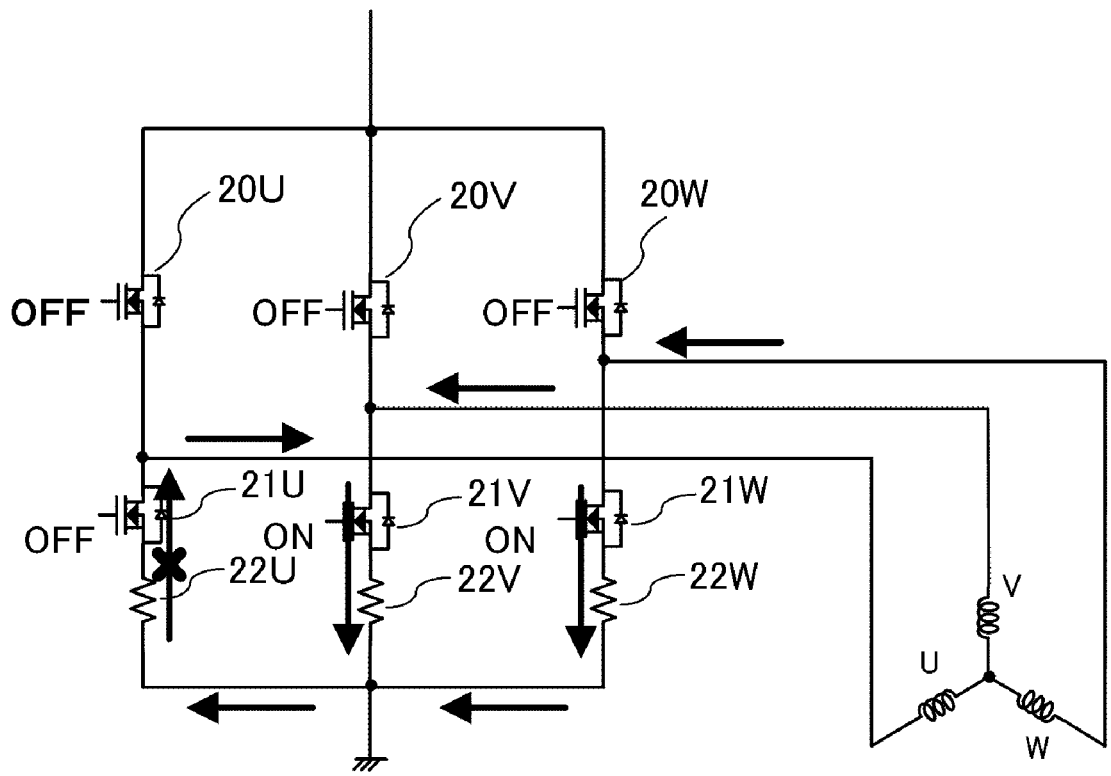
FIG. 12 is a circuit diagram explaining the current path in the shutoff state according to Embodiment 1 of the present disclosure.

Although the flow path of the currents from time t2 to t3 and from time t4 to t5 should become as shown in FIG. 12 if considering the conduction direction, since the U phase voltage Vu is larger than the V phase voltage Vv and the W phase voltage Vw, current cannot flow through the parasitic diode of the U phase low potential side switching device 21U, and current does not flow into the U phase winding.

Figure 13:
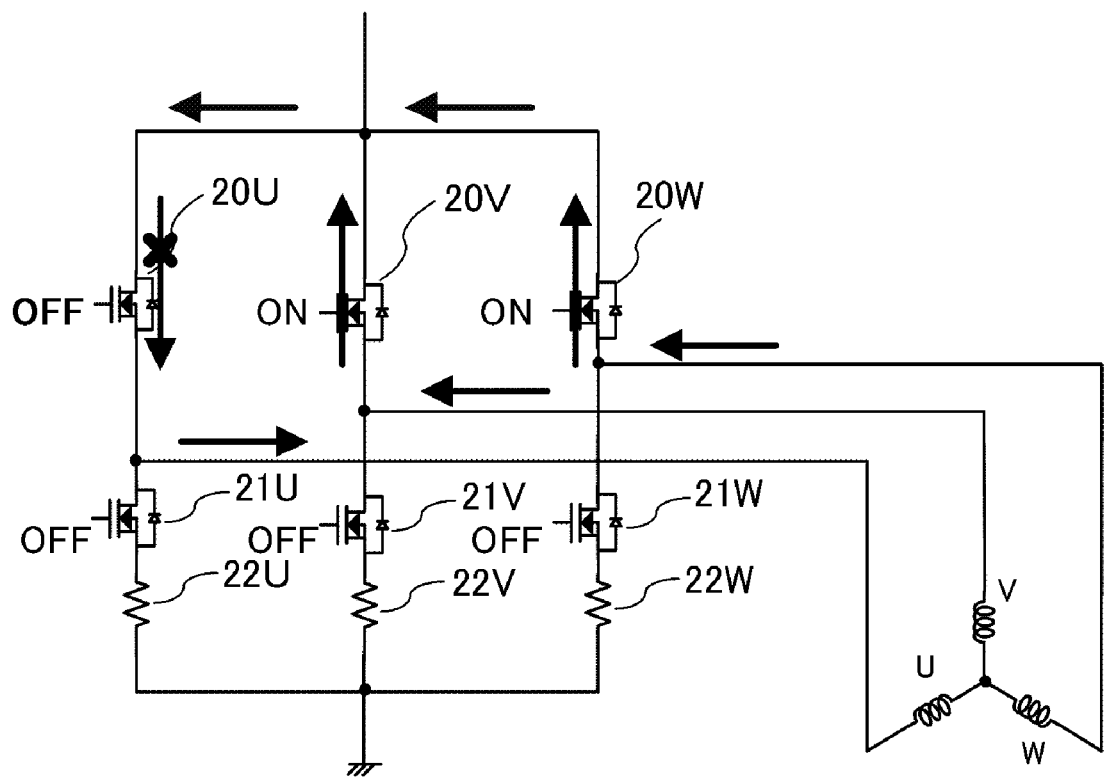
FIG. 13 is a circuit diagram explaining the current path in the shutoff state according to Embodiment 1 of the present disclosure.

Although the flow path of the currents from time t1 to t2 and from time t5 to t6 should become as shown in FIG. 13 if considering the conduction direction, since it is contrary to a current direction flowing through the parasitic diode, current cannot flow through the parasitic diode of the U phase high potential side switching device 20U, and current does not flow into the U phase winding.

Figure 14:
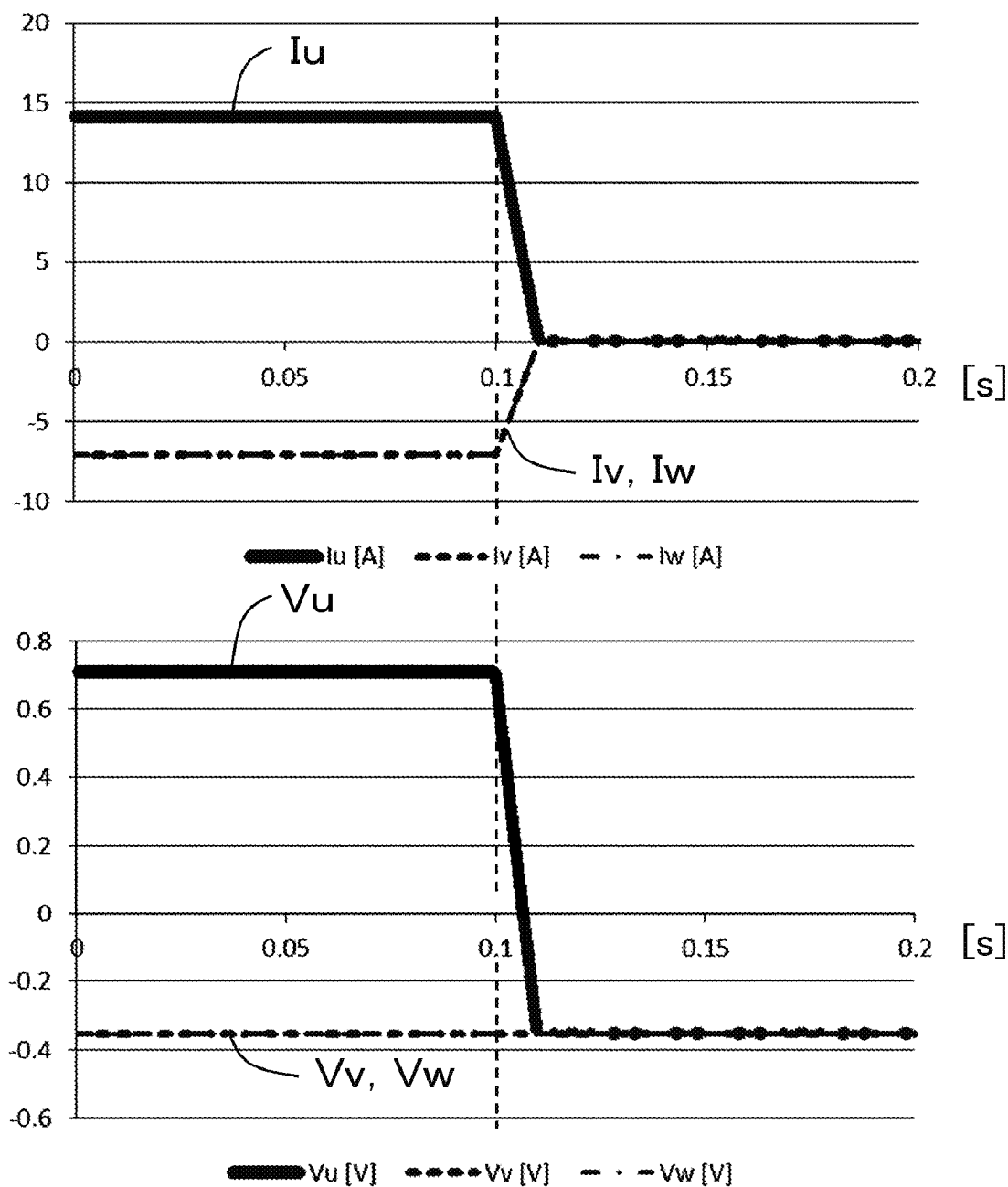
FIG. 14 is a time chart explaining change of the three-phase currents and the three-phase voltages when switching to the shutoff state according to Embodiment 1 of the present disclosure.

In this way, in the state where the electrical angle θ is 0 degree and the U phase current is positive in FIG. 4 and FIG. 5, FIG. 14 shows the Three-phase currents and the three-phase voltages when the U phase high potential side switching device 20U is switched from the drive state before shutoff to the shutoff state. By switching from the drive state before shutoff to the shutoff state at time 0.1 s, the three-phase currents Iu, Iv, Iw do not flow. The U phase voltage Vu after shutoff becomes a neutral point voltage which is an average value of the V phase voltage Vv and the W phase voltage Vw when shutoff is not performed. In this example, since the V phase voltage Vv and the W phase voltage Vw are equal, the U phase voltage Vu is equal to the V phase voltage Vv and the W phase voltage Vw.

Figure 15:
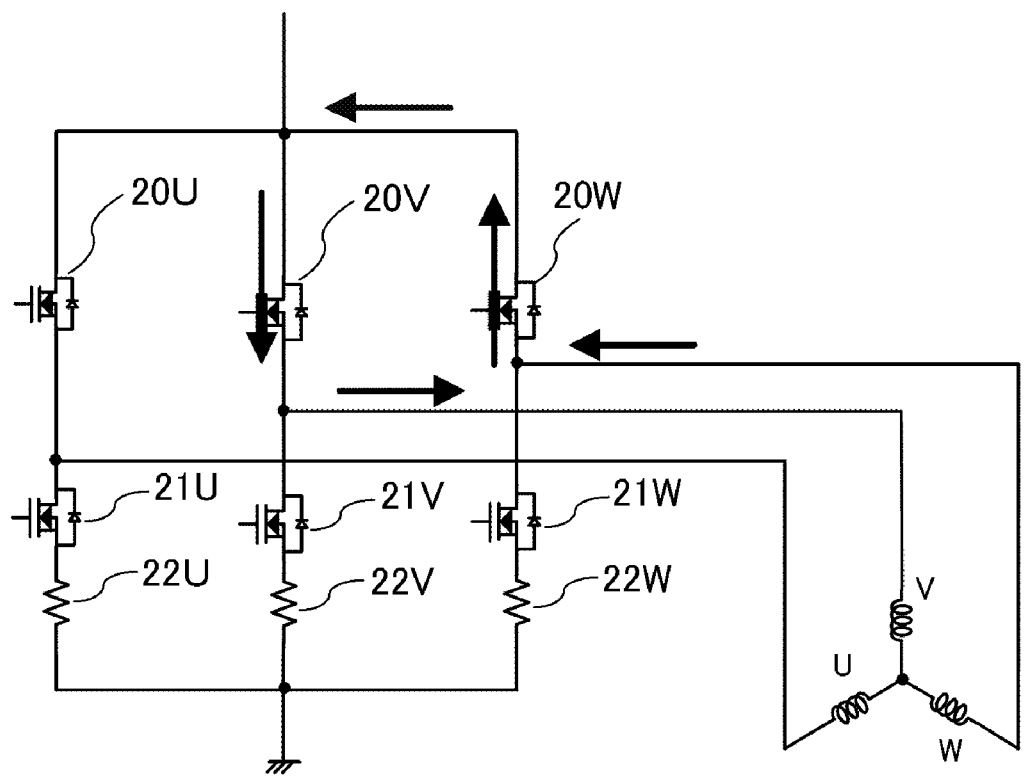
FIG. 15 is a circuit diagram explaining the current path in the shutoff state according to Embodiment 1 of the present disclosure.

When the V phase voltage Vv and the W phase voltage Vw are equal, current does not flow into the V phase winding and the W phase winding, but when there is a potential difference between the V phase voltage Vv and the W phase voltage Vw, current flows into the lower potential phase winding from the higher potential phase winding. As an example, when the V phase voltage Vv is higher than the W phase voltage Vw, as shown in FIG. 15, after the current which passed through the V phase high potential side switching device 20V passed through the W phase high potential side switching device 20W via the W phase winding from the V phase winding, it returns to the V phase high potential side switching device 20V, and current flows into the W phase winding from the V phase winding.

Figure 16:
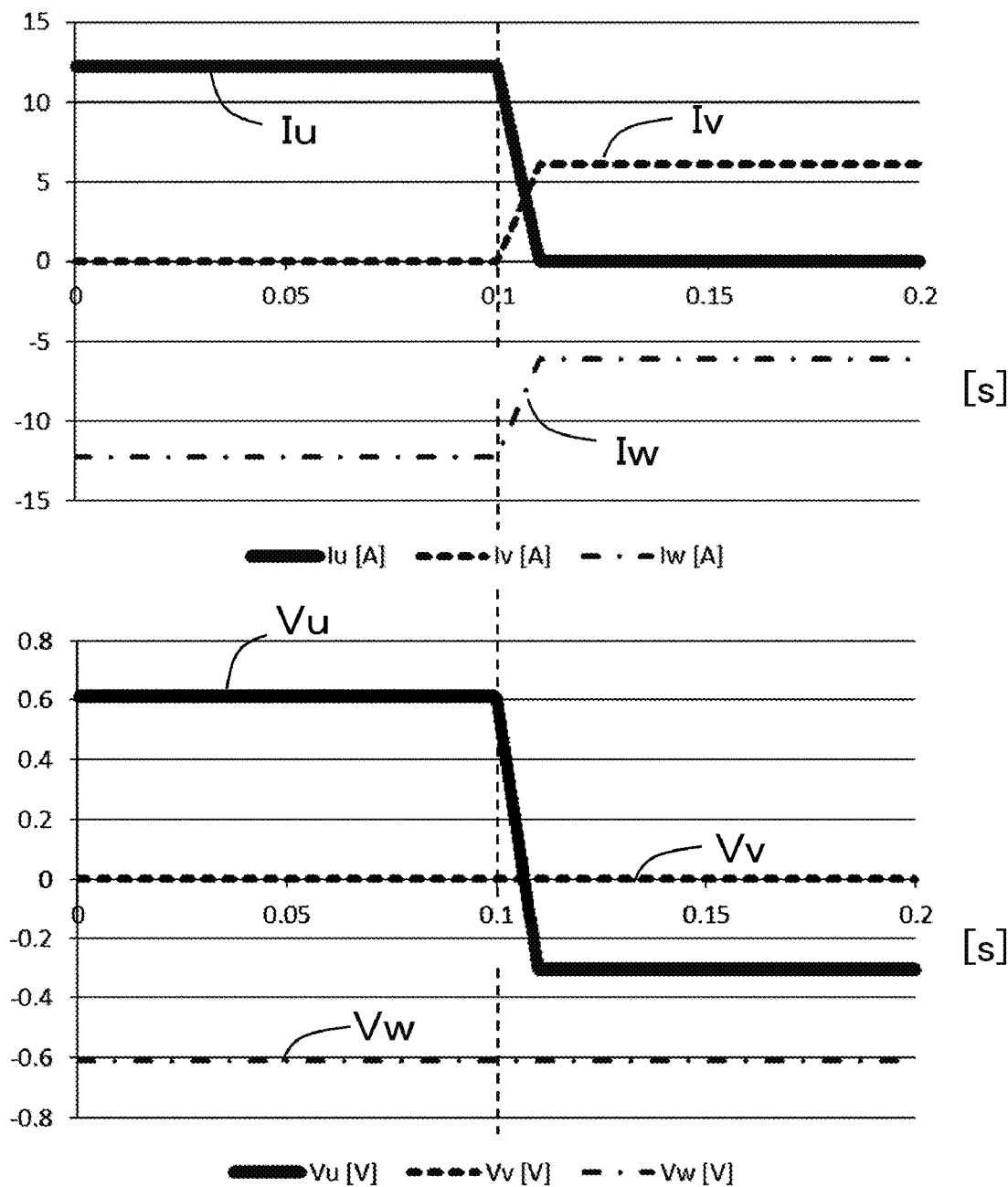
FIG. 16 is a time chart explaining change of the three-phase currents and the three-phase voltages when switching to the shutoff state according to Embodiment 1 of the present disclosure.

As an example in this case, in the state where the electrical angle θ is 30 degrees in FIG. 4 and FIG. 5, FIG. 16 shows the three-phase currents and the three-phase voltages when the U phase high potential side switching device 20U is switched from the drive state before shutoff to the shutoff state. By switching from the drive state before shutoff to the shutoff state at time 0.1 s, the U phase current Iu does not flow and current flows into the W phase winding (the W phase current Iw) from the V phase winding (the V phase current Iv). The U phase voltage Vu in the shutoff state is a middle voltage of the V phase voltage Vv and the W phase voltage Vw when the shutoff is not performed.

As explained above, as in the state where the electrical angle θ is 0 degree in FIG. 5, in the drive state where the U phase current Iu which is set to the diagnosis object phase becomes positive when the shutoff is not performed, when the U phase high potential side switching device 20U is switched to the shutoff state by the device shutoff unit 8, the U phase current Iu does not flow. Therefore, when the U phase current Iu which is set to the diagnosis object phase changes to 0 after the shutoff command, it can be determined that the U phase high potential side switching device 20U was shut off normally. When the U phase current Iu does not change to 0 after a shutoff command, it can be determined that it was not shut off normally but the device shutoff unit 8 of the U phase high potential side switching device 20U failed. Failure of the device shutoff unit 8 can be determined also by change of the V phase current Iv and the W phase current Iw, which are not the diagnosis object phase, after the shutoff command.

As described above, in the shutoff state of the U phase high potential side switching device 20U, the U phase voltage Vu becomes a middle voltage of the V phase voltage Vv and the W phase voltage Vw. Accordingly, the three-phase voltages Vu, Vv, Vw at the shutoff of the U phase high potential side switching device 20U can be represented as an equation (2), by using the ON duty ratios Du, Dv, Ow of the respective three phases high potential side switching signals and the DC voltage Vdc of the DC power source 2.

$$V_u = \left(\frac{D_v + D_w}{2} - 0.5\right)V_{dc} \quad (2)$$
$$V_v = (D_v - 0.5)V_{dc}$$
$$V_w = (D_w - 0.5)V_{dc}$$

Therefore, when shut off normally, the U phase voltage Vu which is set to the diagnosis object phase changes from the equation (1) when the shutoff is not performed to the equation (2) at the shutoff. On the other hand, when not shut off normally, the U phase voltage Vu does not change from the voltage according to the U phase voltage command Vu*. Regardless of whether or not it was shut off normally, the V phase voltage Vv and the W phase voltage Vw which are not the diagnosis object phase do not change from the voltages according to the voltage commands Vv*, Vw*. Therefore, in the drive state where the U phase current Iu which is set to the diagnosis object phase is positive when the shutoff is not performed, when the U phase voltage Vu changes from the voltage according to the U phase voltage command Vu* to the middle voltage of the V phase voltage Vv and the W phase voltage Vw which are not the diagnostic object after shutoff control, it can be determined that the U phase high potential side switching device 20U was shut off normally; and when the U phase voltage Vu is still the voltage according to the U phase voltage command Vu* and does not change to the middle voltage after shutoff control, it can be determined that it was not shut off normally but the device shutoff unit 8 of the U phase high potential side switching device 20U failed.

When shut off normally, the average value Vave of the three-phase voltages Vu, Vv, Vw change from the equation (3) which averaged the three-phase voltages Vu, Vv, Vw of the equation (1) when the shutoff is not performed, to the equation (4) which averaged the three-phase voltages Vu, Vv, Vw of the equation (2) at the shutoff. On the other hand, when not shut off normally, the average value Vave of the three-phase voltages Vu, Vv, Vw do not change from the average value Vave of the three-phase voltages Vu, Vv, Vw of the equation (3) when the shutoff is not performed.

$$V_{ave} = \left(\frac{D_u + D_v + D_w}{3} - 0.5\right)V_{dc} \quad (3)$$

$$V_{ave} = \left(\frac{D_v + D_w}{2} - 0.5\right)V_{dc} \quad (4)$$

Therefore, in the drive state where the U phase current Iu is positive when the shutoff is not performed, when the total value or the average value of the terminal voltages of the three-phase windings, or the voltage of the neutral point of the three-phase windings changes after shutoff control, it can be determined that the U phase high potential side switching device 20U was shut off normally; and when the total value or the average value of the terminal voltages of the three-phase windings, or the voltage of the neutral point of the three-phase windings does not change after shutoff control, it can be determined that it was not shut off normally but, the device shutoff unit 8 of the U phase high potential side switching device 20U failed.

<When Current Which Flows Through the Winding of the Diagnosis Object Phase is Negative>

Figure 17:
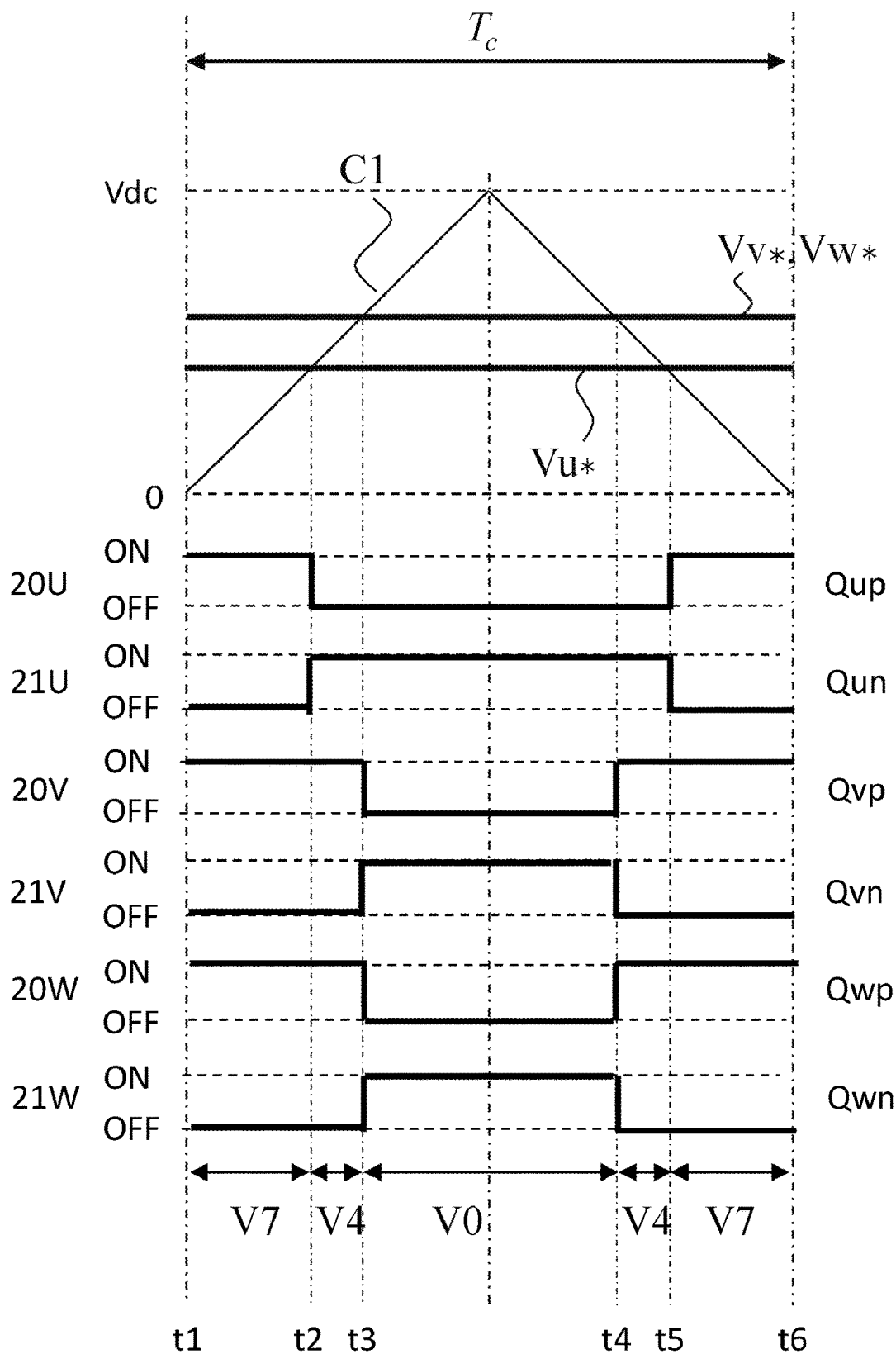
FIG. 17 is a time chart explaining the on/off operation of the switching devices in the drive state before shutoff according to Embodiment 1 of the present disclosure.

Next, a drive state where the current which flows through the winding of the diagnosis object phase becomes negative which is flowing direction from the winding to the inverter 17 will be explained. In the drive state before the shutoff where the electrical angle θ is 180 degrees and the U phase current Iu flowing through the U phase winding which is set to the diagnosis object phase becomes negative in FIG. 4 and FIG. 5, the on/off operation of the switching devices 20U to 21W in the PWM carrier one period Tc is shown in FIG. 17. The voltage vector from time t1 to t2 is V7, the voltage vector from time t2 to t3 is V4, the voltage vector from time t3 to t4 is V0, the voltage vector from time t4 to t5 is V4, and the voltage vector from time t5 to t6 is V7.

Figure 18:
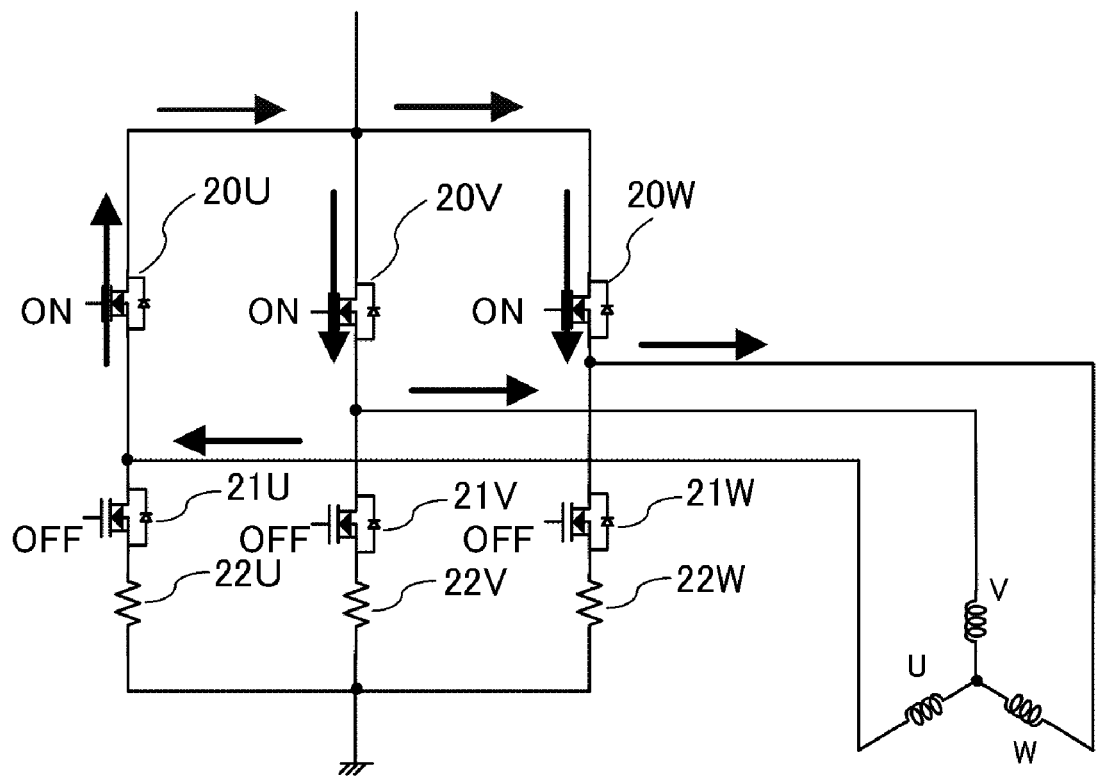
FIG. 18 is a circuit diagram explaining the current path in case of the voltage vector V7 in the drive state before shutoff according to Embodiment 1 of the present disclosure.

The flow path of the currents in the voltage vector V7 becomes as shown in FIG. 18. The three-phase low potential side switching devices 21U, 21V, 21W are off, there is no path which returns to the DC power source 2. Accordingly, after the current which passed through the V phase and W phase high potential side switching devices 20V, 20W pass through the V phase winding and the W phase winding, it passes through the U phase high potential side switching device 20U via the U phase winding, then, it returns to the V phase and W phase high potential side switching devices 20V, 20W again.

Figure 19:
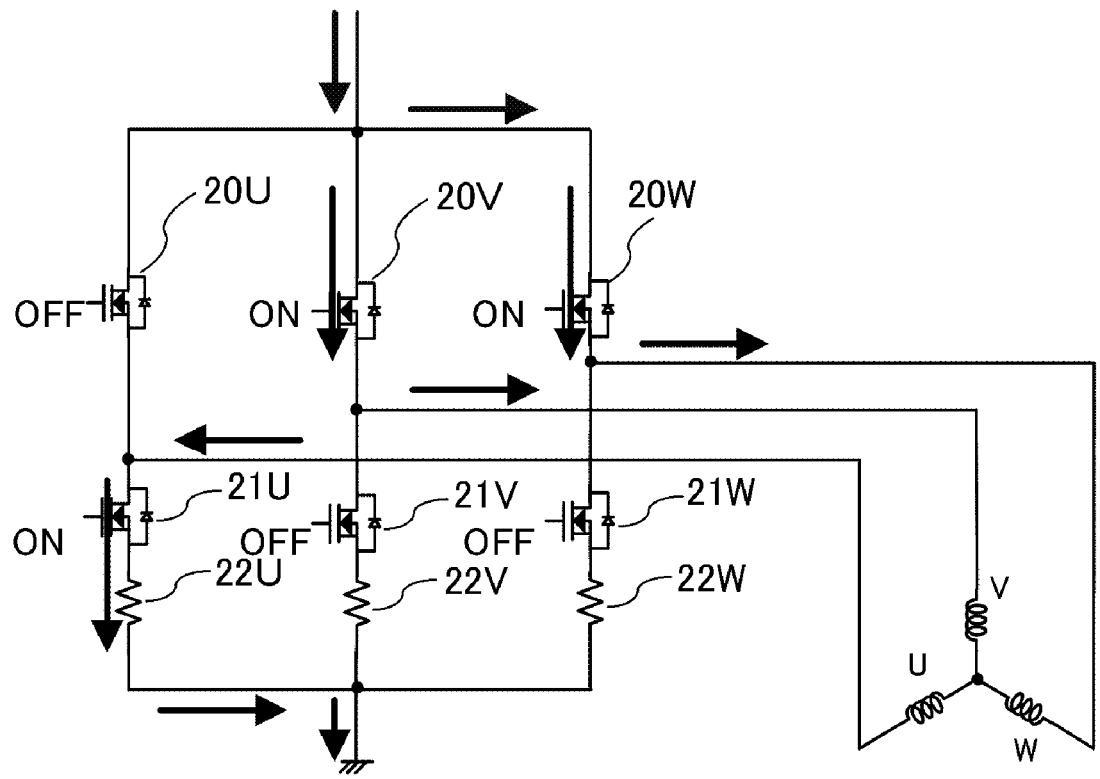
FIG. 19 is a circuit diagram explaining the current path in case of the voltage vector V4 in the drive state before shutoff according to Embodiment 1 of the present disclosure.

The flow path of the currents in the voltage vector V4 becomes as shown in FIG. 19. After the current supplied from the DC power source 2 flows into the V phase winding and the W phase winding through the V phase and W phase high potential side switching devices 20V, 20W, it passes through the U phase low potential side switching device 21U via the U phase winding, and then, it returns to the DC power source 2.

Figure 20:
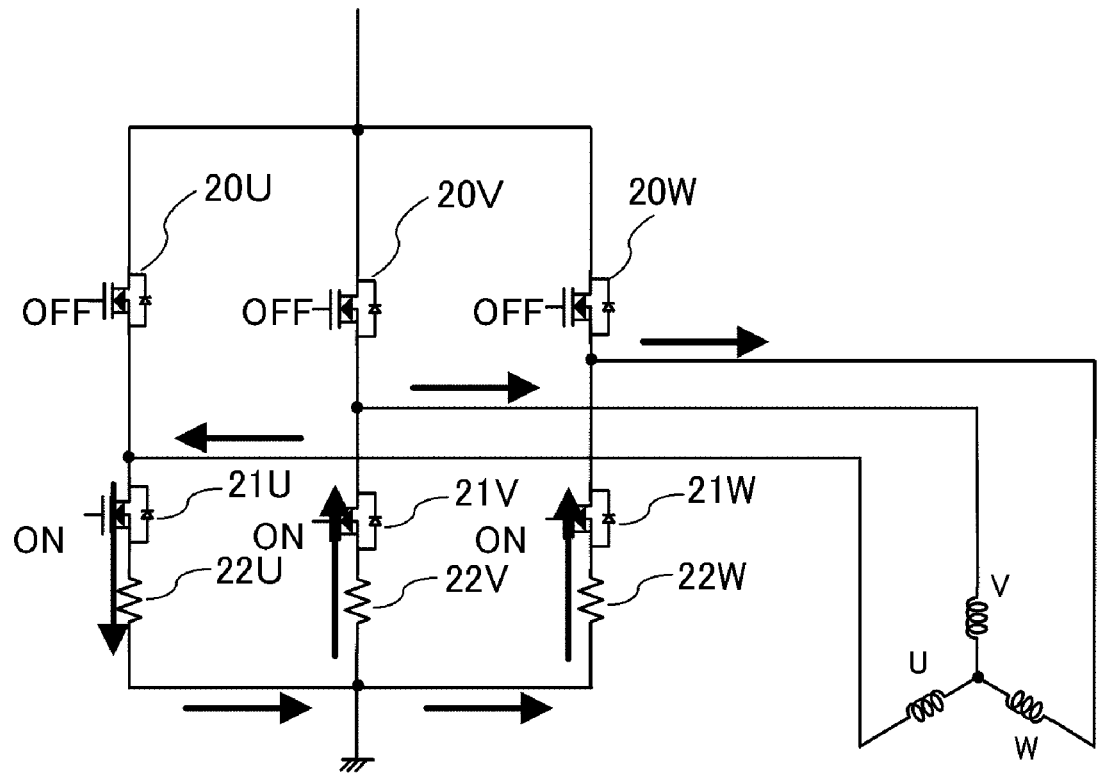
FIG. 20 is a circuit diagram explaining the current path in case of the voltage vector V0 in the drive state before shutoff according to Embodiment 1 of the present disclosure.

The flow path of the currents in the voltage vector V0 becomes as shown in FIG. 20. The three-phase high potential side switching devices 20U, 20V, 20W are off and the power source from DC power source 2 is not supplied. Accordingly, after the current which passed through the V phase and W phase low potential side switching devices 21V, 21W passes through the V phase winding and the W phase winding, it passes through the U phase low potential side switching device 21U via the U phase winding, and then, it returns to the V phase and W phase low potential side switching devices 21V, 21W again.

Figure 21:
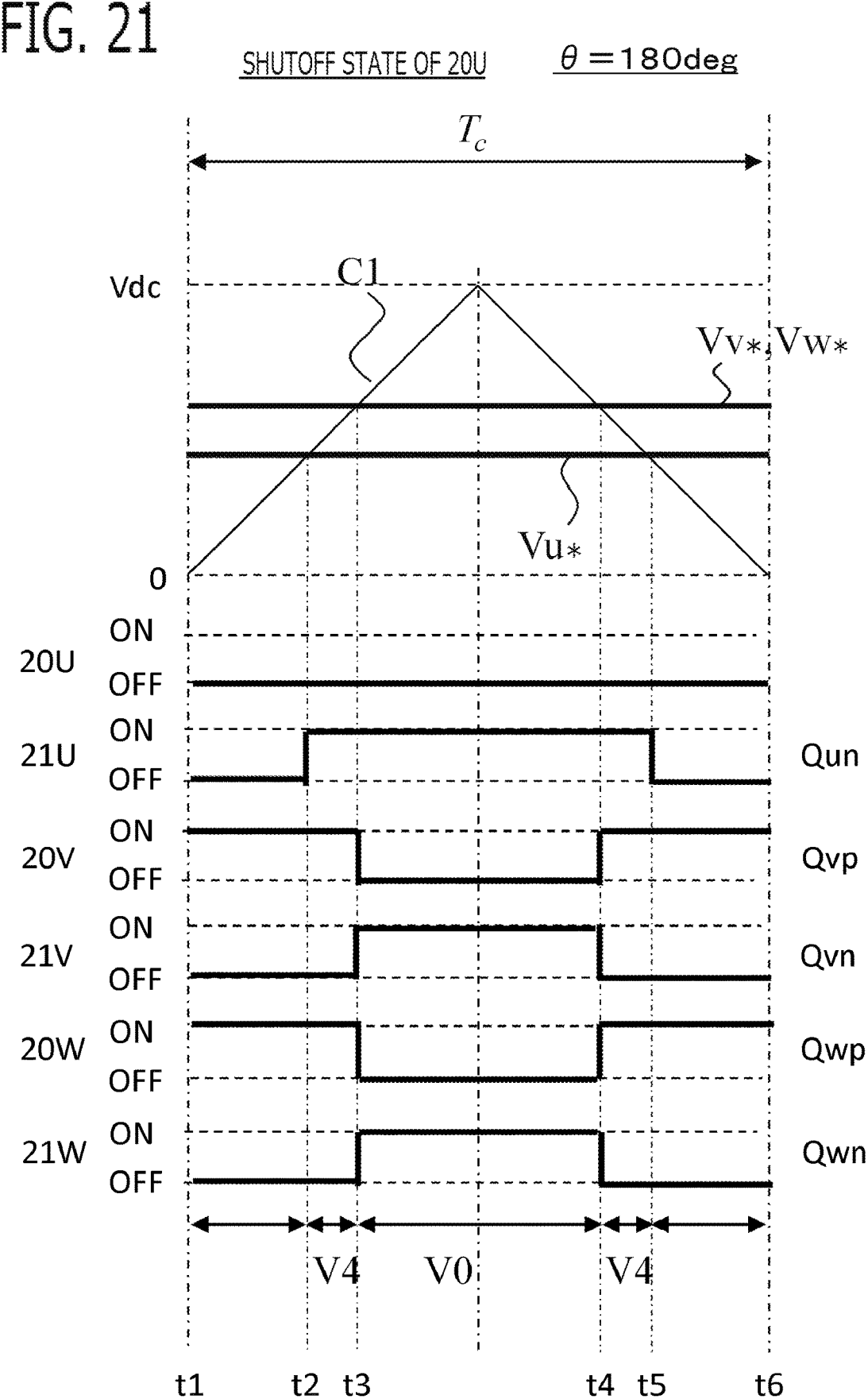
FIG. 21 is a time chart explaining the on/off operation of the switching devices in the shutoff state according to Embodiment 1 of the present disclosure.

When the U phase high potential side switching device 20U is switched from the drive state to the shutoff state by the device shutoff unit 8, the on/off operation of the switching devices 20U to 21W in the PWM carrier one period Tc becomes as shown in FIG. 21. In from time t1 to t2 and from time t5 to t6, it becomes a different voltage vector from the drive state before shutoff.

Figure 22:
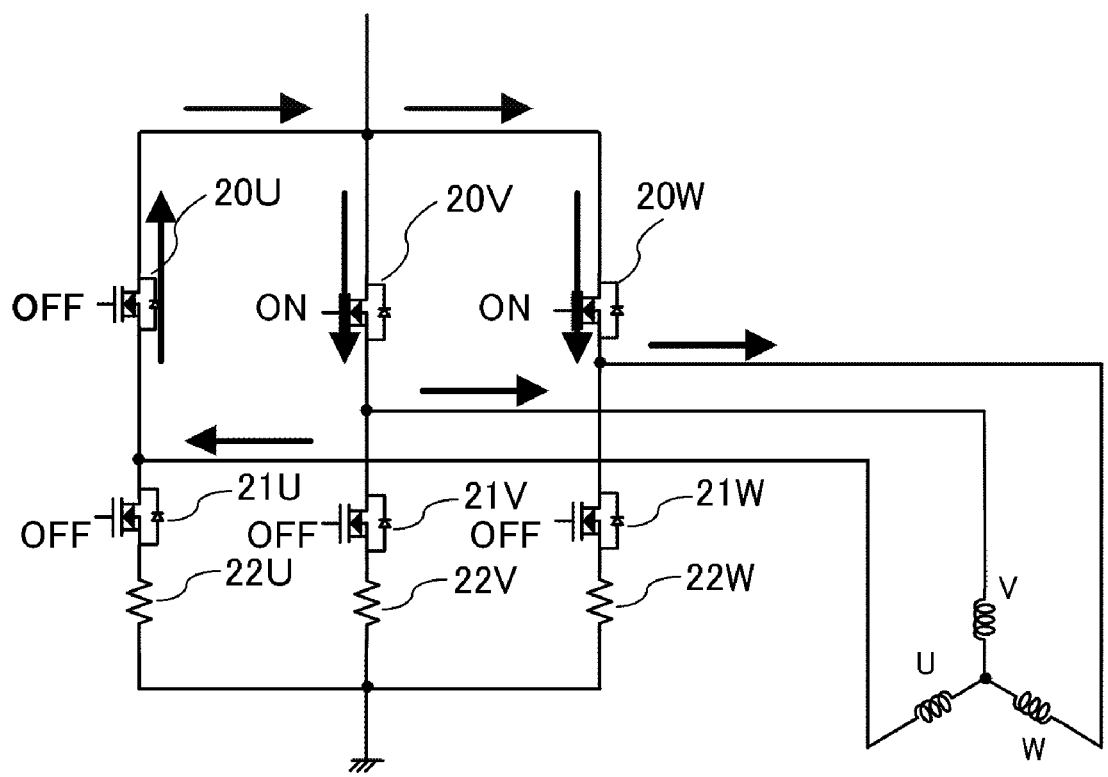
FIG. 22 is a circuit diagram explaining the current path in the shutoff state according to Embodiment 1 of the present disclosure.

The flow path in from time t1 to t2 and from time t5 to t6 become as shown in FIG. 22. Although both the high potential side and low potential side switching devices 20U, 21U of U phase are off, considering the current conduction direction, current is able to flow through the parasitic diode of the U phase high potential side switching device 20U. The V phase voltage Vv and the W phase voltage Vw are larger than the U phase voltage Vu. Accordingly, after the current which passed through the V phase and W phase high potential side switching devices 20V, 20W passes through the V phase winding and the W phase winding, it passes through the parasitic diode of the U phase high potential side switching device 20U via the U phase winding, and then, it returns to the V phase and W phase high potential side switching devices 20V, 20W again. That is, although there is a difference in whether or not it passes through the parasitic diode of the U phase high potential side switching device 20U, the similar circuit as FIG. 18 can be realized.

In the state where the electrical angle θ is 180 degrees and the U phase current Iu is negative in FIG. 4 and FIG. 5, even though the U phase high potential side switching device 20U is switched from the drive state before shutoff to the shutoff state by the device shutoff unit 8, the U phase current Iu flows without almost changing from the drive state before shutoff. Since there is no change of state, it is difficult to determine failure of the device shutoff unit 8.

Therefore, in order to determine failure of the device shutoff unit 8 of the U phase high potential side switching device 20U, in the drive state where the U phase current Iu becomes positive when the shutoff is not performed, the U phase high potential side switching device 20U may be switched to the shutoff state by commanding the device shutoff unit 8.

1-2-2-2. Shutoff Failure Determination Processing of Shutoff Failure Determination Unit 9

Based on the principle of the shutoff failure determination explained above, the shutoff failure determination unit 9 is configured as explained in the following. The shutoff failure determination unit 9 performs a high potential side forcible shutoff that forcibly shuts off the high potential side switching device of the diagnosis object phase by commanding the device shutoff unit 8, in a drive state where a current which flows through the winding of the diagnosis object phase becomes positive when the switching device is not forcibly shut off by the device shutoff unit 8. Herein, a current direction flowing into the winding from the inverter 17 is positive. The shutoff failure determination unit a performs a shutoff failure determination that determines failure of the device shutoff unit 8 based on the detection value of current or voltage when the high potential side forcible shutoff is performed.

In the present embodiment, when determining failure based on current, it is configured as follows. That is to say, the shutoff failure determination unit 9 determines that when the current flowing through the winding of the diagnosis object phase changes to 0 after performing the high potential side forcible shutoff, the device shutoff unit 8 of the high potential side switching device of the diagnosis object phase is normal; and determines that when the current flowing through the winding of the diagnosis object phase does not change to 0 after performing the high potential side forcible shutoff, the device shutoff unit 8 of the high potential side switching device of the diagnosis object phase is abnormal.

On the other hand, when determining failure based on voltage, it is configured as follows. That is to say, the shutoff failure determination unit 9 determines that when the voltage applied to the winding of the diagnosis object phase changes to an average value of voltages applied to the windings of phases other than the diagnosis object phase after performing the high potential side forcible shutoff, the device shutoff unit 8 of the high potential side switching device of the diagnosis object phase is normal; and determines that when the voltage applied to the winding of the diagnosis object phase does not change to the average value of voltages applied to the windings of phases other than the diagnosis object phase after performing the high potential side forcible shutoff, the device shutoff unit 8 of the high potential side switching device of the diagnosis object phase is abnormal.

Alternatively, the shutoff failure determination unit 9 determines that when a total value or an average value of the terminal voltages of three-phase windings, or a voltage of the neutral point of three-phase windings changes after performing the high potential side forcible shutoff, the device shutoff unit 8 of the high potential side switching device of the diagnosis object phase is normal; and determines that when the total value or the average value of the terminal voltages of three-phase windings, or the voltage of the neutral point of three-phase windings does not change after performing the high potential side forcible shutoff, the device shutoff unit 8 of the high potential side switching device of the diagnosis object phase is abnormal.

According to a relative potential relation among the voltages Vu, Vv, Vw applied to the three-phase windings, the current direction which flows through the each phase winding is decided. The drive state where the current flowing into the winding of the diagnosis object phase becomes positive when the shutoff is not performed becomes a drive state where the voltage applied to the winding of the diagnosis object phase becomes larger than the average value (the neutral point voltage) of the voltages Vu, Vv, Vw applied to the three-phase windings when the shutoff is not performed.

Then, the shutoff failure determination unit 9 may performs the high potential side forcible shutoff in the drive state where the applied voltage of the winding of the diagnosis object phase becomes larger than the average value of the applied voltages Vu, Vv, Vw of the three-phase windings when the switching device is not forcibly shut off. Herein, as the applied voltages Vu, Vv, Vw of the three-phase windings, the three-phase voltage commands Vu*, Vv*, Vw* which are the applied voltage commands to the three-phase windings may be used.

In the present embodiment, the rotary machine 3 is a rotary machine for driving the electric power steering apparatus; and the output torque of the rotary machine 3 is transmitted to the steering shaft 62 via gear or chain, and becomes the assist torque which assists the steering wheel torque. A torque ripple or rotation torque of the rotary machine 3 has a possibility of giving discomfort to a driver. When the current amount flowing into the rotary machine 3 is abnormal, it is desirable to stop the drive of the switching devices. However, when the device shutoff unit 8 fails, it does not switch to the shutoff state, but a torque which the driver does not require may be outputted. As the present embodiment, by applying the controller for the rotary machine 3 to the controller for the electric power steering, failure determination of the device shutoff unit 8 is achieved, the abnormal operation of the rotary machine 3 is avoided, and safety can be improved.

2. Embodiment 2

The controller 1 according to Embodiment 2 will be explained. The explanation for constituent parts the same as those in Embodiment 1 will be omitted. Although the basic configuration of the rotary machine 3 and the controller 1 according to the present embodiment is the same as that of Embodiment 1, the present embodiment is different from Embodiment 1 in a setting method of dq-axis current commands Id*, Iq* for shutoff failure determination which the current command calculation unit 5 sets.

<Setting Principle of Dq-Axis Current Commands Td*, Iq* for Shutoff Failure Determination>

Figure 23:
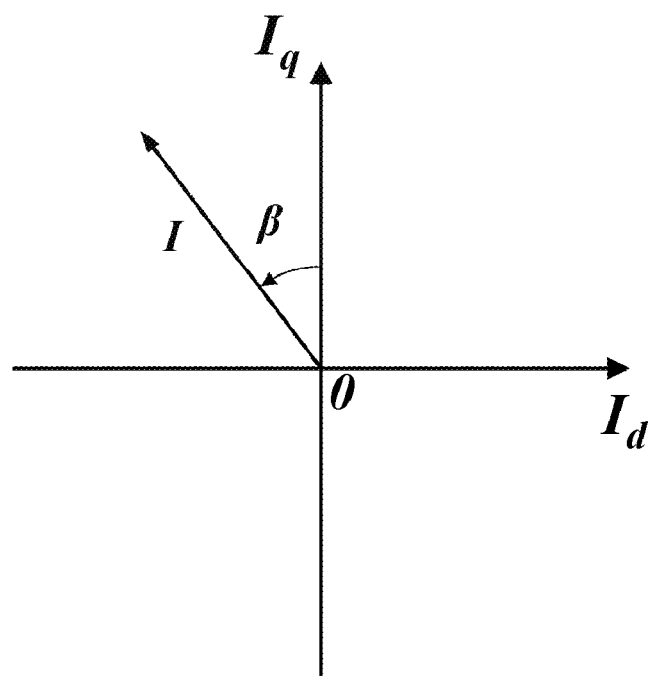
FIG. 23 is a figure explaining the phase angle of the current vector according to Embodiment 2 of the present disclosure.

First, a setting principle of dq-axis current commands Id*, Iq* for shutoff failure determination according to the present embodiment will be explained. As shown in FIG. 23, a phase angle, to the q-axis, of a current vector which combined the d-axis current Id and the q-axis current Iq is set to 3. The same applies to the d-axis current command id* and the q-axis current command Iq*.

The d-axis current Id and the q-axis current Iq can be expressed as an equation (5) using an effective value Irms of the current vector, and the phase angle β of the current vector.

$$I_d = -\sqrt{3} I_{rms} \sin \beta$$

$$I_q = \sqrt{3} I_{rms} \cos \beta \quad (5)$$

If the two-phase/three-phase conversion and the fixed coordinate conversion based on the electrical angle θ are performed to the dq-axis current Id, Iq of the equation (5), the three-phase currents Iu, Iv, Iw shown in an equation (6) are obtained.

$$I_u = \sqrt{2} I_{rms} \sin(\theta + \beta - \pi)$$

$$I_v = \sqrt{2} I_{rms} \sin\left(\theta + \beta + \frac{\pi}{3}\right) \quad (6)$$

$$I_w = \sqrt{2} I_{rms} \sin\left(\theta + \beta - \frac{\pi}{3}\right)$$

If the resistance of the each phase winding is set to R, the three-phase voltages Vu, Vv, Vw for obtaining the three-phase currents Iu, Iv, Iw of the equation (6) becomes as shown in an equation (7).

$$V_u = \sqrt{2} R I_{rms} \sin(\theta + \beta - \pi)$$

$$V_v = \sqrt{2} R I_{rms} \sin\left(\theta + \beta + \frac{\pi}{3}\right) \quad (7)$$

$$V_w = \sqrt{2} R I_{rms} \sin\left(\theta + \beta - \frac{\pi}{3}\right)$$

In the drive state before shutoff, the three-phase voltages of the equation (7) according to the three-phase voltage commands are applied to the three-phase winding. However, when the high potential side switching device 20U of U phase which is set to the diagnosis object phase is switched to the shutoff state, the three-phase voltages Vu_off, Vv_off, Vw_off which are applied to the three-phase windings become as an equation (8).

$$V_{u\_off} = \frac{1}{\sqrt{2}} R I_{rms} \sin(\theta + \beta) \quad (8)$$

$$V_{v\_off} = \sqrt{2} R I_{rms} \sin\left(\theta + \beta + \frac{\pi}{3}\right) =$$

$$\sqrt{\frac{3}{2}} R I_{rms} \sin\left(\theta + \beta + \frac{\pi}{2}\right) + \frac{1}{\sqrt{2}} R I_{rms} \sin(\theta + \beta)$$

$$V_{w\_off} = \sqrt{2} R I_{rms} \sin\left(\theta + \beta - \frac{\pi}{3}\right) =$$

$$\sqrt{\frac{3}{2}} R I_{rms} \sin\left(\theta + \beta - \frac{\pi}{2}\right) + \frac{1}{\sqrt{2}} R I_{rms} \sin(\theta + \beta)$$

As a result, the three-phase currents Iu_off, Iv_off, Iw_off when the phase high potential side switching device 20U is switched to the shutoff state are given by an equation (9); and the d-axis current Id_off and the q-axis current Iq_off in the shutoff state, which are obtained by performing the three-phase/two-phase conversion and the rotating coordinate conversion based on the electrical angle θ to the three-phase current of the equation (9), become as an equation (10).

$$I_{u\_off} = 0 \quad (9)$$

$$I_{v\_off} = \sqrt{\frac{3}{2}} I_{rms} \sin\left(\theta + \beta + \frac{\pi}{2}\right)$$

$$I_{w\_off} = \sqrt{\frac{3}{2}} I_{rms} \sin\left(\theta + \beta - \frac{\pi}{2}\right)$$

$$I_{d\_off} = \sqrt{3} I_{rms} \cos(\theta + \beta) \sin\theta \quad (10)$$

$$I_{q\_off} = \sqrt{3} I_{rms} \cos(\theta + \beta) \cos\theta$$

An output torque T of the rotary machine 3 in the drive state before shutoff is obtained by multiplying a number of pole pairs P and a magnetic flux φ to the q-axis current Iq of the equation (5), and is given by an equation (11).

$$T = P I_q \phi = \sqrt{3} P I_{drms} \phi \cos \beta \quad (11)$$

An output torque Toff of the rotary machine 3 in the shutoff state of the U phase high potential side switching device 20U is obtained by multiplying the number of pole pairs P and the magnetic flux φ to the q-axis current Iq_off of the equation (10), and is given by an equation (12).

$$T_{off} = PI_{q\_off}\phi = \sqrt{3}PI_{rms}\phi\cos(\theta+\beta)\cos\theta \qquad (12)$$

An output torque difference Tdiff between the output torque T in the drive state before shutoff and the output torque Toff in the shutoff state is given by an equation (13).

$$T_{diff} = T_{off} - T = \frac{\sqrt{3}}{2}PI_{rms}\phi\{\cos(2\theta+\beta) - \cos\beta\} \qquad (13)$$

<First Configuration>

First, a first configuration that sets the dq-axis current commands Id*, Iq* according to the present embodiment will be explained. Since the rotary machine 3 may rotate when being in the shutoff state if an absolute value of the vibrating output torque difference Tdiff is large, the absolute value of the vibrating output torque difference Tdiff hardly appear in the behavior of the rotary machine 3 as it is smaller. In an equation (13), when the phase angle β is ±π/2, cos β becomes 0, the output torque difference Tdiff vibrates equally to positive and negative centering on 0 and the absolute value of the output torque difference Tdiff becomes the minimum. Therefore, when the phase angle β of current vector I becomes ±π/2 (that is, when the q-axis current Iq before shutoff becomes 0 and the d-axis current id becomes values other than 0), the output torque difference Tdiff becomes the minimum.

Then, in the first configuration of the present embodiment, when performing the shutoff failure determination, the current command calculation unit 5 sets the q-axis current command Iq* for the shutoff failure determination to 0, and sets the d-axis current command Id* for the shutoff failure determination to a value other than 0. According to this configuration, the absolute value of the output torque difference Tdiff between the drive state before shutoff and the shutoff state can be minimized, and the output torque difference before and after shutoff can hardly appear in the behavior of the rotary machine 3.

<Second Configurations>

Next, a second configuration that sets the dq-axis current commands Id*, Iq* according to the present embodiment will be explained. FIG. 4 shows the three-phase currents Iu, Iv, Iw when the d-axis current Id is a constant value of 10 Arms and the q-axis current Iq is 0 Arms as the first configuration. In this case, a period when the U phase current Iu which is the diagnosis object phase becomes positive and the high potential side forcible shutoff of U phase is performed is only a period when the electrical angle θ becomes from –π/2 to π/2 (from 270 degrees to 360 degrees, and from 0 degree to 90 degrees). Therefore, the period when the high potential side forcible shutoff of U phase can be performed is limited. This can be understood also from the calculation equation of the U phase current Iu when the phase angle β is set to ±π/2 in the equation (6).

Figure 24:
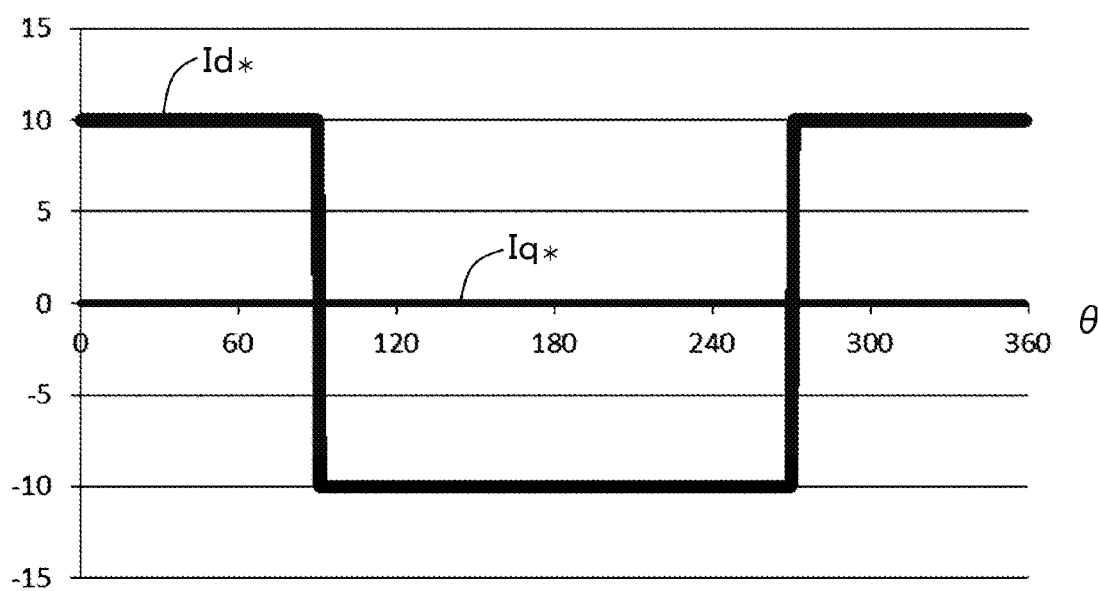
FIG. 24 is a time chart explaining setting of the dq-axis current commands for the shutoff failure determination according to Embodiment 2 of the present disclosure.

Then, in order to expand the interval when the U phase current Iu becomes positive, the d-axis current command id and the q-axis current command Iq* may be set as shown in FIG. 24. At this time, the three-phase currents Iu, Iv, Iw in the drive state before shutoff become as shown in FIG. 25, and the three-phase currents Iu, Iv, Iw in the shutoff state of the U phase high potential side switching device become as shown in FIG. 26. As shown in FIG. 25, the U phase current Iu is larger than 0 at the electrical angles θ other than ±π/2 (90 degrees, 270 degrees), and the high potential side forcible shutoff of U phase can be performed at almost all angles.

Figures 27, 28:
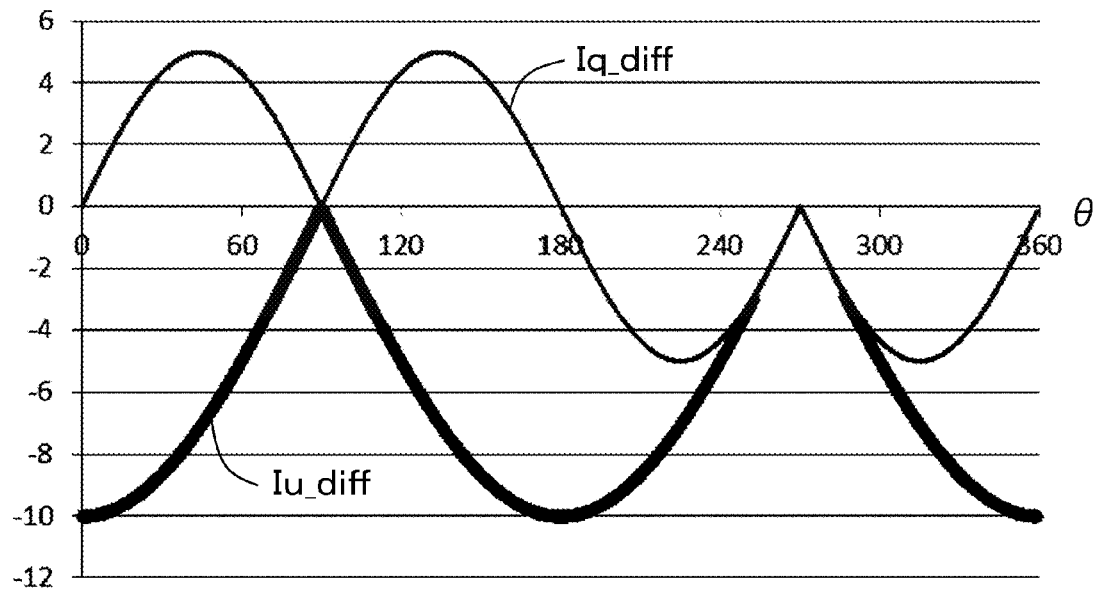
FIG. 27 is a time chart explaining the current difference before and after the shutoff according to Embodiment 2 of the present disclosure.
FIG. 28 is a figure explaining setting of the dq-axis current commands for the shutoff failure determination according to Embodiment 2 of the present disclosure.

At this time, a current difference Iu_diff of the U phase current and a current difference Iq_diff of the q-axis current between the drive state before shutoff and the shutoff state become as shown in FIG. 27; and the current difference Iq_diff of the q-axis current proportional to the output torque difference is within a range of ±5 Arms, and the output torque difference can be suppressed.

Then, determining i-th phase as the diagnosis object phase, and defining an advance angle of the d-axis on the basis of the first phase winding as an electrical angle θ; in a case of performing the high potential side forcible shutoff, the current command calculation unit 5 sets the d-axis current command Id* to a positive value, when the electrical angle θ is between −π/2+2π(i−1)/m and π/2+2π(i−1)/m; and sets the d-axis current command Id* to a negative value, when the electrical angle θ is not between −π/2+2π(i−1)/m to π/2+2π(i−1)/m. The current command calculation unit 5 sets the q-axis current command Iq* to 0.

In the present embodiment, as mentioned above, the three-phase windings of m=3 is provided, the first phase of i=1 is set to U phase, and the second phase of i=2 is set to V phase, and the third phase of i=3 is set to W phase. As shown in FIG. 28, in a case of determining U phase of i=1 as the diagnosis object phase, the current command calculation unit 5 sets the d-axis current command Id* to a positive value, when the electrical angle θ is between −π/2 and π/2 (between 270 degrees and 360 degrees, and between 0 degree and 90 degrees); and sets the d-axis current command Id* to a negative value, when the electrical angle θ is not between −π/2 and π/2. In a case of determining V phase of i=2 as the diagnosis object phase, the current command calculation unit 5 sets the d-axis current command Id* to a positive value, when the electrical angle θ is between π/6 and 7π/6 (between 30 degrees and 210 degrees); and sets the d-axis current command Id* to a negative value, when the electrical angle θ is not between π/6 and 7π/6. In a case of determining W phase of i=3 as the diagnosis object phase, the current command calculation unit 5 sets the d-axis current command Id* to a positive value, when the electrical angle θ is between 5π/6 and 11π/6 (between 150 degrees and 330 degrees); and sets the d-axis current command Id* to a negative value, when the electrical angle θ is not between 5π/6 and 11π/6.

3. Embodiment 3

The controller 1 according to Embodiment 3 will be explained. The explanation for constituent parts the same as those in Embodiment 1 will be omitted. Although the basic configuration of the rotary machine 3 and the controller 1 according to the present embodiment is the same as that of Embodiment 1, the present embodiment is different from Embodiment 1 in a setting method of dq-axis current commands Id*, Iq* for shutoff failure determination which the current command calculation unit 5 sets.

In Embodiment 2, the current command calculation unit 5 set the q-axis current command Iq* for the shutoff failure determination to 0, and sets the d-axis current command Id* for the shutoff failure determination to a value other than 0. However, as shown in FIG. 25, the U phase current Iu which is set to the diagnosis object phase becomes 0 Arms, when the electrical angle θ becomes ±π/2 (90 degrees, 270 degrees); and even though performing the high potential side forcible shutoff of U phase, the shutoff failure determination cannot be performed. In the present embodiment, also in these electrical angles θ, the U phase current Iu is set to a positive constant value so that the shutoff failure determination can be performed by the high potential side forcible shutoff of U phase.

Then, determining i-th phase as the diagnosis object phase, and defining an advance angle of the d-axis on the basis of the first phase winding as an electrical angle θ; in a case of performing the high potential side forcible shutoff, using a phase adjustment constant K which is set to a value between $-\pi$ and 0, the current command calculation unit 5 sets the d-axis current command Id* and the q-axis current command Iq* for the shutoff failure determination, so that a phase angle β, to the q-axis, of a current vector which combined the d-axis current command id* and the q-axis current command Iq* becomes K+2π(i−1)/m−θ. In this case, the current command calculation unit 5 sets the d-axis current command Id* and the q-axis current command Iq* for the shutoff failure determination, as shown in an equation (14).

$$I_d^* = -\sqrt{3}I_{rms}\sin(K+2\pi(i-1)/m-\theta)$$

$$I_q^* = \sqrt{3}I_{rms}\cos(K+2\pi(i-1)/m-\theta) \quad (14)$$

As mentioned above, the three-phase windings of m=3 is provided. When the diagnosis object phase is determined to U phase which is the first phase of i=1, it becomes β=K−θ; when the diagnosis object phase is determined to V phase which is the second phase of i=2, it becomes β=K+2π/3−θ; and when the diagnosis object phase is determined to W phase which is the third phase of i=3, it becomes β=K+4π/3−θ. If the phase angle β is substituted for the equation (6) about each phase, an equation (15) which expresses U phase current Iu_t when U phase is set to the diagnosis object phase, V phase current. Iv_t when V phase is set to the diagnosis object phase, and W phase current Iw_t when W phase is set to the diagnosis object phase is obtained. Since the phase adjustment constant K is set to a value between $-\pi$ and 0, the current Iu_t, Iv_t, Iw_t of the each diagnosis object phase becomes a positive value.

$$I_{u\_t} = \sqrt{3}I_{rms}\sin(K-\pi) = \sqrt{2}I_{rms}\sin(K+\pi)$$

$$I_{v\_t} = \sqrt{2}I_{rms}\sin(K+\pi)$$

$$I_{w\_t} = \sqrt{2}I_{rms}\sin(K+\pi) \quad (15)$$

Figure 29:
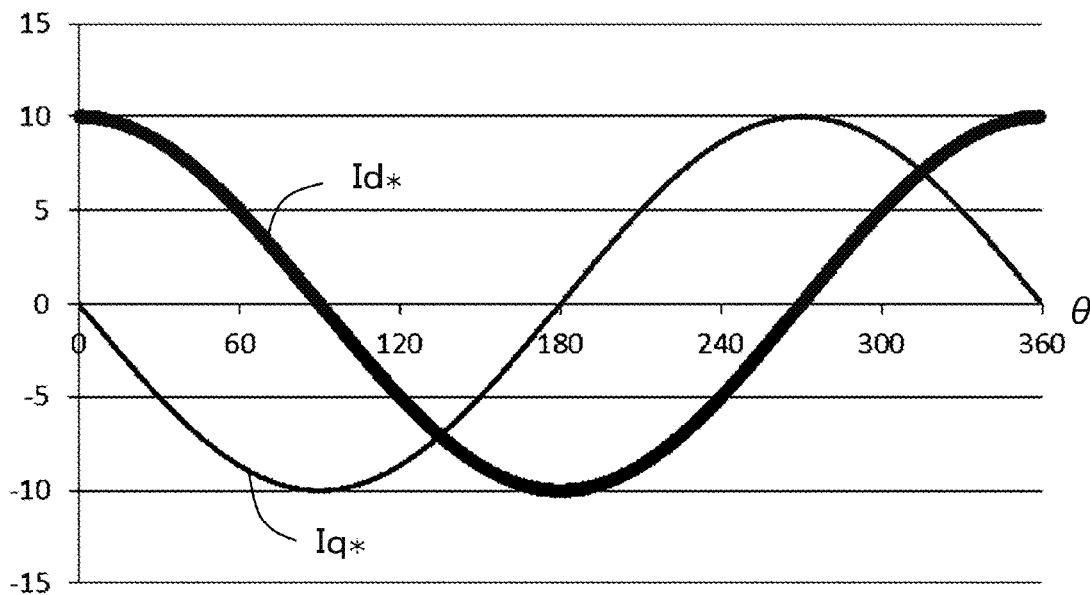
FIG. 29 is a time chart explaining setting of the dq-axis current commands for the shutoff failure determination according to Embodiment 3 of the present disclosure.
Figure 30:
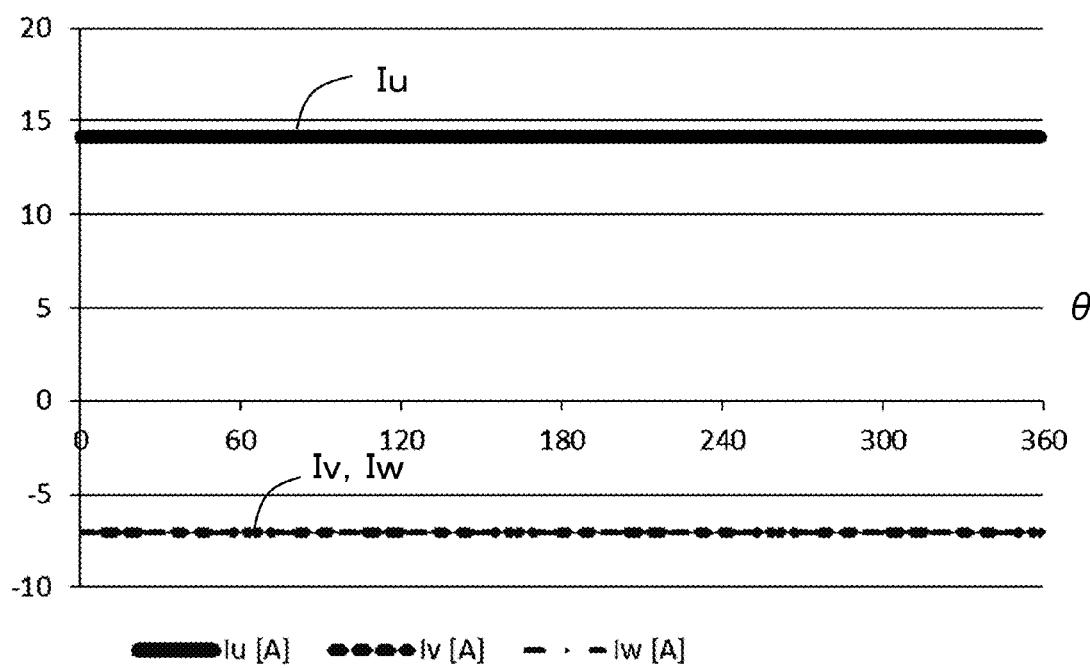
FIG. 30 is a time chart explaining the three-phase currents in the drive state before shutoff according to Embodiment 3 of the present disclosure.
Figure 31:
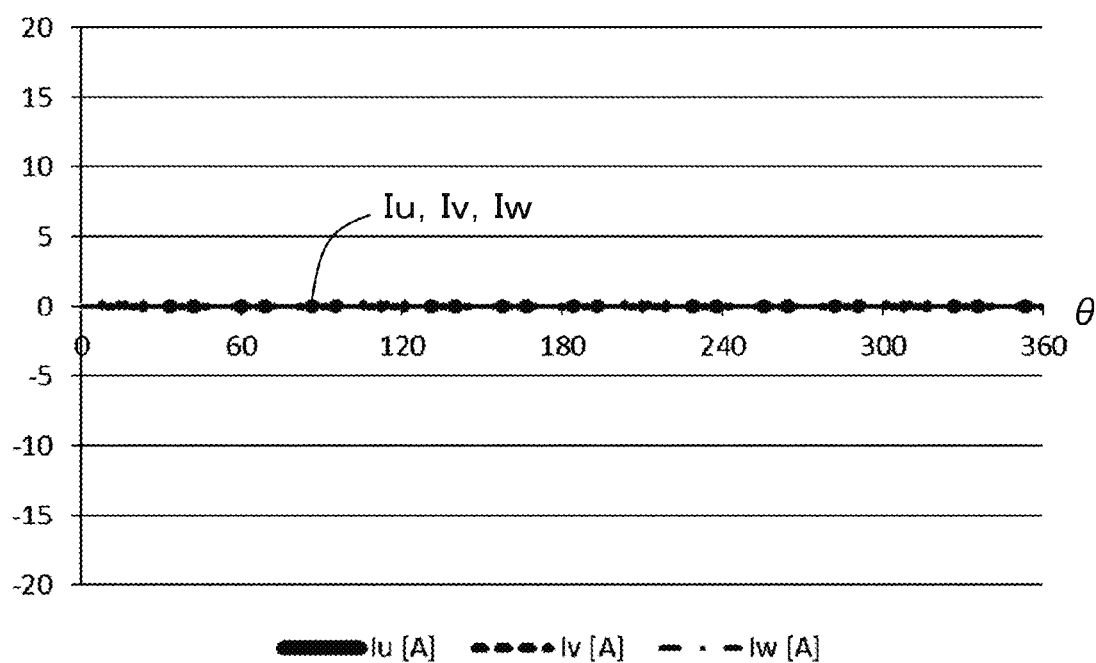
FIG. 31 is a time chart explaining the three-phase currents in the shutoff state according to Embodiment 3 of the present disclosure.

FIG. 29 shows the dq-axis current commands Id*, Iq* for the shutoff failure determination when the diagnosis object phase is determined to U phase which is the first phase of i=1 and the phase adjustment constant K is set to $-\pi/2$; FIG. 30 shows the three-phase currents Iu, Iv, Iw in the drive state before shutoff in the case of FIG. 29; and FIG. 31 shows the three-phase currents Iu, Iv, Iw when the U phase high potential side switching device is shut off in the case of FIG. 29. As shown in FIG. 30, in the drive state before shutoff, the U phase current Iu becomes a positive value of 10 Arms at all the electrical angles θ, and the shutoff failure determination by the U phase high potential side forcible shutoff can be performed. As shown in FIG. 31, since the U phase current Iu becomes 0 Arms in the shutoff state, failure of the device shutoff unit 8 can be easily determined from a current change. Since the winding current of the failure-diagnosis phase becomes a constant value, the design of a threshold value of failure determination can be facilitated, and the failure determination accuracy can be improved.

As the case where the phase adjustment constant K is set to $-\pi/2$ was shown in from FIG. 29 to FIG. 31, by setting the current vector to a desired direction (in this example, the U phase high potential side) at the each electrical angle θ, an useless direction component can be eliminated and the absolute value of the current vector can be reduced.

Figure 32:
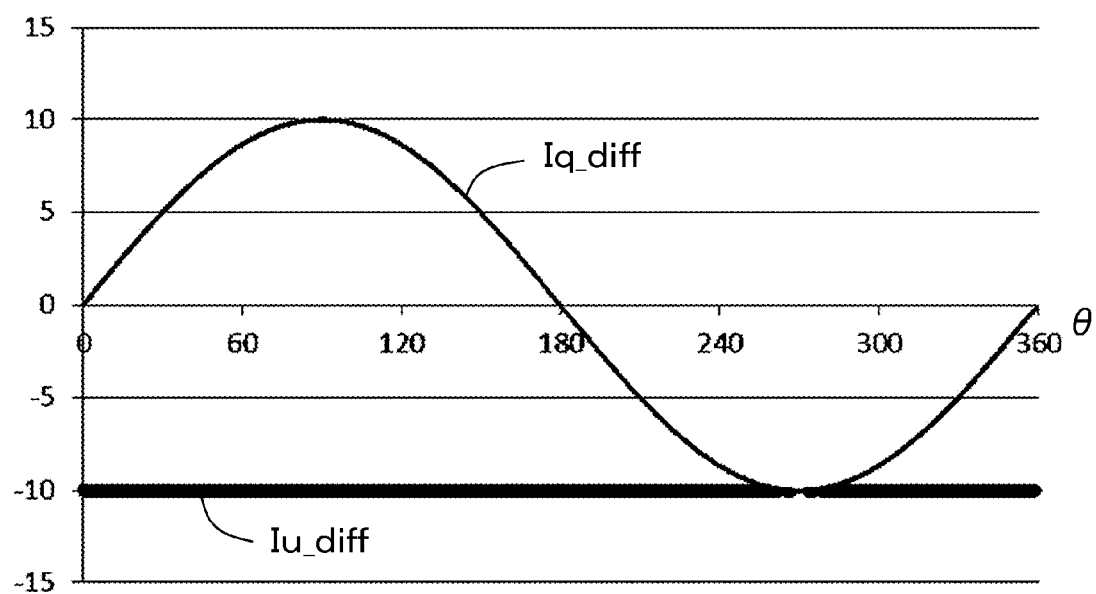
FIG. 32 is a time chart explaining the current difference before and after the shutoff according to Embodiment 3 of the present disclosure.

In the case of from FIG. 29 to FIG. 31, the current difference Iu_diff of the U phase current and the current difference Iq_diff of the q-axis current between the drive state before shutoff and the shutoff state become as shown FIG. 32. The absolute value of current difference Iq_diff of the q-axis current proportional to the output torque difference becomes the largest, when the electrical angle θ is 90 degrees and 270 degrees.

For example, when the electrical angle θ is 90 degrees, the q-axis current Iq in the drive state before shutoff becomes −10 Arms which is the maximum absolute value, and the q-axis current Iq in the shutoff state becomes 0 Arms. If a torque constant which converts the q-axis current Iq into the output torque of the rotary machine 3 is defined as Kt, the output torque T in the drive state before shutoff becomes $-10\sqrt{3}$ Kt, and the output torque Toff in the shutoff state becomes 0.

On the other hand, a mechanical loss torque Tloss exists in the rotary machine 3 and a torque transmission mechanism attached to the output shaft of the rotary machine 3 by gear, chain, and the like. In the present embodiment, the mechanical loss torque Tloss is a mechanical loss torque of the torque transmission mechanism which transmits the output torque of the rotary machine 3 to the steering shaft 62. By setting the output torque T in the drive state before shutoff less than or equal to the mechanical loss torque Tloss, the state where the rotary machine 3 does not rotate can be maintained.

Then, the current command calculation unit 5 sets the absolute value of the q-axis current command Iq* for the shutoff failure determination less than or equal to a value obtained by dividing the absolute value of the mechanical loss torque Tloss by the torque constant Kt. According to this configuration, the shutoff failure determination can be performed in the state where the rotary machine 3 does not rotate. The mechanical loss torque Tloss may be previously stored in the storage apparatus 91, and may be read when calculating the q-axis current command Iq*.

The current command calculation unit 5 sets the q-axis current command Iq* so that the absolute value of the output torque difference Tdiff between the output torque T of the rotary machine 3 when the switching device is not forcibly shut off and the output torque Toff of the rotary machine 3 when the switching device is forcibly shut off becomes less than or equal to the absolute value of the mechanical loss torque Tloss applied to the rotary shaft of rotor. According to this configuration, the rotary machine 3 can be prevented from rotating by an output torque change which occurs before and after shutoff.

The maximum value of the absolute value of the output torque difference Tdiff between the drive state before shutoff and the shutoff state is given by the equation (16) from the equation (13). Therefore, the current command calculation unit 5 sets the effective value Irms of the current vector so that the maximum value of the absolute value of the output torque difference Tdiff calculated by an equation (16) becomes less than or equal to the absolute value of the mechanical loss torque Tloss; and sets the q-axis current command Iq* based on the equation (5) using the set effective value Irms of the current vector.

$$|T_{diff}| = \frac{\sqrt{3}}{2}PI_{rms}\phi(1-\cos\beta) = \frac{\sqrt{3}}{2}K_tI_{rms}(1+|\cos\beta|) \quad (16)$$

The three-phase currents in the shutoff state becomes as shown in FIG. 31. Accordingly, if the detected current values are fed back and the voltage commands are calculated in the voltage command calculation unit 6, since the deviations with the current commands are large, there is anxiety that the voltage commands change to the maximum values. As explained in above Embodiment 1, in the shutoff failure determination, after shutting off, the voltage command calculation unit 6 stops the current feedback control and sets the d-axis voltage command Vd* and the q-axis voltage command Vq* for the shutoff failure determination without using the current detection values. Therefore, the output torque of the rotary machine 3 can be prevented from increasing by the current feedback control after shutoff.

As explained in above Embodiment 1, the voltage command calculation unit 6 holds the dq-axis voltage commands Vd*, Vq* calculated before forcibly shutting off the switching device; and sets the held values to the dq-axis voltage commands Vd*, Vq*, when the switching device is forcibly shut off. According to this configuration, by a simple method of holding the voltage commands before the shutoff, an influence of the current change by the shutoff can be prevented from appearing in the voltage commands after the shutoff.

4. Embodiment 4

The controller 1 according to Embodiment 4 will be explained. The explanation for constituent parts the same as those in Embodiment 1 will be omitted. Although the basic configuration of the rotary machine 3 and the controller 1 according to the present embodiment is the same as that of Embodiment 1, the present embodiment is different from Embodiment 1 in performing a low potential side forcible shutoff which forcibly shuts off the low potential side switching device of the diagnosis object phase in the shutoff failure determination.

First, a principle of the shutoff failure determination when performing the low potential side forcible shutoff will be explained. The case where the diagnosis object phase is set to U phase is explained as an example. As similar to Embodiment 1, in the state where the rotary machine 3 is rotating before the shutoff, when the d-axis current flows 10 Arms and the q-axis current flows 0 Arms, the three-phase currents Iu, Iv, Iw become as shown in FIG. 4. Since the phase difference between voltage and current is almost 0 in minute rotation, the three-phase voltages Vu, Vv, Vw become as shown in FIG. 5.

Figure 33:
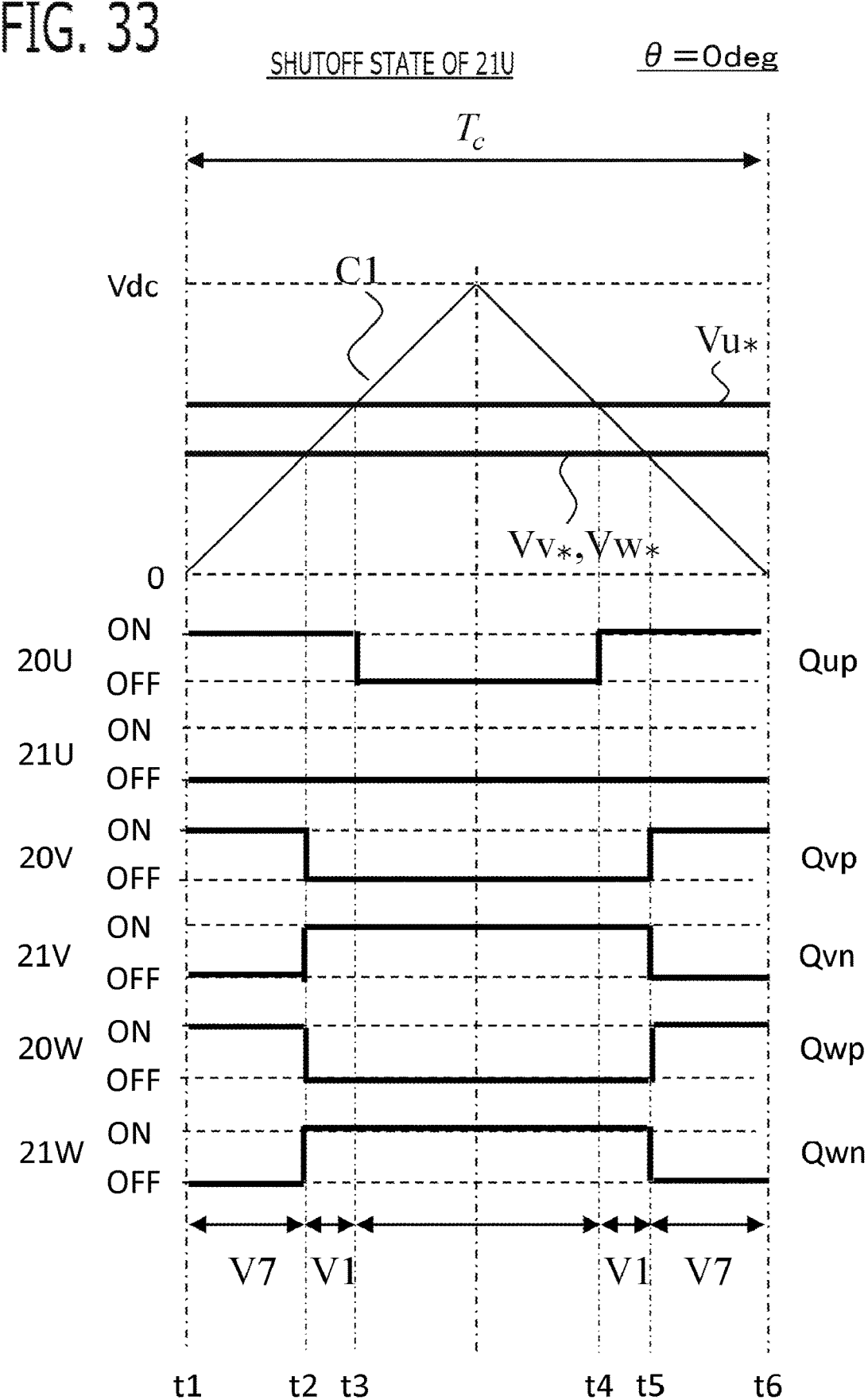
FIG. 33 is a time chart explaining the on/off operation of the switching devices in the shutoff state according to Embodiment 4 of the present disclosure.

In the drive state before the shutoff where the electrical angle θ is 0 degree and the U phase current Iu which is set to the diagnosis object phase becomes positive in FIG. 4 and FIG. 5, when the U phase low potential side switching device 21U is switched to the shutoff state, the on/off operation of the switching devices 20U to 21W in the PWM carrier one period Tc becomes as shown in FIG. 33. In from time t3 to t4, it becomes a different voltage vector from the drive state before shutoff shown in FIG. 7.

Figure 34:
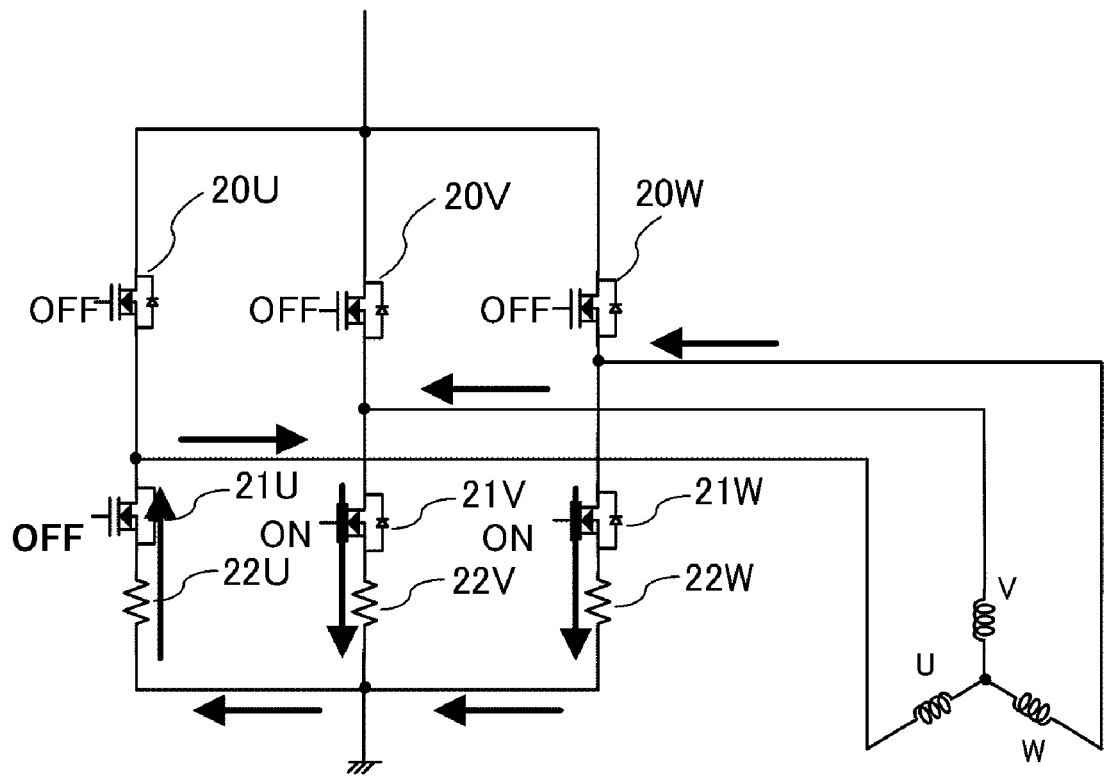
FIG. 34 is a circuit diagram explaining the current path in the shutoff state according to Embodiment 4 of the present disclosure.

The flow path in from time t3 to t4 becomes as shown in FIG. 34. Although both the high potential side and low potential side switching devices 20U, 21U of U phase are off, considering the current conduction direction, current is able to flow through the parasitic diode of the U phase low potential side switching device 21U. The U phase voltage Vu is larger than the V phase voltage Vv and the W phase voltage Vw. Accordingly, after the current which passed through the parasitic diode of the U phase low potential side switching device 21U passes through the U phase winding, it passes through the V phase and W phase low potential side switching devices 21V, 21W via the V phase winding and the W phase winding, then, it returns to the U phase low potential side switching device 21U again. That is, although there is a difference in whether or not it passes through the parasitic diode of the U phase low potential side switching device 21U, the similar circuit as FIG. 10 can be realized.

In the state where the electrical angle θ is 0 degree and the U phase current Iu is positive in FIG. 4 and FIG. 5, even though the U phase low potential side switching device 21U is switched from the drive state before shutoff to the shutoff state by the device shutoff unit 8, the U phase current Iu flows without almost changing from the drive state before shutoff. Since there is no change of state, it is difficult to determine failure of the device shutoff unit 8.

Figure 35:
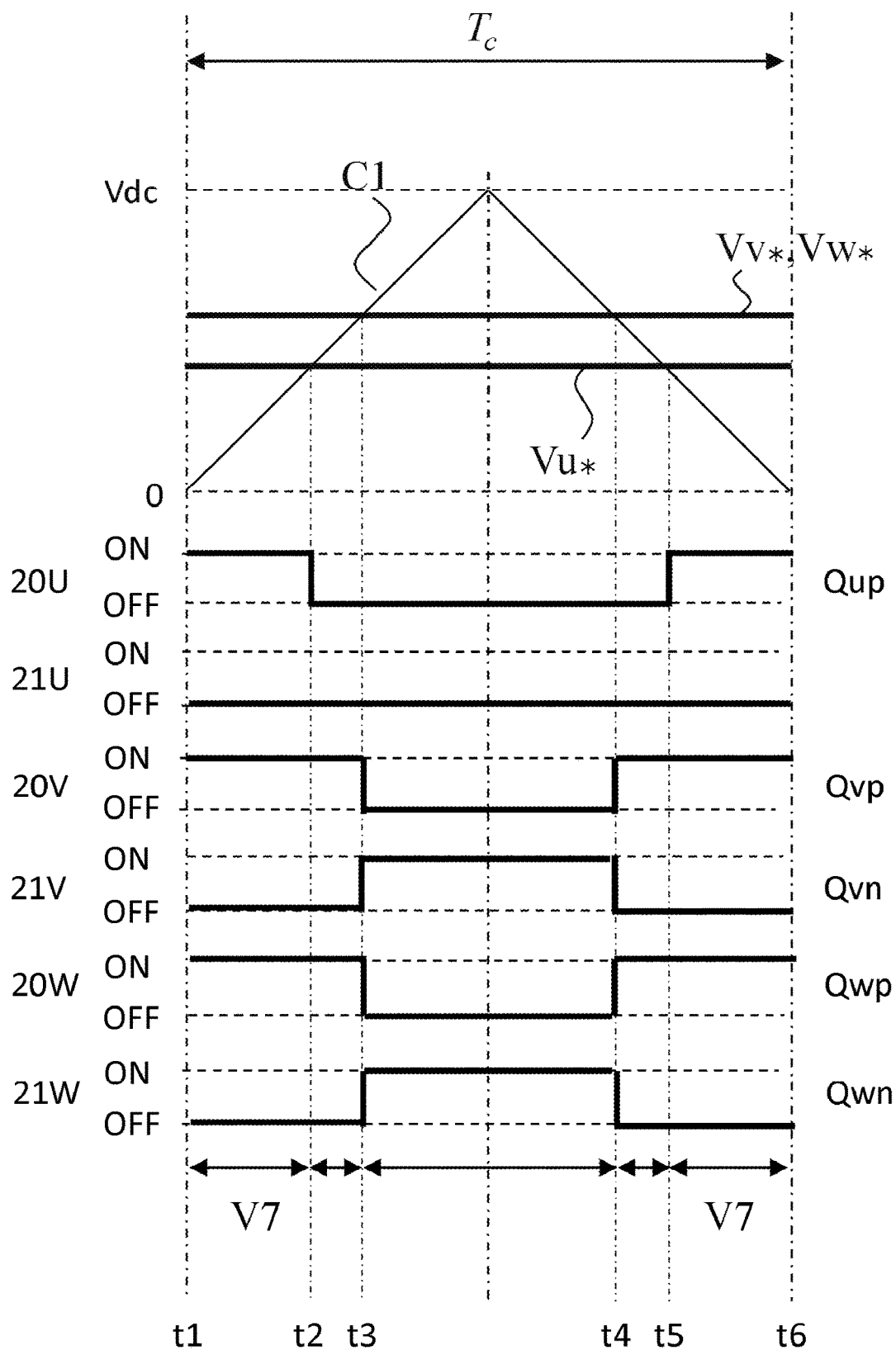
FIG. 35 is a time chart explaining the on/off operation of the switching devices in the shutoff state according to Embodiment 4 of the present disclosure.

On the other hand, in the drive state before the shutoff where the electrical angle θ is 180 degrees and the U phase current Iu which is set to the diagnosis object phase becomes negative in FIG. 4 and when the U phase low potential side switching device 21U is switched to the shutoff state, the on/off operation of the switching devices 20U to 21W in the PWM carrier one period Tc becomes as shown in FIG. 35. In from time t2 to t5, it becomes a different voltage vector from the drive state before shutoff shown in FIG. 17.

Figure 36:
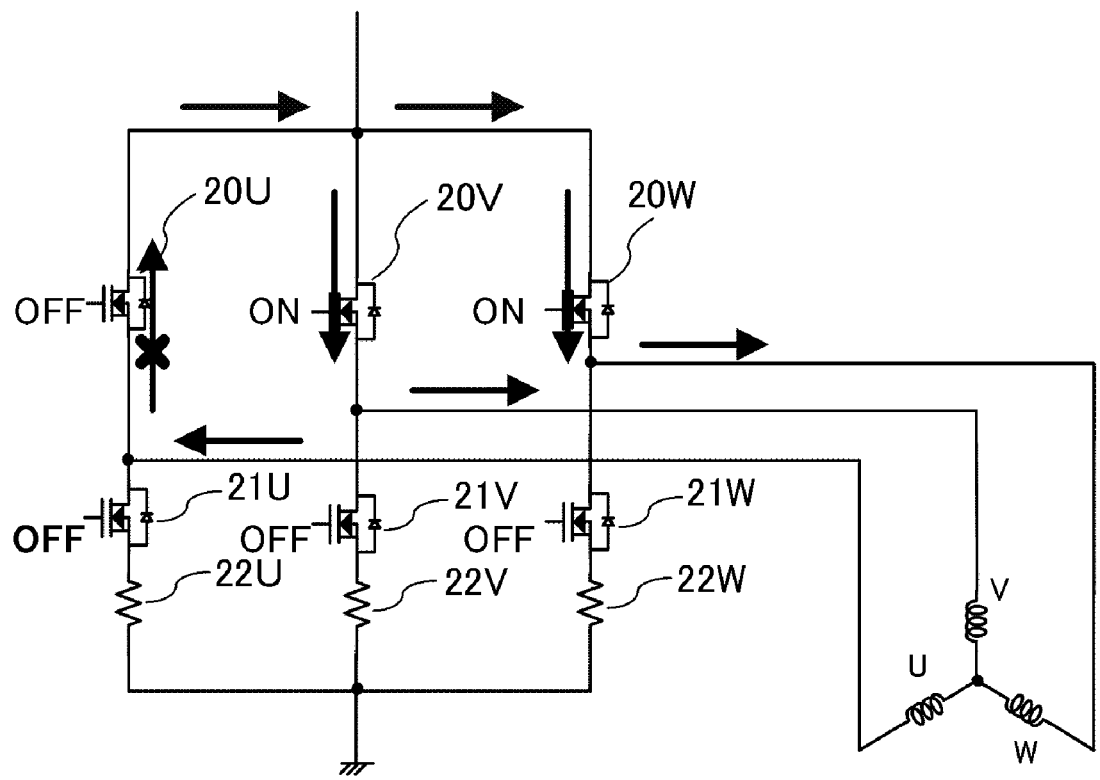
FIG. 36 is a circuit diagram explaining the current path in the shutoff state according to Embodiment 4 of the present disclosure.

Although the flow path of the currents from time t2 to t3 and from time t4 to t5 should become as shown in FIG. 36 if considering the conduction direction, since the V phase voltage Vv and the W phase voltage Vw are larger than the U phase voltage Vu, current cannot flow through the parasitic diode of the U phase high potential side switching device 20U, and current does not flow into the U phase winding.

Figure 37:
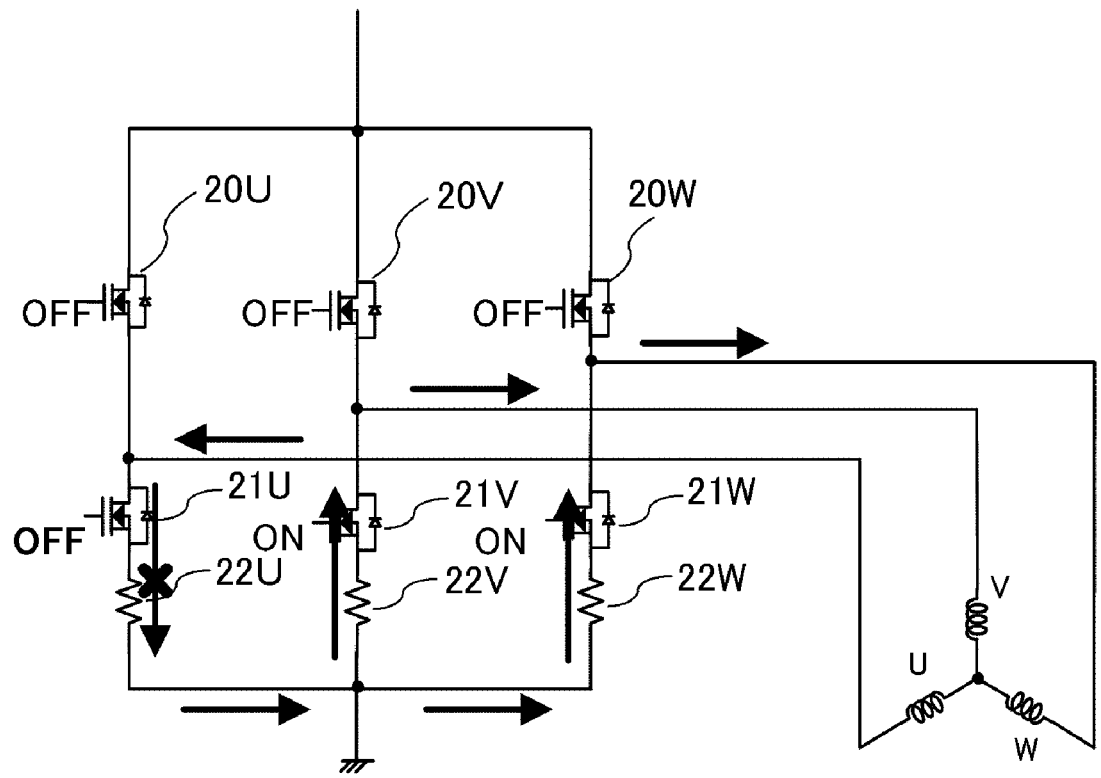
FIG. 37 is a circuit diagram explaining the current path in the shutoff state according to Embodiment 4 of the present disclosure.

Although the flow path of the currents from time t3 to t4 should become as shown in FIG. 37 if considering the conduction direction, since it is contrary to a current direction flowing through the parasitic diode, current cannot flow through the parasitic diode of the U phase low potential side switching device 21U, and current does not flow into the U phase winding.

Figure 38:
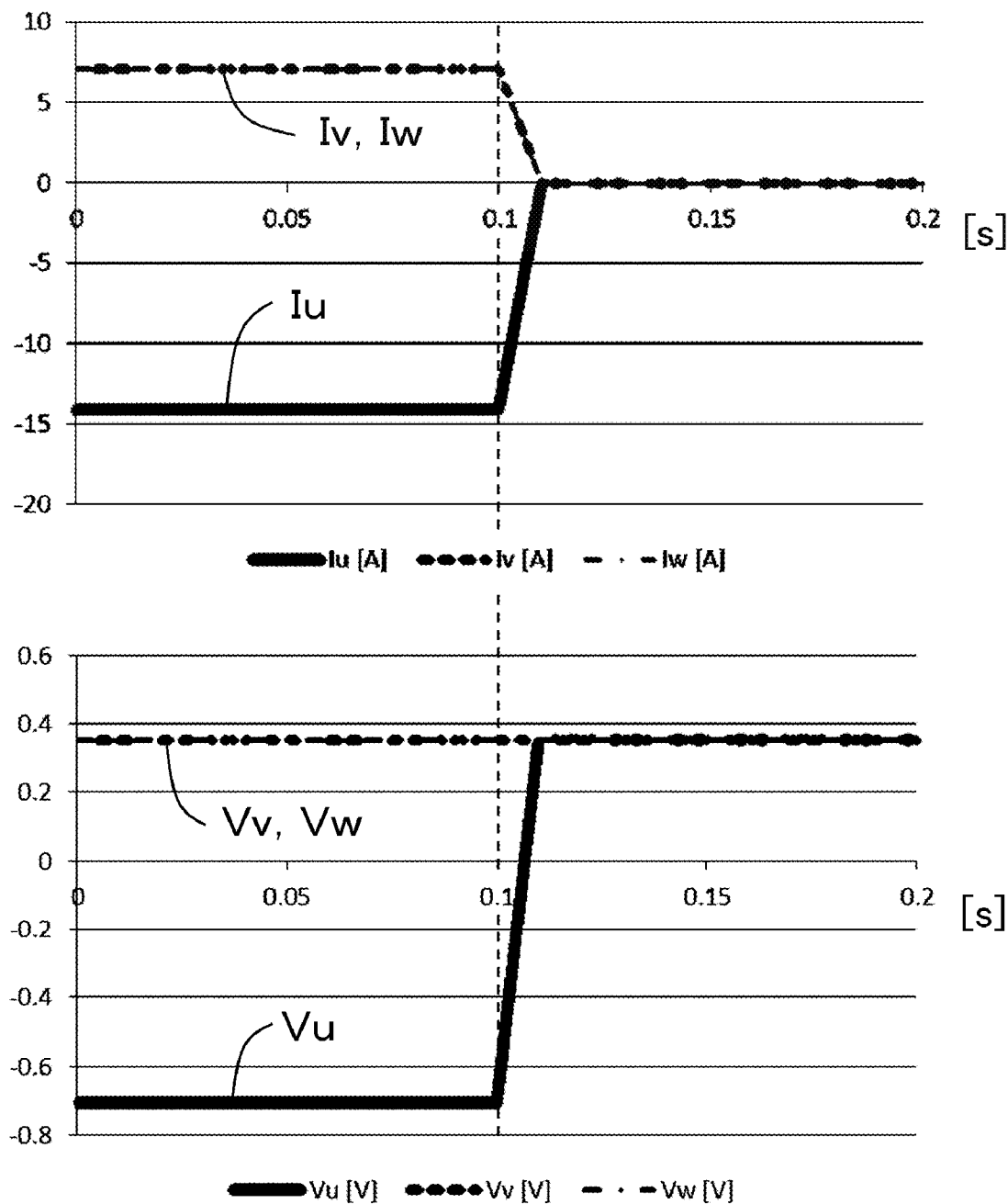
FIG. 38 is a time chart explaining change of the three-phase currents and the three-phase voltages when switching to the shutoff state according to Embodiment 4 of the present disclosure.

In this way, in the state where the electrical angle θ is 180 degrees and the U phase current is negative in FIG. 4 and FIG. 5, FIG. 38 shows the three-phase currents and the three-phase voltages when the U phase low potential side switching device 21U is switched from the drive state before shutoff to the shutoff state. By switching from the drive state before shutoff to the shutoff state at time 0.1 s, the three-phase currents Iu, Iv, Iw do not flow. The U phase voltage Vu in the shutoff state becomes a neutral point voltage which is an average value of the V phase voltage Vv and the W phase voltage Vw when shutoff is not performed. In this example, since the V phase voltage Vv and the W phase voltage Vw are equal, the U phase voltage Vu is equal to the V phase voltage Vv and the W phase voltage Vw.

When the V phase voltage Vv and the W phase voltage Vw are equal, current does not flow into the V phase winding and the W phase winding, but when there is a potential difference between the V phase voltage Vv and the W phase voltage Vw, current flows into the lower potential phase winding from the higher potential phase winding. When the V phase voltage Vv is higher than the W phase voltage Vw, after the current which passed through the V phase high potential side switching device 20V passed through the W phase high potential side switching device 20 via the W phase winding from the V phase winding, it returns to the V phase high potential side switching device 20V, and current flows into the W phase winding from the V phase winding.

As in the state where the electrical angle θ is 180 degrees in FIG. 4 and FIG. 5, in the drive state where the U phase current Iu which is set to the diagnosis object phase becomes negative when the shutoff is not performed, when the U phase low potential side switching device 21U is switched to the shutoff state by the device shutoff unit 8, the U phase current Iu does not flow. Therefore, when the U phase current Iu which is set to the diagnosis object phase changes to 0 after the shutoff command, it can be determined that the U phase high potential side switching device 20U was shut off normally. When the U phase current Iu does not change to 0 after a shutoff command, it can be determined that it was not shut off normally but the device shutoff unit 8 of the U phase low potential side switching device 21U failed. Failure of the device shutoff unit 8 can be determined also by change of the V phase current Iv and the W phase current Iw which are not the diagnosis object phase after the shutoff command.

In the drive state where the U phase current Iu is negative when the shutoff's not performed, when the total value or the average value of the terminal voltages of the three-phase windings, or the voltage of the neutral point of the three-phase windings changes after shutoff control, it can be determined that the U phase low potential side switching device 21U was shut off normally; and when the total value or the average value of the terminal voltages of the three-phase windings, or the voltage of the neutral point, of the three-phase windings does not change after shutoff control, it can be determined that it was not shut off normally but the device shutoff unit 8 of the U phase low potential side switching device 21U failed.

Therefore, in order to determine failure of the device shutoff unit 8 of the U phase low potential side switching device 21U, in the drive state where the U phase current Iu becomes negative when the shutoff is not performed, the U phase low potential side switching device 21U may be switched to the shutoff state by commanding the device shutoff unit 8.

Then, in the present embodiment, the shutoff failure determination unit 9 performs a low potential side forcible shutoff that forcibly shuts off the low potential side switching device of the diagnosis object phase by commanding the device shutoff unit 8, in a drive state where a current which flows through the winding of the diagnosis object phase becomes negative when the switching device is not forcibly shut off by the device shutoff unit 8. Herein, a current direction flowing into the inverter 17 from the winding is negative. The shutoff failure determination unit a performs a shutoff failure determination that determines failure of the device shutoff unit 8 based on the detection value of current or voltage when the low potential side forcible shutoff is performed.

In the present embodiment, when determining failure based on current, it is configured as follows. That is to say, the shutoff failure determination unit 9 determines that when the current flowing through the winding of the diagnosis object phase changes to 0 after performing the low potential side forcible shutoff, the device shutoff unit 8 of the low potential side switching device of the diagnosis object phase is normal; and determines that when the current flowing through the winding of the diagnosis object phase does not change to 0 after performing the low potential side forcible shutoff, the device shutoff unit 8 of the low potential side switching device of the diagnosis object phase is abnormal.

On the other hand, when determining failure based on voltage, it is configured as follows. That is to say, the shutoff failure determination unit 9 determines that when the voltage applied to the winding of the diagnosis object phase changes to an average value of voltages applied to the windings of phases other than the diagnosis object phase after performing be low potential side forcible shutoff, the device shutoff unit 8 of the low potential side switching device of the diagnosis object phase is normal; and determines that when the voltage applied to the winding of the diagnosis object phase does not change to the average value of voltages applied to the windings of phases other than the diagnosis object phase after performing the low potential side forcible shutoff, the device shutoff unit 8 of the low potential side switching device of the diagnosis object phase is abnormal.

Alternatively, the shutoff failure determination unit 9 determines that when a total value or an average value of the terminal voltages of three-phase windings, or a voltage of the neutral point of three-phase windings changes after performing the low potential side forcible shutoff, the device shutoff unit 8 of the low potential side switching device of the diagnosis object phase is normal; and determines that when the total value or the average value of the terminal voltages of three-phase windings, or the voltage of the neutral point of three-phase windings does not change after performing the low potential side forcible shutoff, the device shutoff unit 8 of the low potential side switching device of the diagnosis object phase is abnormal.

According to a relative potential relation among the voltages Vu, Vv, Vw applied to the three-phase windings, the current direction which flows through the each phase winding is decided. The drive state where the current flowing into the winding of the diagnosis object phase becomes negative when the shutoff is not performed becomes a drive state where the voltage applied to the winding of the diagnosis object phase becomes smaller than the average value (the neutral point voltage) of the voltages Vu, Vv, Vw applied to the three-phase windings when the shutoff is not performed.

Then, the shutoff failure determination unit 9 may performs the low potential side forcible shutoff in the drive state where the applied voltage of the winding of the diagnosis object phase becomes smaller than the average value of the applied voltages Vu, Vv, Vw of the three-phase windings when the switching device is not forcibly shut off. Herein, as the applied voltages Vu, Vv, Vw of the three-phase windings, the three-phase voltage commands Vu*, Vv*, Vw* which are the applied voltage commands to the three-phase windings may be used.

As similar to above Embodiment 1, by applying the controller for the rotary machine 3 to the controller for the electric power steering, failure determination of the device shutoff unit 8 is achieved, the abnormal operation of the rotary machine 3 is avoided, and safety can be improved.

5. Embodiment 5

The controller 1 according to Embodiment 5 wilt be explained. The explanation for constituent parts the same as those in Embodiment 1 will be omitted. Although the basic configuration of the rotary machine 3 and the controller 1 according to the present embodiment is the same as that of Embodiment 1, the present embodiment is different from Embodiment 1 in performing a low potential side forcible shutoff of the diagnosis object phase and a setting method of dq-axis current commands Id*, Iq* for the shutoff failure determination which the current command calculation unit 5 sets.

<First Configuration>

First, a first configuration that sets the dq-axis current commands Id*, Iq* according to the present embodiment will be explained. Since the rotary machine 3 may rotate when being in the shutoff state if an absolute value of the output torque difference Tdiff between the output torque T in the drive state before shutoff and the output torque Toff in the shutoff state which was shown in the equation (13) is large, the absolute value of the vibrating output torque difference Tdiff hardly appear in the behavior of the rotary machine 3 as it is smaller. From the equation (13), when the phase angle β is ±π/2, the absolute value of the output torque difference Tdiff becomes the minimum. Therefore, when the phase angle β of current vector I becomes ±π/2 (that is, when the q-axis current Iq before shutoff becomes 0 and the d-axis current Id becomes values other than 0), the output torque difference Tdiff becomes the minimum.

Then, as similar to the first configuration of above Embodiment 2, in the first configuration of the present embodiment, when performing the shutoff failure determination, the current command calculation unit 5 sets the q-axis current command for the shutoff failure determination to 0, and sets the d-axis current command Id* for the shutoff failure determination to a value other than 0. According to this configuration, the absolute value of the output torque difference Tdiff between the drive state before shutoff and the shutoff state can be minimized, and the output torque difference before and after shutoff can hardly appear in the behavior of the rotary machine 3.

<Second Configuration>

Next, a second configuration that sets the dq-axis current commands Id*, Iq* according to the present embodiment will be explained. FIG. 4 shows the three-phase currents Iu, Iv, Iw when the d-axis current Id is a constant value of 10 Arms and the q-axis current Iq is 0 Arms as the first configuration. In this case, a period when the U phase current Iu which is the diagnosis object phase becomes negative and the low potential side forcible shutoff of U phase is performed is only a period when the electrical angle θ becomes from π/2 to 3π/2 (from 90 degrees to 270 degrees). Therefore, the period when the low potential side forcible shutoff of U phase can be performed is limited. This can be understood also from the calculation equation of the U phase current Iu when the phase angle β is set to ±π/2 in the equation (6).

Figure 39:
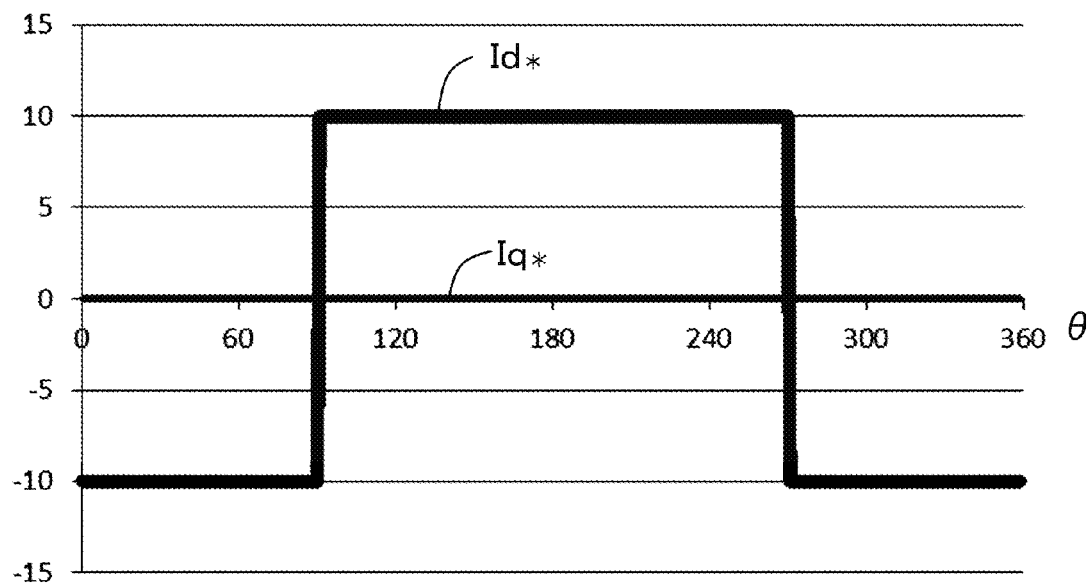
FIG. 39 is a time chart explaining setting of the dq-axis current commands for the shutoff failure determination according to Embodiment 5 of the present disclosure.
Figure 40:
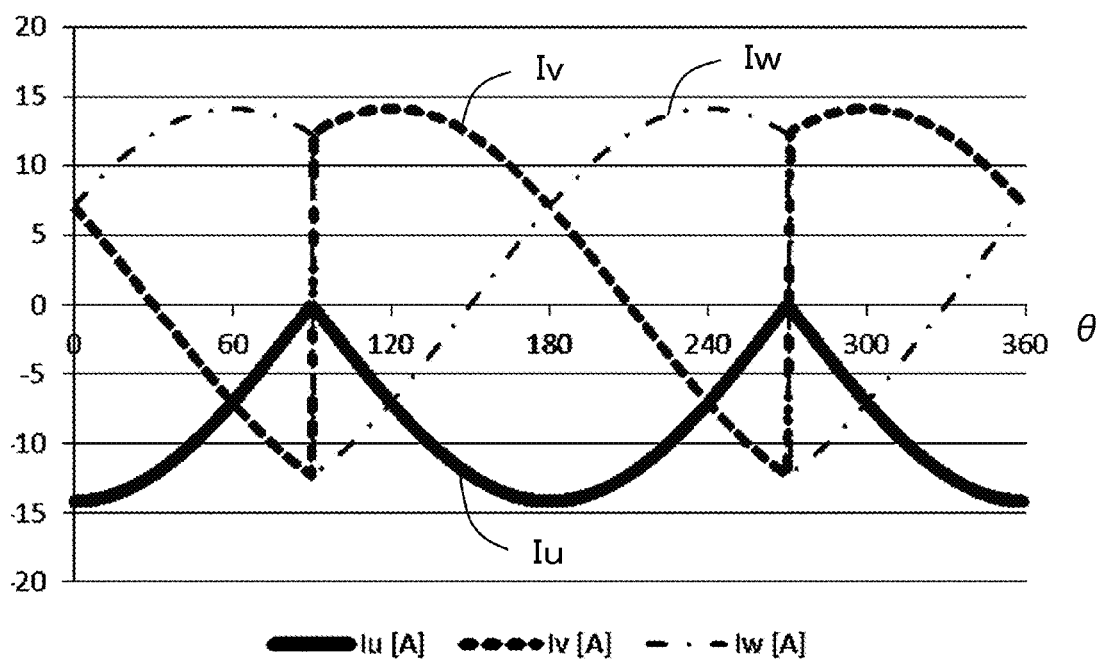
FIG. 40 is a time chart explaining the three-phase currents in the drive state before shutoff according to Embodiment 5 of the present disclosure.
Figure 41:
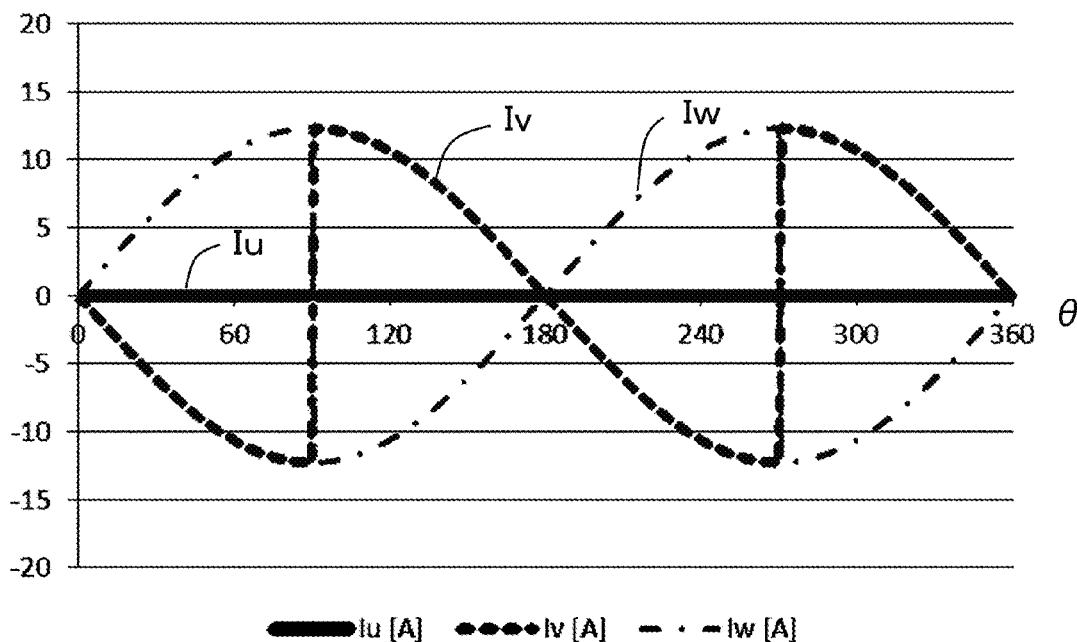
FIG. 41 is a time chart explaining the three-phase currents in the shutoff state according to Embodiment 5 of the present disclosure.

Then, in order to expand an interval when the U phase current Iu becomes negative, the d-axis current command Id* and the current command Iq* may be set as shown in FIG. 39. At this time, the three-phase currents Iu, Iv, Iw in the drive state before shutoff become as shown in FIG. 40, and the three-phase currents Iu, Iv, Iw in the shutoff state of the U phase low potential side switching device become as shown in FIG. 41. As shown in FIG. 40, the U phase current Iu is smaller than 0 at the electrical angles θ other than ±π/2 (90 degrees, 270 degrees), and the low potential side forcible shutoff of U phase can be performed at almost all angles.

Figure 42:
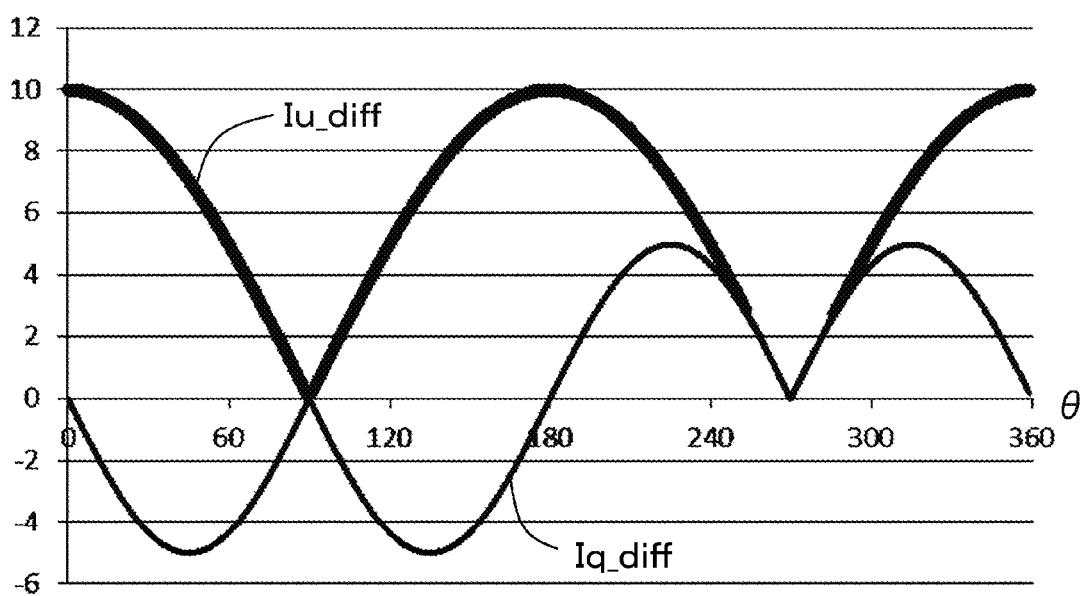
FIG. 42 is a time chart explaining the current difference before and after the shutoff according to Embodiment 5 of the present disclosure.

At this time, a current difference Iu_diff of the U phase current and a current difference Iq_diff of the q-axis current between the drive state before shutoff and the shutoff state become as shown in FIG. 42; and the current difference Iq_diff of the q-axis current proportional to the output torque difference is within a range of ±5 Arms, and the output torque difference can be suppressed.

Then, determining i-th phase as the diagnosis object phase, and defining an advance angle of the d-axis on the basis of the first phase winding as an electrical angle θ; in a case of performing the low potential side forcible shutoff, the current command calculation unit 5 sets the d-axis current command Id* to a negative value, when the electrical angle θ is between $-\pi/2+2\pi(i-1)/m$ and $\pi/2+2\pi(i-1)/m$; and sets the d-axis current command Id* to a positive value, when the electrical angle θ is not between $-\pi/2+2\pi(i-1)/m$ to $\pi/2+2\pi(i-1)/m$. The current command calculation unit 5 sets the q-axis current command Iq* to 0.

Figures 43, 44:
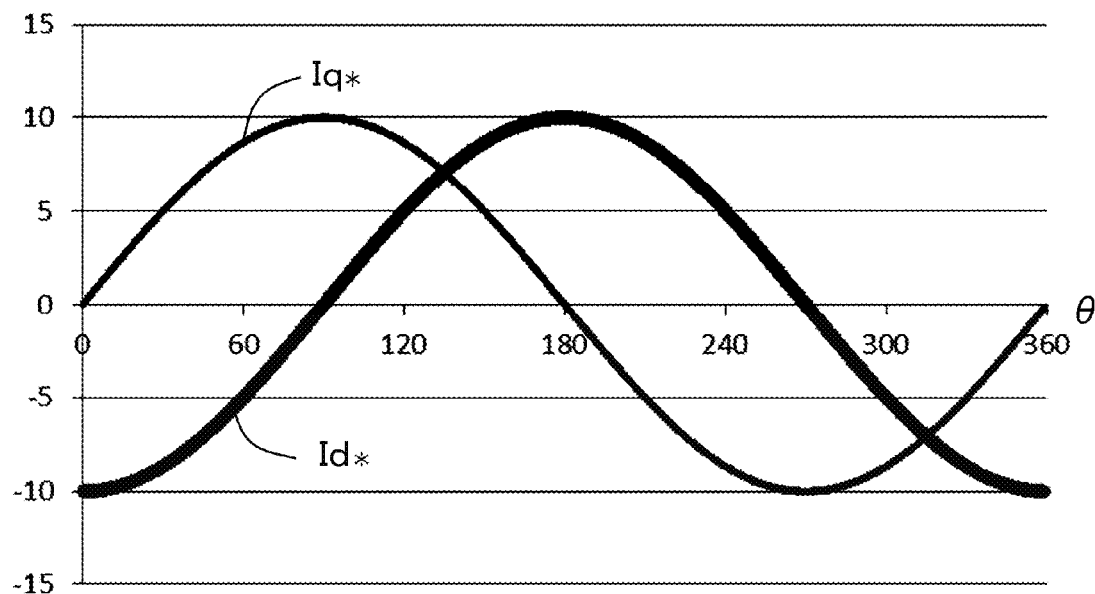
FIG. 43 is a figure explaining setting of the dq-axis current commands for the shutoff failure determination according to Embodiment 5 of the present disclosure.
FIG. 44 is a time chart explaining setting of the dq-axis current commands for the shutoff failure determination according to Embodiment 6 of the present disclosure.

In the present embodiment, as mentioned above, the three-phase windings of m=3 is provided, the first phase of i=1 is set to U phase, and the second phase of i=2 is set to V phase, and the third phase of i=3 is set to W phase. As shown in FIG. 43, in a case of determining U phase of i=1 as the diagnosis object phase, the current command calculation unit 5 sets the d-axis current command Id* to a negative value, when the electrical angle θ is between −π/2 and π/2 (between 270 degrees and 360 degrees, and between 0 degree and 90 degrees); and sets the d-axis current command id* to a positive value, when the electrical angle θ is not between −π/2 and π/2. In a case of determining V phase of i=2 as the diagnosis object phase, the current command calculation unit 5 sets the d-axis current command Id* to a negative value, when the electrical angle θ is between π/6 and 7π/6 (between 30 degrees and 210 degrees); and sets the d-axis current command Id* to a positive value, when the electrical angle θ is not between π/6 and 7π/6. In a case of determining W phase of i=3 as the diagnosis object phase, the current command calculation unit 5 sets the d-axis current command Id* to a negative value, when the electrical angle θ is between 5π/6 and 11π/6 (between 150 degrees and 330 degrees); and sets the d-axis current command Id* to a positive value, when the electrical angle θ is not between 5π/6 and 11π/6.

Embodiment 6

The controller 1 according to Embodiment 6 will be explained. The explanation for constituent parts the same as those in Embodiment 1 will be omitted. Although the basic configuration of the rotary machine 3 and the controller 1 according to the present embodiment is the same as that of Embodiment 1, the present embodiment is different from Embodiment 1 in performing a low potential side forcible shutoff of the diagnosis object phase and a setting method of dq-axis current commands Id*, Iq* for the shutoff failure determination which the current command calculation unit 5 sets.

In Embodiment 5, the current command calculation unit 5 set the q-axis current command Iq* for the shutoff failure determination to 0, and sets the d-axis current command Id* for the shutoff failure determination to a value other than 0. However, as shown in FIG. 40, the U phase current Iu which is set to the diagnosis object phase becomes 0 Arms, when the electrical angle θ becomes ±π/2 (90 degrees, 270 degrees); and the low potential side forcible shutoff of U phase cannot be performed. In the present embodiment, also in these electrical angles θ, the U phase current Iu is set to a negative constant value so that the low potential side forcible shutoff of U phase can be performed.

Then, determining i-th phase as the diagnosis object phase, and defining an advance angle of the d-axis on the basis of the first phase winding as an electrical angle θ; in a case of performing the low potential side forcible shutoff, using a phase adjustment constant K which is set a value between 0 and n, the current command calculation unit 5 sets the cl-axis current command Id* and the q-axis current command Iq* for the shutoff failure determination, so that a phase angle β, to the q-axis, of a current vector which combined the d-axis current command Id* and the q-axis current command Iq* becomes K+2π(i−1)/m−θ. In this case, the current command calculation unit 5 sets the d-axis current command Id* and the q-axis current command Iq* for the shutoff failure determination, as shown in the above equation (14).

As mentioned above, the three-phase windings of m=3 is provided. When the diagnosis object phase is determined to U phase which is the first phase of i=1, it becomes β=K−θ; when the diagnosis object phase is determined to V phase which is the second phase of i=2, it becomes β=K+2π/3−θ; and when the diagnosis object phase is determined to W phase which is the third phase of i=3, it becomes β=K+4π/3−θ. As the above equation (15), U phase current Iu* when U phase is set to the diagnosis object phase, V phase current. Iv* when V phase is set to the diagnosis object phase, and W phase current Iw* when W phase is set to the diagnosis object phase can be expressed. Since the phase adjustment constant K is set to a value between and π, the current Iu_t, Iv_t, Iw_t of the each diagnosis object phase becomes a negative value.

Figure 45:
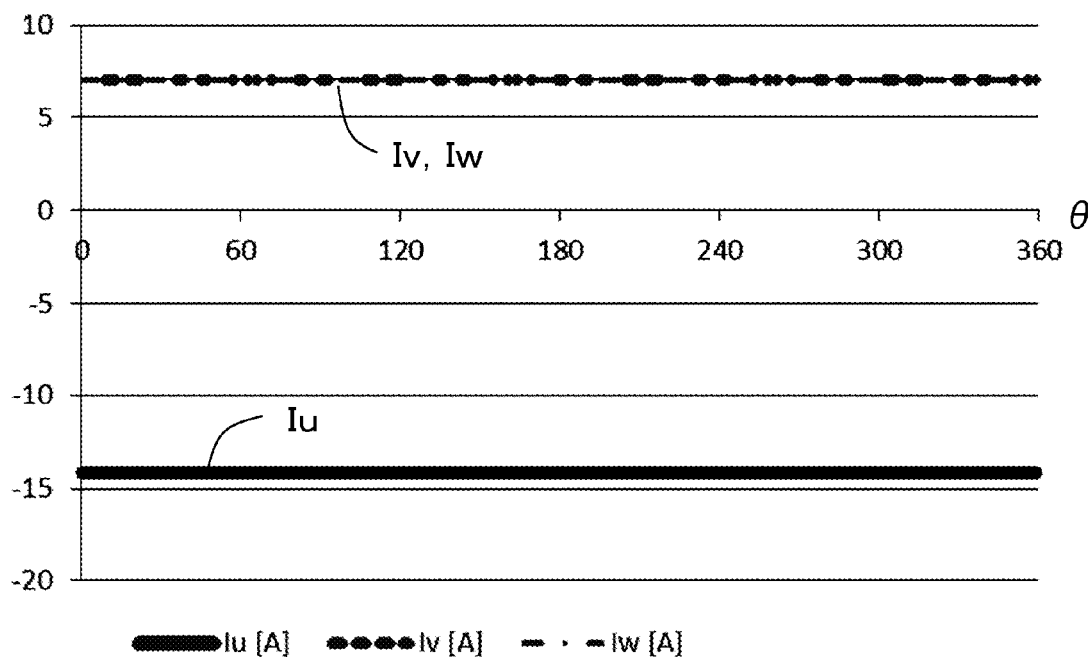
FIG. 45 is a time chart explaining the three-phase currents in the drive state before shutoff according to Embodiment 6 of the present disclosure.
Figure 46:
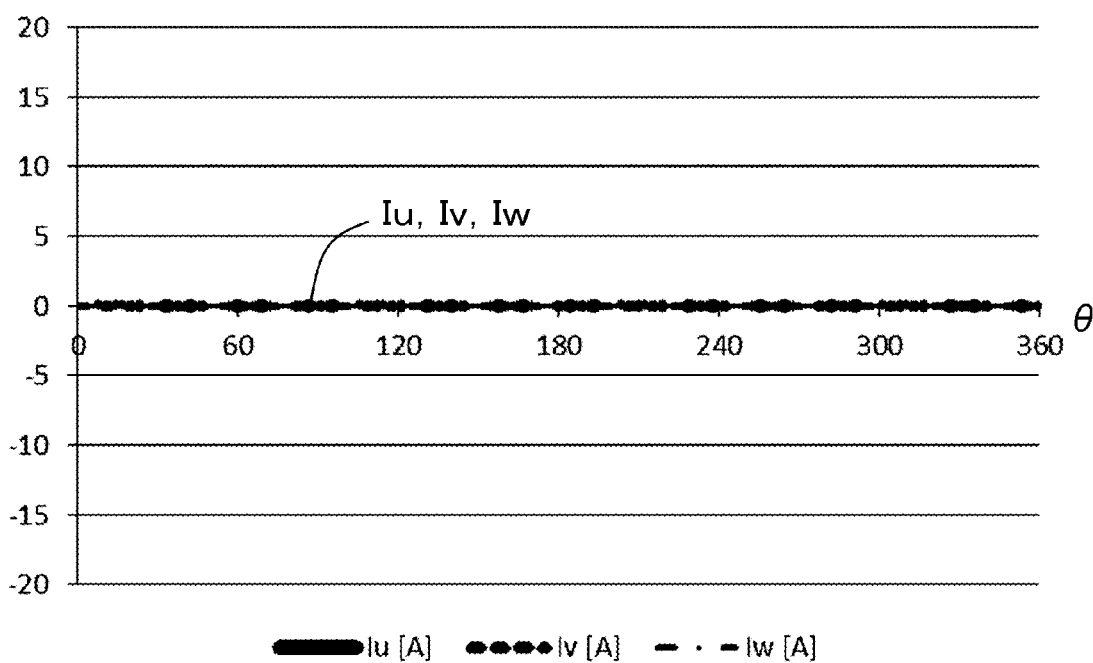
FIG. 46 is a time chart explaining the three-phase currents in the shutoff state according to Embodiment 6 of the present disclosure.

FIG. 44 shows the dq-axis current commands Id*, Iq* for the shutoff failure determination when the diagnosis object phase is determined to U phase which is the first phase of i=1 and the phase adjustment constant K is set to π/2; FIG. 45 shows the three-phase currents Iu, Iv, Iw in the drive state before shutoff in the case of FIG. 44; and FIG. 46 shows the three-phase currents Iu, Iv, Iw when the U phase low potential side switching device is shut off in the case of FIG. 44. As shown in FIG. 45, in the drive state before shutoff, the U phase current Iu becomes a negative value of −10 Arms at all the electrical angles θ, and the shutoff failure determination by the U phase low potential side forcible shutoff can be performed. As shown in FIG. 46, since the U phase current Iu becomes 0 Arms in the shutoff state, failure of the device shutoff unit 8 can be easily determined from a current change. Since the winding current of the failure-diagnosis phase becomes a constant value, the design of a threshold value of failure determination can be facilitated, and the failure determination accuracy can be improved.

As the case where the phase adjustment constant K is set to π/2 was shown in from FIG. 44 to FIG. 46, by setting the current vector to a desired direction (in this example, the U phase high potential side) at the each electrical angle θ, an useless direction component can be eliminated and the absolute value of the current vector can be reduced.

Figure 47:
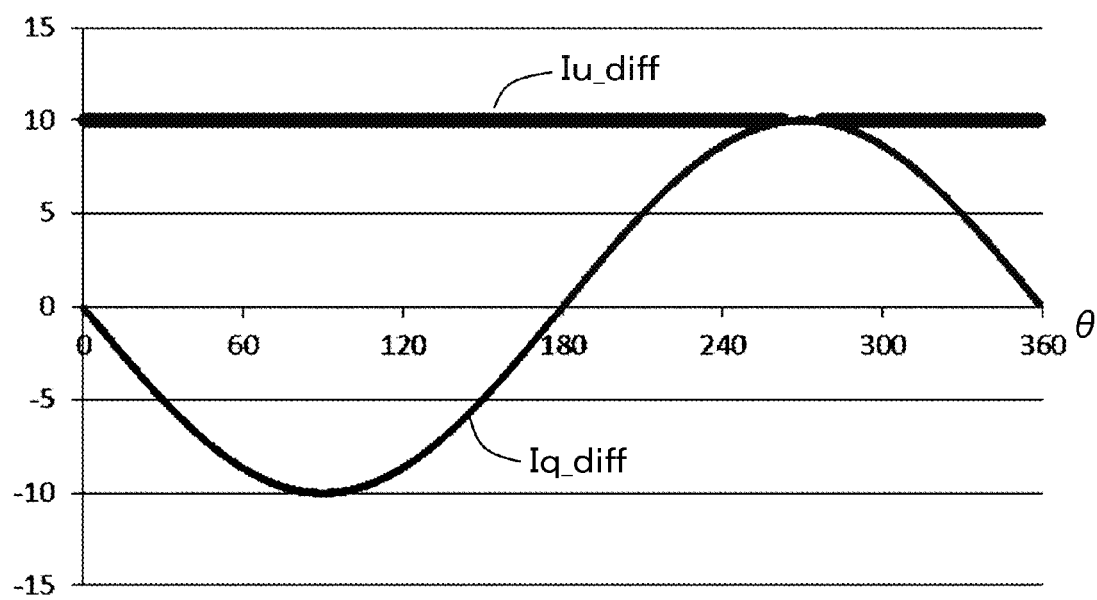
FIG. 47 is a time chart explaining the current difference before and after the shutoff according to Embodiment 6 of the present disclosure.

In the case of from FIG. 44 to FIG. 46, the current difference Iu_diff of the U phase current and the current difference Iq_diff of the q-axis current between the drive state before shutoff and the shutoff state become as shown in FIG. 47. The absolute value of current difference Iq_diff of the q-axis current proportional to the output torque difference becomes the largest, when the electrical angle θ is 90 degrees and 270 degrees.

For example, when the electrical angle θ is 90 degrees, the q-axis current Iq in the drive state before shutoff becomes 10 Arms which is the maximum absolute value, and the q-axis current Iq in the shutoff state becomes 0 Arms. If a torque constant which converts the q-axis current Iq into the output torque of the rotary machine 3 is defined as Kt, the output torque T in the drive state before shutoff becomes 10√3 Kt, and the output torque Toff in the shutoff state becomes 0.

On the other hand, a mechanical loss torque Tloss exists in the rotary machine 3 and a torque transmission mechanism attached to the output shaft of the rotary machine 3 by gear, chain, and the like. In the present embodiment, the mechanical loss torque Tloss is a mechanical loss torque of the torque transmission mechanism which transmits the output torque of the rotary machine 3 to the steering shaft 62. By setting the output torque T in the drive state before shutoff less than or equal to the mechanical loss torque Tloss, the state where the rotary machine 3 does not rotate can be maintained.

Then, the current command calculation unit 5 sets the absolute value of q-axis current command Iq* for the shutoff failure determination less than or equal to a value obtained by dividing the absolute value of the mechanical loss torque Tloss by the torque constant Kt. According to this configuration, the shutoff failure determination can be performed in the state where the rotary machine 3 does not rotate. The mechanical loss torque Tloss may be previously stored in the storage apparatus 91, and may be read when calculating the q-axis current command Iq*.

The current command calculation unit 5 sets the q-axis current command Iq* so that the absolute value of the output torque difference Tdiff between the output torque T of the rotary machine 3 when the switching device is not forcibly shut off and the output torque Toff of the rotary machine 3 when the switching device is forcibly shut off becomes less than or equal to the absolute value of the mechanical loss torque Tloss applied to the rotary shaft of rotor. According to this configuration, the rotary machine 3 can be prevented from rotating by an output torque change which occurs before and after shutoff.

The current command calculation unit 5 sets the effective value Irms of the current vector so that the maximum value of the absolute value of the output torque difference Tdiff calculated by an equation (16) becomes less than or equal to the absolute value of the mechanical loss torque Tloss; and sets the q-axis current command Iq* based on the equation (5) using the set effective value Irms of the current vector.

The three-phase currents in the shutoff state become as shown in FIG. 46. Accordingly, if the detected current values are fed back and the voltage commands are calculated in the voltage command calculation unit 6, since the deviations with the current commands are large, there is anxiety that the voltage commands change to the maximum values. As explained in above Embodiment 1, in the shutoff failure determination, after shutting off, the voltage command calculation unit 6 stops the current feedback control and sets the d-axis voltage command Vd* and the q-axis voltage command Vq* for the shutoff failure determination without using the current detection values. Therefore, the output torque of the rotary machine 3 can be prevented from increasing by the current feedback control after shutoff.

As explained in above Embodiment 1, the voltage command calculation unit 6 holds the dq-axis voltage commands Vd*, Vq* calculated before forcibly shutting off the switching device; and sets the held values to the dq-axis voltage commands Vd*, Vq*, when the switching device is forcibly shut off. According to this configuration, by a simple method of holding the voltage commands before the shutoff, an influence of the current change by the shutoff can be prevented from appearing in the voltage commands after the shutoff.

In the above-mentioned Embodiments 1 to 6, there has been explained the case where the rotary machine 3 is a rotary machine for driving the electric power steering apparatus; and the controller 1 is a controller for the electric power steering apparatus 60. However, the rotary machine 3 may be a driving force source of apparatus other than electric power steering apparatus 60, such as a rotary machine which drives wheels; and the controller 1 may be a controller for the rotary machine 3 which makes the rotary machine 3 output a required driving force, or may be a controller for apparatus other than the electric power steering apparatus 60.

Various modifications and alterations of this disclosure will be apparent to those skilled in the art without departing from the scope and spirit of this disclosure, and it should be understood that this is not limited to the illustrative embodiments set forth herein.

REFERENCE SIGNS LIST

1 Controller for rotary machine, 2 DC Power Source, 3 Rotary Machine, 4 Control Circuit, 5 Current Command Calculation Unit, 6 Voltage Command Calculation Unit, 7 Switching Signal Generation Unit, 8 Device Shutoff Unit, 9 Shutoff Failure Determination Unit, 10 Rotation Information Calculation Unit, 11 current detection unit, 12 Torque Command Calculation Unit, 17 Inverter, 60 Electric Power Steering Apparatus, Id* d-axis current command, Iq* q-axis current command, Kt Torque constant, Tloss Mechanical loss torque, β Phase angle, θ Electrical angle

What is claimed is:

1. A controller for a rotary machine comprising:
an inverter that is provided with a plurality of switching devices and performs power conversion between a DC power source and the rotary machine having m-phase windings (m is a natural number of greater than or equal to two); and
a control circuit that controls on/off of the switching devices,
wherein the inverter is provided with m sets of a series circuit where a high potential side switching device connected to a positive electrode side of the DC power source and a low potential side switching device connected to a negative electrode side of the DC power source are connected in series and where a connection node of series connection is connected to the winding of corresponding phase, corresponding to respective phase of the m-phase,
wherein the control circuit is provided with one processor configured to implement:
a current command calculator that calculates current commands which flow into the windings,
a voltage command calculator that calculates voltage commands applied to the windings based on the current commands,
a switching signal generator that generates switching signals which turn on and off the switching devices based on the voltage commands,
a device shutoff circuit that forcibly switches each of the switching devices to a shutoff state, and
a shutoff failure determination calculator that determines failure of the device shutoff circuit,
wherein the shutoff failure determination calculator determines one phase in the m-phase as a diagnosis object phase, performs a high potential side forcible shutoff or a low potential side forcible shutoff, and determines failure of the device shutoff circuit based on a detection value of current or voltage when performing the high potential side forcible shutoff or the low potential side forcible shutoff,
wherein the high potential side forcible shutoff is a shutoff that forcibly shuts off the high potential side switching device of the diagnosis object phase by commanding the device shutoff circuit, in a drive state where a current which flows through the winding of the diagnosis object phase becomes positive which is a direction flowing into the winding from the inverter when the switching device is not forcibly shut off, and
wherein the low potential side forcible shutoff is a shutoff that forcibly shuts off the low potential side switching device of the diagnosis object phase by commanding the device shutoff circuit, in a drive state where a current which flows through the winding of the diagnosis object phase becomes negative which is a direction flowing into the inverter from the winding when the switching device is not forcibly shut off.

2. The controller for the rotary machine according to claim 1, wherein the shutoff failure determination calculator performs the high potential side forcible shutoff in a drive state where an applied voltage of the diagnosis object phase winding becomes larger than an average value of applied voltages to the m-phase windings when the switching device is not forcibly shut off; or
performs the low potential side forcible shutoff in a drive state where the applied voltage of the diagnosis object phase winding becomes smaller than the average value of applied voltages of the m-phase windings when the switching device is not forcibly shut off.

3. The controller for the rotary machine according to claim 1, wherein the current command calculator performs dq-axis current control that calculates a d-axis current command and a q-axis current command, on a dq-axis rotating coordinate system consisting of a d-axis defined in a magnetic flux direction of a rotor of the rotary machine and a q-axis defined in a direction advanced to the d-axis by 90 degrees; and sets the q-axis current command to 0 and sets the d-axis current command to a value other than 0, when performing the high potential side forcible shutoff or the low potential side forcible shutoff.

4. The controller for the rotary machine according to claim 3, wherein determining i-th phase as the diagnosis object phase, and defining an advance angle of the d-axis on the basis of the first phase winding as an electrical angle;
in a case of performing the high potential side forcible shutoff, the current command calculator sets the d-axis current command to a positive value, when the electrical angle is between $-\pi/2+2\pi(i-1)/m$ and $\pi/2+2\pi(i-1)/m$; and sets the d-axis current command to a negative value, when the electrical angle is not between $-\pi/2+2\pi(i-1)/m$ and $\pi/2+2\pi(i-1)/m$; and
in a case of performing the low potential side forcible shutoff, the current command calculator sets the d-axis current command to a negative value, when the electrical angle is between $-\pi/2+2\pi(i-1)/m$ and $\pi/2+2\pi(i-1)/m$; and sets the d-axis current command to a positive value, when the electrical angle is not between $-\pi/2+2\pi(i-1)/m$ and $\pi/2+2\pi(i-1)/m$.

5. The controller for the rotary machine according to claim 1, wherein the current command calculator performs dq-axis current control that calculates a d-axis current command and a q-axis current command, on a dq-axis rotating coordinate system consisting of a d-axis defined in a magnetic flux direction of a rotor of the rotary machine and a q-axis defined in a direction advanced to the d-axis by 90 degrees;
determining i-th phase as the diagnosis object phase, and defining an advance angle of the d-axis on the basis of the first phase winding as an electrical angle θ;
in a case of performing the high potential side forcible shutoff, using a phase adjustment constant K which is set to a value between $-\pi$ and 0, the current command calculator sets the d-axis current command and the q-axis current command so that a phase angle, to the q-axis, of a current vector which combined the d-axis current command and the q-axis current command becomes $K+2\pi(i-1)/m-\theta$; and in a case of performing the low potential side forcible shutoff, using the phase adjustment constant K which is set to a value between 0 and $\pi$, the current command calculator sets the d-axis current command and the q-axis current command so that the phase angle, to the q-axis, of the current vector becomes $K+2\pi(i-1)/m-\theta$.

6. The controller for the rotary machine according to claim 5, wherein in the case of performing the high potential side forcible shutoff, the current command calculator uses the phase adjustment constant K which is set to $-\pi/2$; and in the case of performing the low potential side forcible shutoff, the current command calculator uses the phase adjustment constant K which is set to $\pi/2$.

7. The controller for the rotary machine according to claim 1, wherein the current command calculator performs dq-axis current control that calculates a d-axis current command and a q-axis current command, on a dq-axis rotating coordinate system consisting of a d-axis defined in a magnetic flux direction of a rotor of the rotary machine and a q-axis defined in a direction advanced to the d-axis by 90 degrees; and in a case of performing the high potential side forcible shutoff or the low potential side forcible shutoff, the current command calculator sets an absolute value of the q-axis current command to less than or equal to a value obtained by dividing an absolute value of a mechanical loss torque applied to a rotary shaft of a rotor of the rotary machine by a torque constant which converts the q-axis current command into an output torque of the rotary machine.

8. The controller for the rotary machine according to claim 1, wherein the current command calculator performs dq-axis current control that calculates a d-axis current command and a q-axis current command, on a dq-axis rotating coordinate system consisting of a d-axis defined in a magnetic flux direction of a rotor of the rotary machine and a q-axis defined in a direction advanced to the d-axis by 90 degrees; and the current command calculator sets the q-axis current command so that an absolute value of an output torque difference between an output torque of the rotary machine when the switching device is not forcibly shut off and an output torque of the rotary machine when the switching device is forcibly shut off becomes less than or equal to an absolute value of a mechanical loss torque applied to a rotary shaft of a rotor of the rotary machine.

9. The controller for the rotary machine according to claim 1, wherein the shutoff failure determination calculator determines failure of the device shutoff circuit, based on a detection value of voltage applied to the windings when performing the high potential side forcible shutoff or the low potential side forcible shutoff.

10. The controller for the rotary machine according to claim 1, wherein the shutoff failure determination calculator determines failure of the device shutoff circuit, based on a detection value of current which flows through the high potential side switching device or a detection value of current which flows through the low potential side switching device when performing the high potential side forcible shutoff or the low potential side forcible shutoff.

11. The controller for the rotary machine according to claim 1, wherein the shutoff failure determination calculator determines failure of the device shutoff circuit, based on a detection value of current which flows into the windings when performing the high potential side forcible shutoff or the low potential side forcible shutoff.

12. The controller for the rotary machine according to claim 1, wherein the voltage command calculator calculates the voltage commands, without using a detection value of current, after forcibly shutting off the switching device.

13. The controller for the rotary machine according to claim 1, wherein the voltage command calculator holds the voltage commands calculated before forcibly shutting off the switching device; and sets the held voltage commands to the voltage commands, when forcibly shutting off the switching device.

14. The controller for the rotary machine according to claim 1, wherein the rotary machine is a rotary machine for driving an electric power steering apparatus which assists a steering wheel torque of a vehicle steering device, and the control circuit makes the rotary machine output a torque which assists the steering wheel torque of the vehicle steering device, when performing normal control.

15. An electric power steering apparatus comprising:
the controller for the rotary machine according to claim 1,
the rotary machine, and
a driving force transmission mechanism which transmits a driving force of the rotary machine to a vehicle steering device.

* * * * *